(12) United States Patent
Kamiyama et al.

(10) Patent No.: US 10,514,081 B2
(45) Date of Patent: Dec. 24, 2019

(54) BALANCE DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Eiichi Kamiyama, Mishima (JP); Takanobu Arai, Shizuoka-ken (JP); Nobuki Kawamoto, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 257 days.

(21) Appl. No.: 15/595,274

(22) Filed: May 15, 2017

(65) Prior Publication Data

US 2017/0335921 A1    Nov. 23, 2017

(30) Foreign Application Priority Data

May 17, 2016  (JP) .................................. 2016-099067
Jan. 18, 2017  (JP) .................................. 2017-006799

(51) Int. Cl.

| | |
|---|---|
| *F16F 15/26* | (2006.01) |
| *F16F 15/24* | (2006.01) |
| *F16F 15/32* | (2006.01) |
| *F02B 75/18* | (2006.01) |
| *F04C 29/00* | (2006.01) |

(Continued)

(52) U.S. Cl.
CPC ............ *F16F 15/267* (2013.01); *F16F 15/24* (2013.01); *F16F 15/322* (2013.01); *F02B 75/06* (2013.01); *F02B 75/18* (2013.01); *F02B 75/1896* (2013.01); *F04C 29/0057* (2013.01); *F16F 15/22* (2013.01); *F16F 15/264* (2013.01)

(58) Field of Classification Search
CPC ........ F16F 15/267; F16F 15/322; F16F 15/24; F16F 15/22; F16F 15/264; F02B 75/06; F02B 75/18; F02B 75/1896; F04C 29/0057
See application file for complete search history.

(56) References Cited

U.S. PATENT DOCUMENTS

| | | | |
|---|---|---|---|
| 6,202,622 B1 * | 3/2001 | Raquiza, Jr. ............ | F02B 75/32 123/197.4 |
| 2006/0185470 A1 * | 8/2006 | Machida ................... | B23Q 1/52 74/573.1 |
| 2007/0289567 A1 * | 12/2007 | Eto ........................ | F02B 75/048 123/192.1 |

FOREIGN PATENT DOCUMENTS

| | | | | |
|---|---|---|---|---|
| DE | 102010055584 A1 * | 6/2012 | .............. | F02B 75/06 |
| DE | 102010055584 A1 | 6/2012 | | |

(Continued)

*Primary Examiner* — Jacob M Amick
*Assistant Examiner* — Charles Brauch
(74) *Attorney, Agent, or Firm* — Hunton Andrews Kurth LLP

(57) ABSTRACT

A balance device for an internal combustion engine includes a crankshaft and a balance shaft. The crankshaft includes a CS eccentric weight. The balance shaft includes a BS eccentric weight. A CS connected point deviated from the CS main shaft, and a BS connected point deviated from the BS axial shaft are connected with a connection rod. A CS connection mechanism that enables relative rotation of the crankshaft and the connection rod is provided at the CS connected point. A BS connection mechanism that enables relative rotation of the balance shaft and the connection rod is provided at the BS connected point. A guide section guides a motion of the connection rod so that the balance shaft rotates in an opposite direction to the crankshaft.

20 Claims, 43 Drawing Sheets

(51) Int. Cl.
  *F16F 15/22* (2006.01)
  *F02B 75/06* (2006.01)

(56) References Cited

FOREIGN PATENT DOCUMENTS

| | | |
|---|---|---|
| JP | S60-84438 A | 5/1985 |
| JP | S60-98240 A | 6/1985 |
| JP | S60-98241 A | 6/1985 |
| JP | S60-98242 A | 6/1985 |
| JP | H04307145 A * | 10/1992 |
| JP | 2010-169045 A | 8/2010 |

* cited by examiner

Fig. 20
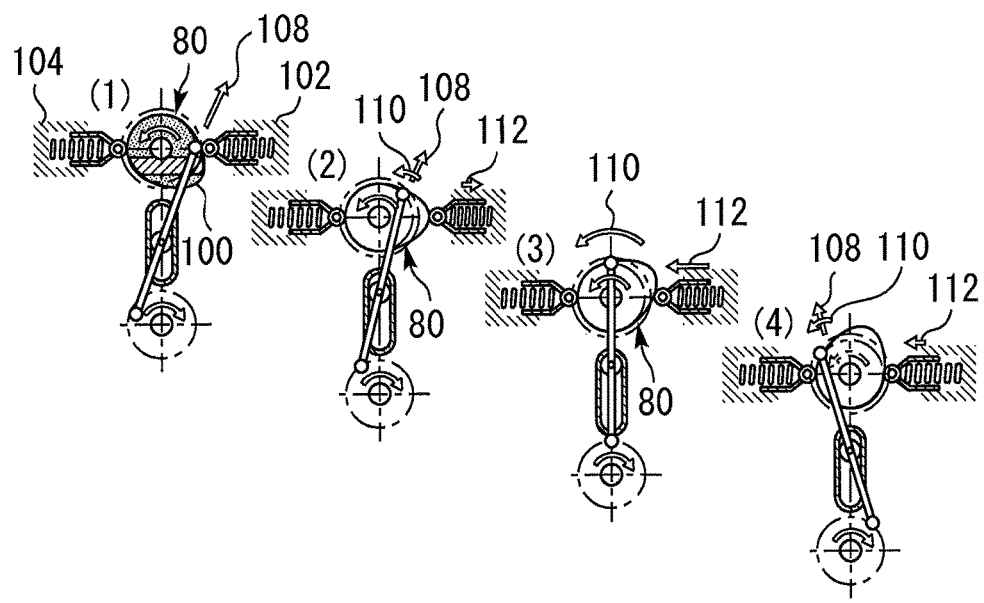
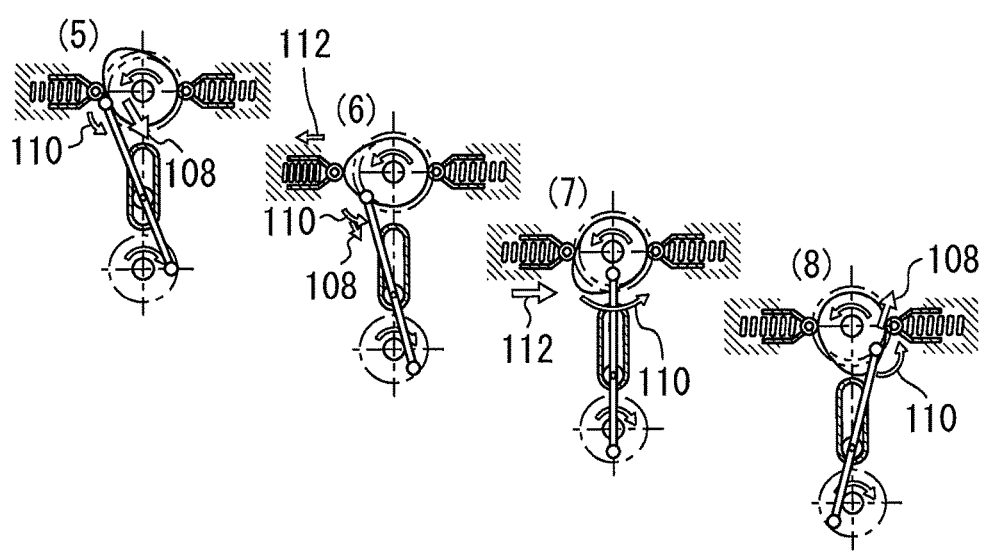

Fig. 63
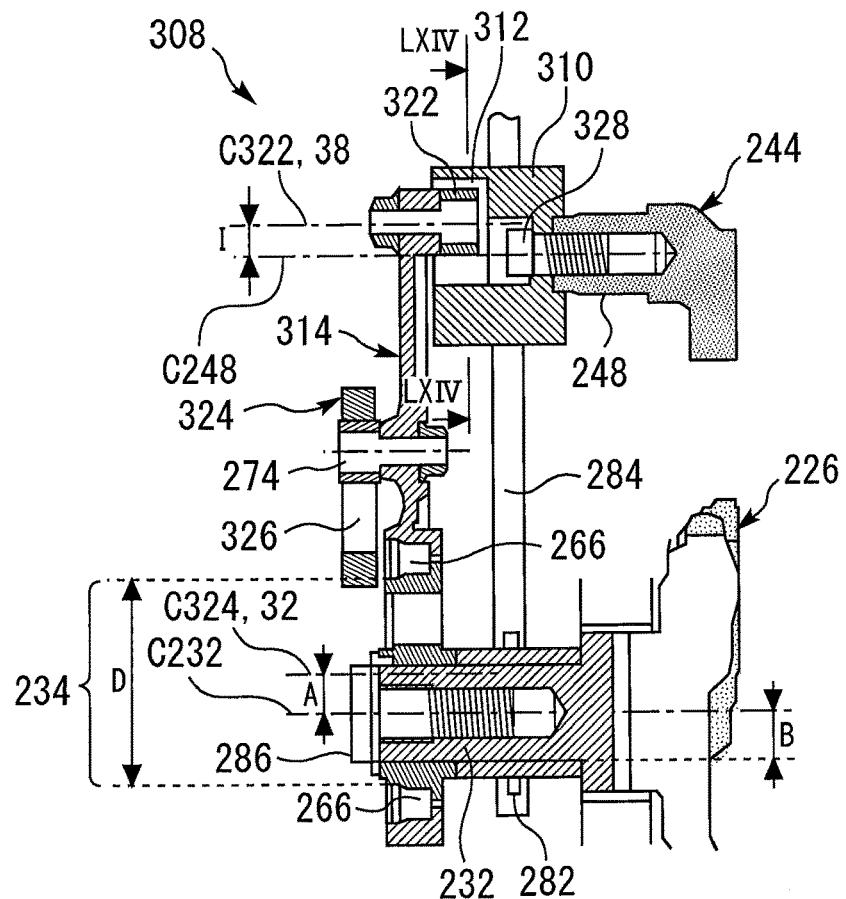
Fig. 64
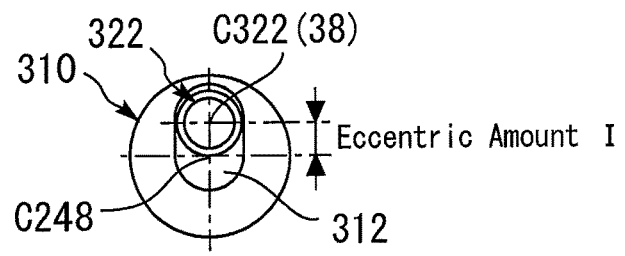
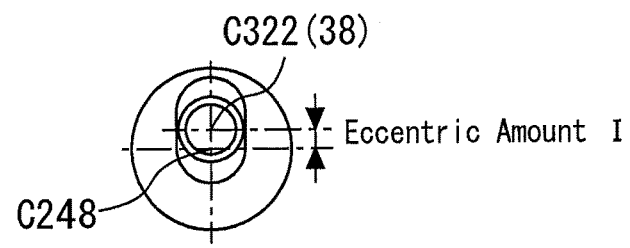

_US 10,514,081 B2_

BALANCE DEVICE FOR INTERNAL COMBUSTION ENGINE

CROSS-REFERENCE TO RELATED APPLICATION

The present application claims priority to Japanese Patent Application Nos. 2016-099067 and 2017-006799 filed on May 17, 2016 and Jan. 18, 2017, respectively, both of which are incorporated herein by reference in their entireties.

BACKGROUND OF THE INVENTION

Field of the Invention

Embodiments of the present invention relates to a balance device for an internal combustion engine, and particularly relates to a balance device suitable for being mounted on a single-cylinder or four-cycle two-cylinder internal combustion engine.

Background Art

A balance device is generally mounted on a reciprocating type internal combustion engine. During an operation of an internal combustion engine, an inertial force caused by a motion of a piston occurs. The balance device is configured to generate a vibration causing force for canceling out vibration caused by the inertial force. If the balance device properly cancels out the vibration, an internal combustion engine excellent in quietness can be realized.

Patent Literature 1 discloses a balance device for being mounted on a four-cylinder internal combustion engine. The balance device has a balance shaft to which an eccentric weight is attached. The balance shaft is connected to a crankshaft via unequal speed gears. When the crankshaft rotates during an operation of the internal combustion engine, the balance shaft rotates via the unequal speed gears.

At this time, the eccentric weight that is attached to the balance shaft periodically generates a vibration causing force in accordance with an angular velocity and an angular acceleration of the balance shaft. The angular velocity and the angular acceleration of the balance shaft changes with profiles corresponding to characteristics of the unequal speed gears. In Patent Literature 1, the unequal speed gears are formed so that a large vibration causing force is generated at a crank angle where vibration to be cancelled out is large. Consequently, according to the above described conventional balance device, vibration of the internal combustion engine can be effectively suppressed and excellent quietness can be realized.

LIST OF RELATED ART

Following is a list of patent literatures which the applicant has noticed as related arts of the present invention.
Patent Literature 1: JP 2010-169045 A

Problem to be Solved by Embodiments of the Invention

However, in the balance device described in Patent Literature 1, it is necessary to transmit rotation of the crankshaft to the balance shaft by the gears. Consequently, in an internal combustion engine in which a distance between the crankshaft and the balance shaft is long, the gears cannot help being increased in size. As a result, the balance device increases in size, and there arises a situation where reduction in size and weight of the internal combustion engine is hindered.

Embodiments of the present invention is made to solve the problem as described above, and has an object to provide a balance device that can effectively cancel out vibration of an internal combustion engine without hindering reduction in size and weight of the internal combustion engine.

SUMMARY

To achieve the above mentioned purpose, a first aspect of an embodiment of the present invention is a balance device for an internal combustion engine, comprising:
a crankshaft that rotates with a CS main shaft as a rotating shaft; and
a balance shaft that rotates with a BS axial shaft parallel with the CS main shaft as a rotating shaft,
wherein the crankshaft includes a CS eccentric weight that makes a center of gravity of the crankshaft eccentric from a center of the CS main shaft, and
the balance shaft includes a BS eccentric weight that makes a center of gravity of the balance shaft eccentric from a center of the BS axial shaft,
the balance device further comprising:
a connection rod that connects a CS connected point provided on the crankshaft at a position deviated from the center of the CS main shaft, and a BS connected point provided on the balance shaft at a position deviated from the center of the BS axial shaft;
a CS connection mechanism that enables relative rotation of the crankshaft and the connection rod with the CS connected point as a center of rotation;
a BS connection mechanism that enables relative rotation of the balance shaft and the connection rod with the BS connected point as a center of rotation; and
a guide section that guides a motion of the connection rod so that the balance shaft rotates in an opposite direction to a rotation direction of the crankshaft.

A second aspect of an embodiment of the present invention is the balance device for an internal combustion engine according to the first aspect discussed above, further comprising:
a connected point adjustment mechanism that enables at least one of the CS connected point and the BS connected point to displace in a direction of a radius of rotation of at least the one of the CS connected point and the BS connected point; and
a slide portion provided at one point of the connection rod,
wherein the guide section regulates a motion of the slide portion to a rectilinear motion in a direction from a side of the CS main shaft toward a side of the BS axial shaft, and a rectilinear motion in an opposite direction to the direction.

A third aspect of an embodiment of the present invention is the balance device for an internal combustion engine according to the first aspect discussed above, further comprising:
a connected point adjustment mechanism that enables at least one of the CS connected point and the BS connected point to displace in a direction of a radius of rotation of at least the one of the CS connected point and the BS connected point;
wherein the guide section can rotate within a same plane as a movable plane of the connection rod with a position overlying the connection rod as a center, and holds the connection rod slidably in a direction of a center line of the connection rod.

A fourth aspect of an embodiment of the present invention is the balance device for an internal combustion engine according to the first aspect discussed above, further comprising:

a restriction part provided in a middle point between the CS connected point and the BS connected point, of the connection rod, wherein a distance between the CS connected point and the BS connected point is equal to a distance between the CS main shaft and the BS axial shaft, a distance between the center of the CS main shaft and the CS connected point is equal to a distance between the center of the BS axial shaft and the BS connected point, and the guide section includes a BS side guide that inhibits the restriction part from displacing in a same rotation direction as the CS connected point, in a position where the restriction part makes closest approach to the BS axial shaft, and a CS side guide that inhibits the restriction part from displacing in a same rotation direction as the CS connected point in a position where the restriction part makes closest approach to the CS main shaft.

A fifth aspect of an embodiment of the present invention is the balance device for an internal combustion engine according to the second aspect discussed above wherein the crankshaft is used by a manner of an offset crank in which the center of the CS main shaft is set at a position that is offset by a fixed value from an axis line of a reciprocating motion of a piston, and the balance shaft and the guide section are disposed so that at least one of the center of the CS main shaft and the center of the BS axial shaft is placed at a position that is offset by a fixed value from an axis line of the rectilinear motion.

A sixth aspect of and embodiment of the present invention is the balance device for an internal combustion engine according to the fifth aspect discussed above, wherein a CS-BS center line connecting the center of the CS main shaft and the center of the BS axial shaft is offset by a fixed value from the axis line of the rectilinear motion.

A seventh aspect of an embodiment of the present invention is the balance device for an internal combustion engine according to the fifth aspect discussed above, wherein the center of the CS main shaft is located on the axis line of the rectilinear motion, and the center of the BS axial shaft is offset by a fixed value from the axis line of the rectilinear motion.

An eighth aspect of an embodiment of the present invention is the balance device for an internal combustion engine according to the fifth aspect discussed above, wherein the center of the BS axial shaft is located on the axis line of the rectilinear motion, and the center of the CS main shaft is offset by a fixed value from the axis line of the rectilinear motion.

A ninth aspect of an embodiment of the present invention is the balance device for an internal combustion engine according to the fifth aspect discussed above, wherein the center of the BS axial shaft is offset by a fixed value to one side from the axis line of the rectilinear motion, and the center of the CS main shaft is offset by a fixed value to the other side from the axis line of the rectilinear motion.

A tenth aspect of an embodiment of the present invention is the balance device for an internal combustion engine according to the third aspect discussed above, wherein the crankshaft is used by a manner of an offset crank in which the center of the CS main shaft is set at a position that is offset by a fixed value from a reciprocating motion of a piston, and a center of rotation of the guide section is offset by a fixed value from a CS-BS center line connecting the center of the CS main shaft and the center of the BS axial shaft.

A eleventh aspect of and embodiment of the present invention is the balance device for an internal combustion engine according to any one of the first to tenth aspects discussed above, wherein:

the CS connected point is provided at a same side as a center of gravity of the CS eccentric weight with respect to the center of the CS main shaft, and the BS connected point is provided at a same side as a center of gravity of the BS eccentric weight with respect to the center of the BS axial shaft.

A twelfth aspect of an embodiment of the present invention is the balance device for an internal combustion engine according to any one of the first to tenth aspects discussed above, wherein the CS connected point is provided at an opposite side from a center of gravity of the CS eccentric weight with respect to the center of the CS main shaft, and the BS connected point is provided at an opposite side of a center of gravity of the BS eccentric weight with respect to the center of the BS axial shaft.

A thirteenth aspect of an embodiment of the present invention is the balance device for an internal combustion engine according to any one of the first to twelfth aspects discussed above, further comprising:

a moment applying mechanism that applies to the balance shaft rotating moment in an opposite direction to a rotating direction of the crankshaft.

A fourteenth aspect of an embodiment of the present invention is the balance device for an internal combustion engine according to the thirteenth aspect discussed above, wherein the moment applying mechanism includes a cam that is provided to the balance shaft, and a spring member that is contracted by being pressed by the cam, and the cam is formed to press the spring member in a process of the connection rod moving to a side of the BS axial shaft with rotation of the balance shaft, and receive the rotating moment in the opposite direction from the spring member, in a position where an axis line of the connection rod overlies the BS axial shaft.

A fifteenth aspect of an embodiment of the present invention is the balance device for an internal combustion engine according to any one of the first to fourteenth aspect discussed above, wherein the balance device is mounted on a single-cylinder or four-cycle two-cylinder internal combustion engine.

A sixteenth aspect of and embodiment of the present invention is the balance device for an internal combustion engine according to any one of the first to fifteenth aspect discussed above, wherein the connection rod is disposed to be inclined from an axis line of a reciprocating motion of a piston at a top dead center and a bottom dead center of the internal combustion engine, the CS eccentric weight has the center of gravity in a region that is at an opposite side to the CS connected point, with a CS axis line that passes through the center of the CS main shaft and is parallel with the axis line of the piston therebetween, under a situation at the top dead center, and the BS eccentric weight has the center of gravity in a region that is at an opposite side to the BS connected point, with a BS axis line that passes through the center of the BS axial shaft and is parallel with the axis line of the piston therebetween, under a situation at the top dead center.

A seventeenth aspect of an embodiment of the present invention is the balance device for an internal combustion engine according to the sixteenth aspect discussed above, wherein the CS eccentric weight has the center of gravity and a weight of a magnitude that cancels out a resultant force of an vibration causing force caused by a conn-rod of the internal combustion engine, a part of an vibration causing force caused by the piston of the internal combustion engine, and a part of an vibration causing force caused by the connection rod, the BS eccentric weight has the center of gravity and a weight of a magnitude that cancels out a remaining part of the vibration causing force caused by the piston of the internal combustion engine and a remaining part of the vibration causing force caused by the connection rod, and said parts of an vibration causing force and said remaining parts of an vibration causing force are equal.

A eighteenth aspect of an embodiment of the present invention is the balance device for an internal combustion engine according to the seventeenth aspect discussed above, wherein the balance shaft is connected to the connection rod at one end of the balance shaft, and of the weight of the BS eccentric weight, a weight for canceling out the remaining part of the vibration causing force caused by the connection rod is reflected in a vicinity of the one end more greatly as compared with a vicinity of the other end of the balance shaft.

A nineteenth aspect of an embodiment of the present invention is the balance device for an internal combustion engine according to any one of the first to eighteenth aspects discussed above, wherein the connection rod has a CS side bearing at a side of the crankshaft, the CS connection mechanism has a CS side eccentric shaft that is rotatably held by the CS side bearing, the CS side eccentric shaft is fixed to the CS main shaft so that a CS eccentric point that is deviated by a fixed value from a center thereof coincides with the center of the CS main shaft, and the center of the CS side eccentric shaft configures the CS connected point.

A twentieth aspect of an embodiment of the present invention is the balance device for an internal combustion engine according to any one of the first to nineteenth aspects discussed above, wherein the connection rod has a BS side bearing at a side of the balance shaft, the BS connection mechanism has a BS side eccentric shaft that is rotatably held by the BS side bearing, the BS side eccentric shaft is fixed to the BS axial shaft so that a BS eccentric point that is deviated by a fixed value from a center thereof coincides with the center of the BS axial shaft, and the center of the BS side eccentric shaft configures the BS connected point.

Advantages of Embodiments of the Present Invention

According to the first aspect of the embodiment of the present invention, the crankshaft and the balance shaft rotate in opposite directions to each other. While the crankshaft and the balance shaft both rotate one turn, phases of the center of gravity of the crankshaft and the center of gravity of the balance shaft coincide with each other twice. Hereunder, a direction connecting two points that are in phase with each other will be referred to as "a Y-direction" and a direction perpendicular to the Y-direction will be referred to as "an X-direction". Further, the vibration causing force caused by the CS eccentric weight is referred to as "a CS vibration causing force", and the vibration causing force caused by the BS eccentric weight is referred to as "a BS vibration causing force". In a process of the crankshaft and the balance shaft rotating in the opposite directions, an X component of the CS vibration causing force and an X component of the BS vibration causing force work to cancel out each other. Meanwhile, Y components of these vibration causing forces are composited with each other and are intensified. Consequently, according to the first aspect discussed above, the vibration causing force can be generated mainly in the Y-direction. In an internal combustion engine, with a reciprocating motion of the piston, an inertial force to be the cause of vibration occurs in the reciprocating direction. According to the first aspect discussed above, by matching the Y-direction to the reciprocating direction, the inertial force of the piston can be canceled out by a resultant force of the CS vibration causing force and the BS vibration causing force.

In the first aspect discussed above, the CS eccentric weight rotates with the crankshaft. Consequently, the Y component of the CS vibration causing force changes in a sine wave shape with a change of the crank angle. Meanwhile, the BS eccentric weight rotates in the opposite direction to the crankshaft via the connection rod. In this case, the rotation of the BS eccentric weight inevitably becomes unequal speed rotation when the rotation of the crankshaft is equal speed rotation. The Y component of the BS vibration causing force shows a change in a distorted sine wave shape with respect to the change of the crank angle.

The inertial force caused by the reciprocating motion of the piston shows a change in a sine wave shape with respect to the rotation of the crankshaft when a ratio of a conn-rod length lc to a crank radius rc, that is, a connecting rod ratio lc/rc is infinity. At the practical connecting rod ratio lc/rc, the inertial force shows a change in a distorted sine wave shape with respect to the change of the crank angle. According to the first aspect discussed above, the Y component of the BS vibration causing force changes to a distorted sine wave shape, the resultant force of the CS vibration causing force and the BS vibration causing force can be matched with the inertial force caused by the reciprocating motion of the piston with high precision. Consequently, according to the first aspect discussed above, vibration of the internal combustion engine can be effectively suppressed.

In addition, the first aspect of the embodiment of the present invention can realize the above described effect by the connection rod and the guide section without using gears. The connection rod and the guide section can be formed to be lighter and to be housed in a small space as compared with gears. Consequently, according to the first aspect discussed above, vibration of the internal combustion engine can be effectively canceled out without hindering reduction in size and weight of the internal combustion engine.

According to the second aspect discussed above, the position of the slide portion on the connection rod is restricted to any of the points on the rectilinear motion allowed by the guide section. Hereunder, the direction of the straight line will be referred to as "a y-direction", and a direction orthogonal to the y-direction will be referred to as "an x-direction". When the crankshaft rotates, the CS connected point changes the position in the x-direction as well as the position in the y-direction. An x-coordinate of the slide portion is restrained, and therefore when the CS connected point moves in an x positive direction, the BS connected point inevitably moves in an x negative direction. Further, when the displacement direction of the CS connected point changes to the x negative direction from the x positive direction, the displacement direction of the BS connected point changes to the x positive direction from the x negative direction. At this occasion, the BS connected point always displaces in the same direction as the CS connected point with respect to the y-direction. As a result, the balance shaft rotates in the opposite direction to the crankshaft.

In the third aspect discussed above, the CS connected point and the BS connected point displace in the same direction in the y-direction, whereas in the x-direction, the CS connected point and the BS connected point displace in the opposite directions, as in the case of the second aspect. Consequently, according to the third aspect discussed above, the balance shaft following the rotation of the crankshaft can be rotated in the opposite direction to the crankshaft. Further, in the third aspect discussed above, a ratio BS/CS between the distance from the BS connected point to the guide section (hereunder, called "BS distance") and the distance from the CS connected point to the guide section (hereunder, called "CS distance") changes with rotation of the crankshaft. In the second aspect discussed above, the ratio is always constant. Based on the principle of leverage, as the above described ratio is larger, the rotation angle change of the balance shaft accompanying the change of the crank angle becomes larger. Consequently, according to the third aspect discussed above, the vibration causing force for canceling out the inertial force of the piston can be given a profile different from the case of the second aspect discussed above.

According to the fourth aspect discussed above, the restriction part of the connection rod makes the closest approach to the BS axial shaft under a situation where the center of the CS main shaft, the CS connected point, the restriction part, the center of the BS axial shaft and the BS connected point are aligned on one straight line. Hereunder, this position will be referred to as "a first change point". At the first change point, an axial force of the connection rod that works on the BS connected point produces no rotating moment. Consequently, if there is no restriction in the moving direction, the BS connected point can rotate in any direction from the first change point with change of the crank angle. When the BS connected point displaces in the same direction as the rotating direction of the crankshaft, the balance shaft rotates in the same direction as the crankshaft. In the fourth aspect discussed above, displacement in the above direction is inhibited by the restriction part of the connection rod and the BS side guide. Consequently, when the crank angle changes from the above described situation, the BS connected point displaces in the opposite direction to the rotating direction of the crankshaft. When the connected point is out of the first change point, the axial force of the connection rod that works on the BS connected point generates rotating moment. Consequently, the balance shaft continues reverse rotation with rotation of the crankshaft. When the crankshaft rotates 180 degree from the state of the first change point, a situation is formed, in which the center of the CS main shaft, the CS connected point, the restriction part, the center of the BS axial shaft, and the BS connected point are aligned on one straight line, in a state where the restriction part of the connection rod makes the closest approach to the CS main shaft. Hereunder, the position will be referred to as "a second change point". At the second change point, displacement of the restriction part is regulated by the CS side guide. As a result, at the second change point, the BS connected point is guided to the opposite direction to the rotating direction of the crankshaft. The above operation is repeated, whereby the balance shaft can be also continued to be rotated oppositely to the crankshaft via the connection rod by the fourth aspect discussed above.

According to any one of the fifth to ninth aspects discussed above, the crankshaft is used by the manner of the offset crank, so that an inertial force caused by the motion of the piston going from the top dead center to the bottom dead center, and an inertial force caused by the motion of the piston going from the bottom dead center to the top dead center become asymmetrical. If the slide portion of the connection portion would perform a reciprocating motion on a CS-BS center line which connects the center of the CS main shaft and the center of the BS axial shaft, the balance shaft would show symmetrical angular velocity profiles in a process of going from the top dead center side to the bottom dead center side and the process which is opposite thereto. In this way, the vibration causing forces which would be generated by the BS eccentric weight in an outward way and a return way would become symmetrical. On the contrast, in the any one of the fifth to ninth aspects discussed above, the rectilinear motion of the slide portion is guided onto the straight line that does not coincide with the CS-BS center line. In this case, distortion occurs to the angular velocity profile of the balance shaft, and the vibration causing forces which are generated in the outward way and the return way by the BS eccentric weight become asymmetrical. Consequently, according to any one of the fifth to ninth aspects discussed above, the vibration causing forces that become asymmetrical in the outward way and the return way can be generated, and the inertial force generated by the piston under the condition of the offset crank can be properly canceled out.

According to the tenth aspect discussed above, the inertial forces which are generated by the piston in the outward way and the return way are asymmetrical, as in the case of the ninth aspect discussed above. In the configuration in which the rotatable guide section holds the connection rod, if the center of rotation would be set on the CS-BS center line, the angular velocity profiles of the balance shaft in the outward way and the return way would become symmetrical, and as a result, the vibration causing forces generated by the BS eccentric weight in the outward way and the return way would also become symmetrical. In contrast with this, with the center of the rotation of the guide section being out of the CS-BS center line, the vibration causing forces that are generated by the BS eccentric weight in the outward way and the return way become asymmetrical. Consequently, according to the tenth aspect discussed above, the inertial force generated by the piston can be properly canceled out under the condition of the offset crank.

According to the eleventh aspect discussed above, by synchronizing the rotation phase of the CS eccentric weight and the rotation phase of the BS eccentric weight with each other, the vibration causing force that changes along a desired profile can be generated in the Y-direction.

According to the twelfth aspect discussed above, by synchronizing the rotation phase of the CS eccentric weight and the rotation phase of the BS eccentric weight with each other, the vibration causing force that changes along a profile different from the profile which is realized in the eleventh aspect discussed above can be generated in the Y-direction.

In the thirteenth aspect discussed above, the balance shaft is given rotating moment via the connection rod. In this configuration, in a change point where the axis line of the connection rod overlies the center of rotation of the balance shaft, the axial force of the connection rod applies no rotating moment to the balance shaft. Consequently, if the external force which is applied to the balance shaft would be only the axial force of the connection rod, the balance shaft would be in a state where the balance shaft could rotate in both the normal and reverse directions at the change point. In the thirteenth aspect discussed above, moment of the reverse rotation is applied to the balance shaft by the moment applying mechanism. Consequently, according to the thirteenth aspect discussed above, the balance shaft can be continued to be stably rotated in the opposite direction to the rotating direction of the crankshaft.

According to the fourteenth aspect discussed above, suitable rotating moment can be applied to the balance shaft at the change point, by the cam and the spring member.

According to the fifteenth aspect discussed above, the internal combustion engine includes one piston that operates singularly, or two pistons that operate in the same phase. In the internal combustion engine, the pistons do not mutually cancel out the inertial forces of the reciprocating motions. According to the fifteenth aspect discussed above, vibration of the internal combustion engine can be properly suppressed by the vibration causing force generated by the balance device.

According to the sixteenth aspect discussed above, under the situation at the top dead center, the piston and the conn-rod generate the vibration causing forces in a reference direction which extends along the axis line of the reciprocating motion of the piston. At this occasion, the connection rod applies vibration causing force to the CS eccentric weight in a first inclination direction which extends substantially from the center of the CS main shaft to the CS connected point, whereas also applying vibration causing force to the BS eccentric weight in a second inclination direction which extends substantially from the center of the BS axial shaft to the BS connected point. The resultant force of the above vibration causing forces has components toward the first inclination direction and the second inclination direction, in addition to a component toward the above described reference direction. In the sixteenth aspect discussed above, the center of gravity of the CS eccentric weight is provided at an opposite side of the CS connected point with the CS axis line therebetween. According to the center of gravity, the vibration causing force component in the first inclination direction can be canceled out in addition to the vibration causing force component in the reference direction. Further, in the sixteenth aspect discussed above, the center of gravity of the BS eccentric weight is provided at the opposite side of the BS connected point with the BS axis line therebetween. According to the center of gravity, the vibration causing force component in the second inclination direction can be cancelled out in addition to the vibration causing force component in the reference direction. At the bottom dead center of the internal combustion engine, canceling of the vibration causing forces occurs based on the similar principle. Consequently, according to the sixteenth aspect discussed above, the vibration causing forces that are respectively generated by the piston, the conn-rod and the connection rod can be properly canceled out.

According to the seventeenth aspect discussed above, at the top dead center and the bottom dead center of the internal combustion engine, the vibration causing forces caused by the CS eccentric weight and the BS eccentric weight can be balanced with the vibration causing forces caused by the conn-rod, the piston and the connection rod. Further, under the situation except for the top dead center and the bottom dead center, the vibration causing forces caused by the conn-rod and the BS eccentric weight can be balanced with the vibration causing force caused by the CS eccentric weight. Consequently, according to the seventeenth aspect discussed above, the vibration causing forces caused by the individual elements can be always canceled out favorably.

According to the eighteenth aspect discussed above, the vibration causing force caused by the connection rod is inputted to the one end of the balance shaft. The BS eccentric weight provided to the balance shaft can cancel out the above vibration causing force by the weight significantly reflected in the vicinity of the one end. As the input spot of the vibration causing force and the spot of the weight for canceling out the vibration causing force are farther away, the moment that works on the balance shaft becomes larger. According to the eighteenth aspect discussed above, the vibration causing forces can be canceled out by the respective elements while the moment is suppressed to be sufficiently small.

According to the nineteenth aspect discussed above, the connection rod and the CS main shaft can be connected by the CS side eccentric shaft. According to the structure, the crankshaft and the connection rod can relatively rotate with the center of the CS side bearing provided in the connection rod as the center of rotation. That is, "the CS connected point" in the first aspect discussed above can be formed in the center of the CS side bearing. Further, according to the CS side eccentric shaft, the center of the CS main shaft can be made eccentric by a predetermined value from the center of the CS side bearing, that is, the CS connected point. In this way, according to the nineteenth aspect discussed above, the "CS connection mechanism" that satisfies the function required by the first aspect discussed above can be specifically realized.

According to the twentieth embodiment, the connection rod and the BS axial shaft can be connected by the BS side eccentric shaft. According to the structure, the balance shaft and the connection rod can relatively rotate with the center of the BS side bearing provided in the connection rod as the center of rotation. That is, the "BS connected point" in the first aspect discussed above can be formed in the center of the BS side bearing. Further, according to the BS side eccentric shaft, the center of the BS axial shaft can be made eccentric by a fixed value from the center of the BS side bearing, that is, the BS connected point. In this way, according to the twentieth aspect discussed above, the "BS connection mechanism" that satisfies the function which is required by the first aspect discussed above can be specifically realized.

BRIEF DESCRIPTION OF THE DRAWINGS

FIG. 20 is a diagram for explaining an operation of the balance device shown in FIG. 19;

FIG. 63 is a side sectional view of the main section of the balance device according to the eleventh embodiment of the present invention;

FIG. 64 is a diagram showing that an eccentric amount occurring to a BS side eccentric shaft can be changed in the eleventh embodiment of the present invention;

DETAILED DESCRIPTION

First Embodiment

Configuration of First Embodiment

Figure 1:
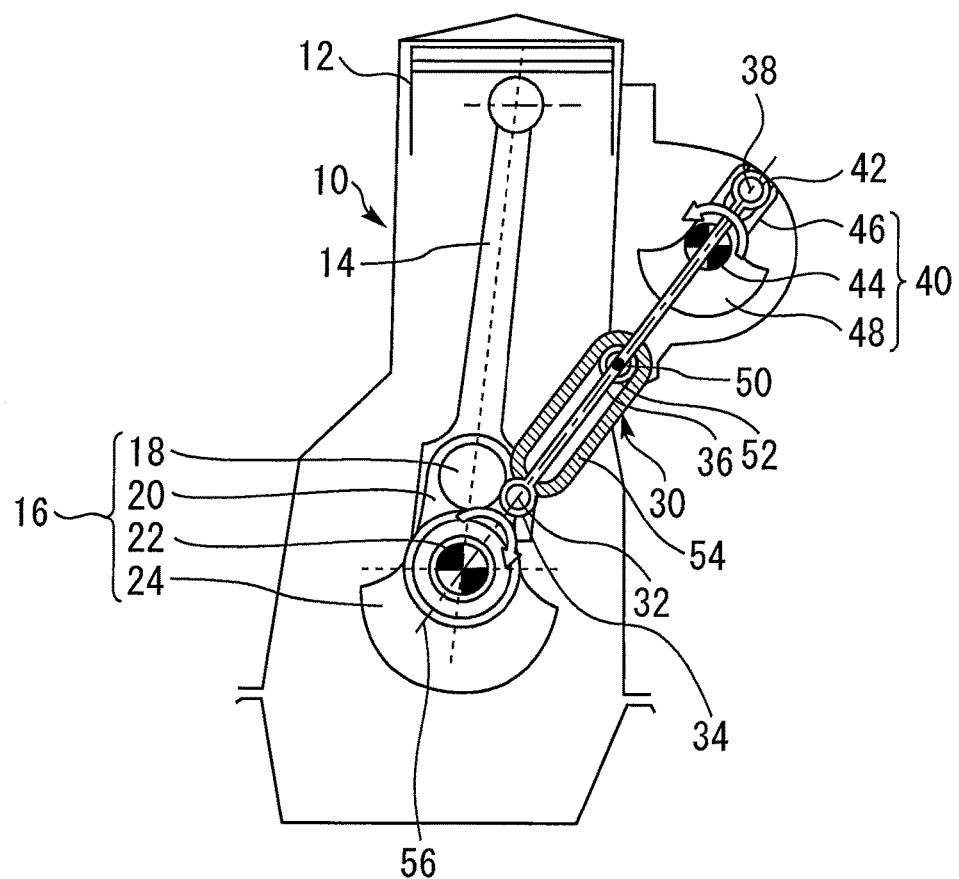
FIG. 1 is a view for explaining a configuration of a first embodiment of the present invention.

FIG. 1 is a view for explaining a configuration of a first embodiment of the present invention. The present embodiment includes an internal combustion engine 10. The internal combustion engine 10 has a piston 12. In the present embodiment, the internal combustion engine 10 is a single-cylinder four-cycle engine including the only one piston 12.

The piston 12 is connected to a crankshaft 16 via a conn-rod 14 (hereunder, referred to as "conn-rod 14"). The crankshaft 16 includes a crankpin 18 that is connected to the conn-rod 14. The crankpin 18 is formed integrally with a crank journal (hereunder, referred to as a "CS main shaft") 22 via a crank arm 20. The CS main shaft 22 is rotatably held by a bearing provided in a cylinder block.

The crankshaft 16 includes a CS eccentric weight 24. The CS eccentric weight 24 is provided so that a center of gravity thereof is located at a substantially opposite side of the crankpin 18 with a center of the CS main shaft 22 therebetween. Further, the CS eccentric weight 24 is given a weight (mc) for canceling off a weight of the conn-rod 14, and a weight for canceling off a weight (mp/2) corresponding to a half of a weight of the piston 12.

The crankshaft 16 makes one rotation while the piston 12 makes one reciprocation between a top dead center and a bottom dead center. Hereunder, a direction of a reciprocating motion of the piston 12 is referred to as "a Y-direction", and a direction orthogonal to the "Y-direction" will be referred to as "an X-direction".

In the present embodiment, the CS eccentric weight 24 is set so that a phase difference of a substantially 180° crank angle (° CA) occurs from the piston 12. That is, a phase of the CS eccentric weight 24 is set so that two conditions as follows are established:

(1) When the piston 12 is located at the top dead center, the center of gravity of the CS eccentric weight 24 is located substantially at a bottom dead center side movable end in the Y-direction;

(2) When the piston 12 is located at the bottom dead center, the center of gravity of the CS eccentric weight 24 is located substantially at a top dead center side movable end in the Y-direction.

The internal combustion engine 10 includes a balance device 30. The crankshaft 16 is a component of the balance device 30. The crankshaft 16 is provided with a CS connected point 32 in a position deviating from a center of the CS main shaft 22. More specifically, the CS connected point 32 is provided at an opposite side of the CS eccentric weight 24 with the center of the CS main shaft 22 therebetween.

A connection rod 36 is connected to the CS connected point 32 via a CS connection mechanism 34. The connection rod 36 is rotatably held by the CS connection mechanism 34. Consequently, the crankshaft 16 and the connection rod 36 can relatively rotate within a plane parallel with a rotation surface of the crankshaft 16 with the CS connected point 32 as a center of rotation.

The other end of the connection rod 36 is connected to a balance shaft 40 in a BS connected point 38. The balance shaft 40 includes a BS connection mechanism 42 at the BS connected point 38. The connection rod 36 is rotatably held by the BS connection mechanism 42. Consequently, the connection rod 36 and the balance shaft 40 can relatively rotate with the BS connected point 38 as a center of rotation.

The balance shaft 40 includes a BS axial shaft 44 at a position deviated from the BS connected point 38. The BS axial shaft 44 is provided parallel with the CS main shaft 22, and is rotatably held by a bearing included by the cylinder block. Consequently, the balance shaft 40 can rotate within a plane that is parallel with the rotation surface of the crankshaft 16 with the BS axial shaft 44 as a rotating shaft.

The balance shaft 40 is provided with a BS connected point adjustment mechanism 46 that holds the BS connection mechanism 42. The BS connected point adjustment mechanism 46 is provided so that a position of the BS connection mechanism 42 on the balance shaft 40, that is, a position of the BS connected point 38 is passively adjusted to a correct position. By a function of the BS connected point adjustment mechanism 46, the BS connected point 38 can displace within a fixed range in a direction of a radius of rotation of the balance shaft 40 that passes through the BS axial shaft 44.

The balance shaft 40 is further provided with a BS eccentric weight 48. The BS eccentric weight 48 is provided so that a center of gravity thereof is located at an opposite side of the BS connected point 38 with a center of the BS axial shaft 44 therebetween. Further, the BS eccentric weight 48 is given a weight for cancelling out the weight (mp/2) substantially corresponding to a half the weight of the piston 12.

In the present embodiment, at a time of the crankshaft 16 makes one rotation, the balance shaft 40 makes one rotation in an opposite direction to that of the crankshaft 16. Here, as illustrated in FIG. 1, the BS eccentric weight 48 is provided so as to be synchronized in phase with the CS eccentric weight 24. That is, a phase of the BS eccentric weight 48 shifts from the phase of the piston 12 by substantially 180° CA similarly to the phase of the CS eccentric weight 24. Consequently, two conditions described as follows are also established between the phase of the BS eccentric weight 48 and the phase of the piston 12:

(1) When the piston 12 is located at the top dead center, a center of gravity of the BS eccentric weight 48 is located substantially at a bottom dead center side movable end in the Y-direction;

(2) When the piston 12 is located at the bottom dead center, the center of gravity of the BS eccentric weight 48 is located substantially at a top dead center side movable end in the Y-direction.

The connection rod 36 includes a pivot 50 in a middle point thereof. A circular slide portion 52 is fitted to the pivot 50. The cylinder block is provided with a guide section 54 that regulates movement of the slide portion 52. The guide section 54 has a slide space having a longitudinal ldirection in a direction of a CS-BS center line 56 which passes through the center of the CS main shaft 22 and the center of the BS axial shaft 44. The slide portion 52 can move along an inner wall of the slide space. As a result, motion of the pivot 50 is limited to a rectilinear motion on the CS-BS center line 56.

[Explanation of Basic Operation of Balance Device of First Embodiment]

Figure 2:
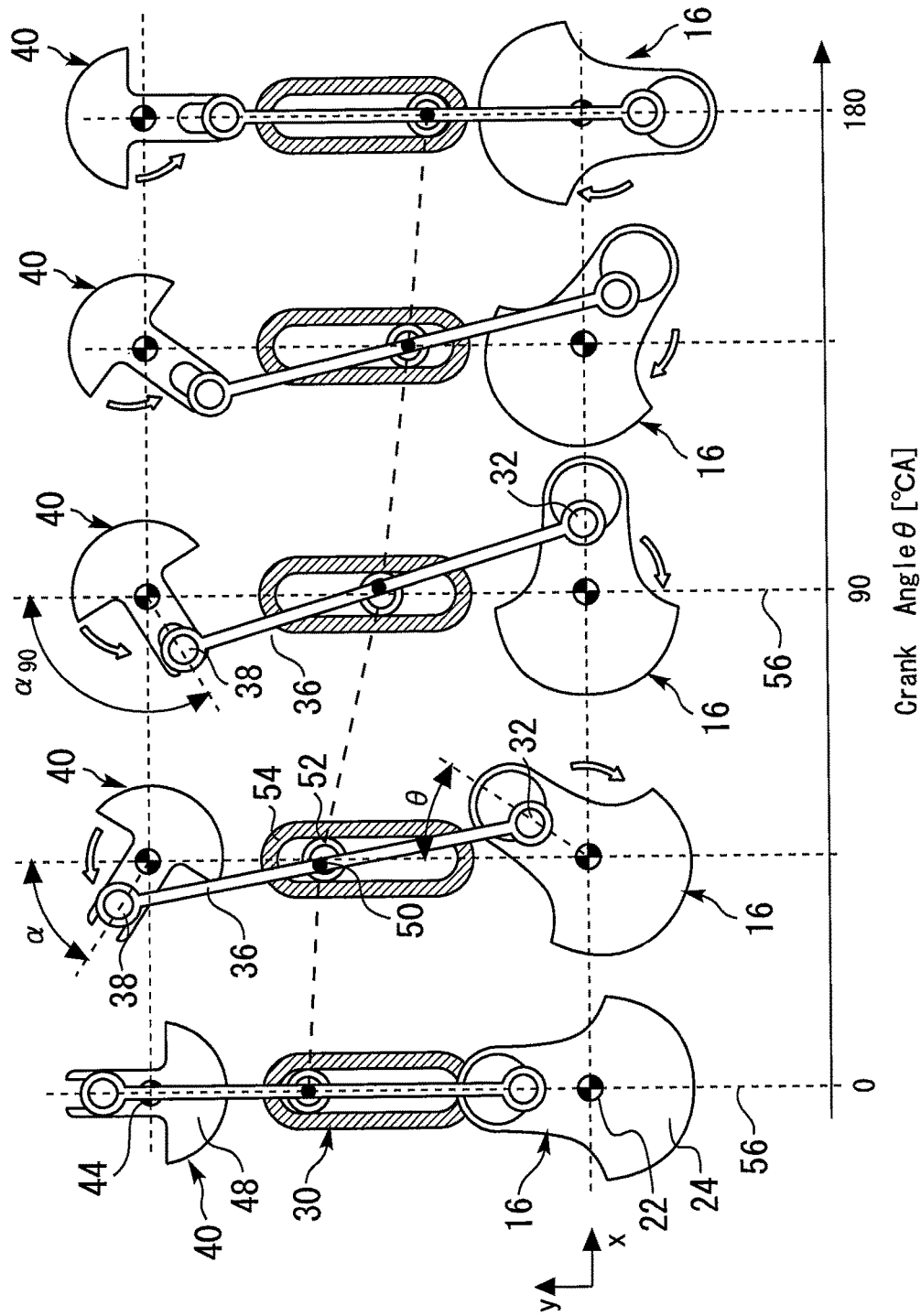
FIG. 2 is a diagram for explaining a relation between a state of the balance device shown in FIG. 1 and a crank angle θ.

FIG. 2 is a diagram for explaining an operation of the balance device 30 illustrated in FIG. 1. In FIG. 2, a horizontal axis represents a crank angle θ[° CA]. Hereunder, the crank angle θ of 0[° CA] or 360[° CA] corresponds to a top dead center, and a crank angle θ of 180[° CA] corresponds to a bottom dead center. Further, a direction of the CS-BS center line 56 is set as a [y-direction], and a direction orthogonal to the [y-direction] is set as an [x-direction]. Note that, in FIG. 2, for convenience of explanation, the y-direction is shown so as to correspond to the Y-direction (the moving direction of the piston 12).

In FIG. 2, in a state of θ=0[° CA], a rotation angle α of the balance shaft 40 (hereunder, referred to as a "BS rotation angle α") is also 0 [deg]. At this time, the center of gravity of the CS eccentric weight 24 and the center of gravity of the BS eccentric weight 48 are both located at the bottom dead center side movable ends.

In FIG. 2, the crankshaft 16 is assumed to rotate in a clockwise direction. When the crankshaft 16 rotates from the state of θ=0[° CA], the CS connected point 32 displaces in a direction of (an x positive direction, a y negative direction). At this time, an x-coordinate of the pivot 50 is always kept at an original point by the guide section 54. Consequently, the BS connected point 38 displaces in a direction of (an x negative direction, the y negative direction). As a result, the balance shaft 40 rotates in an opposite direction to the rotating direction of the crankshaft 16.

Until θ reaches 90[° CA], the CS connected point 32 continues to displace in the direction of (the x positive direction, the y negative direction). When an x-coordinate of the BS connected point 38 changes by a same distance as an x-coordinate of the CS connected point 32 at this time, that is, when the connection rod 36 keeps a vertical state in FIG. 2, a y-coordinate of the BS connected point 38 displaces by an equivalent distance to a y-coordinate of the CS connected point 32. However, in the balance device 30, the CS connected point 32 and the BS connected point 38 move away from each other in the x-direction until θ reaches 90[° CA]. In order to compensate for a distance in the x-direction, the y-coordinate of the BS connected point 38 cannot help displacing greatly from the y-coordinate of the CS connected point 32. As a result, at a stage at which the crankshaft 16 rotates 90[° CA], the BS rotation angle α exceeds 90 [deg].

Until the crank angle θ exceeds 90[° CA] to reach 180[° CA], the CS connected point 32 changes in a direction of (the x negative direction, the y negative direction). At this time, the BS connected point 38 displaces in a direction of (the x positive direction, the y negative direction). Here, the CS connected point 32 and the BS connected point 38 approach each other in the x-direction with increase of the crank angle θ. Consequently, a change of the y-coordinate of the BS connected point 38 is smaller than a change of the y-coordinate of the CS connected point 32. Then, at a stage at which the crank angle θ reaches 180[° CA], the BS rotation angle α similarly reaches 180 [deg].

For the above described reason, the balance shaft 40 rotates at a higher speed than the crankshaft 16 in a process of the crank angle θ changing from 0[° CA] to 90[° CA]. Subsequently, a rotational speed of the balance shaft 40 is lower than a rotational speed of the crankshaft 16 in a process of the crank angle θ changing from 90[° CA] to 180[° CA]. A speed change like this also occurs when the crank angle θ changes from 180[° CA] to 360[° CA] by a similar mechanism.

As described above, the balance device 30 in the present embodiment has characteristics as follows:

(1) The crankshaft 16 and the balance shaft 40 rotate in opposite directions at the same cycle;

(2) When the crankshaft 16 rotates at an equal speed, unequal speed rotation occurs to the balance shaft 40. On this occasion, the rotational speed of the balance shaft 40 is higher than the rotational speed of the crankshaft 16 when the crank angle θ belongs to a range of 0[° CA] to 90[° CA] and a range of 270[° CA] to 360[° CA]. Further, when the crank angle θ belongs to a range of 90[° CA] to 270[° CA], the rotational speed of the balance shaft 40 is lower than the rotational speed of the crankshaft 16.

(3) In the state of the crank angle θ=0[° CA], that is, in a state where the piston 12 is located at the top dead center, the center of gravity of the crankshaft 16 and the center of gravity of the balance shaft 40 are both located at the movable end at the bottom dead center. Further, in a state of the crank angle θ=180[° CA], that is, in a state where the piston 12 is located at the bottom dead center, the center of gravity of the crankshaft 16 and the center of gravity of the balance shaft 40 are both located at the movable end at the top dead center side.

During an operation of the internal combustion engine 10, a reciprocating motion occurs to the piston 12, and rotational motions occur to the crankshaft 16 and the balance shaft 40. At this time, a composite motion of a reciprocating motion and a rotational motion occurs to the conn-rod 14. A main weight of the conn-rod 14 exists in a portion that rotates with the crankpin 18. Consequently, in a weight (mc+mp/2) of the crankshaft 16, (mc) is cancelled out by the rotational portion of the conn-rod 14. Accordingly, during an operation of the internal combustion engine 10, it can be regarded that motion as follows occurs to an inside of the internal combustion engine.

(1) Y-direction reciprocating motion of the weight (mp) due to the motion of the piston 12
(2) Normal rotation motion of an eccentric weight (mp/2) due to rotation of the crankshaft 16
(3) Reverse rotation motion of an eccentric weight (mp/2) due to rotation of the balance shaft 40.

The Y-direction reciprocating motion of the weight (mp) generates an inertial force in the Y-direction. The inertial force changes in magnitude synchronously with the motion of the piston 12, reaches a substantially negative maximum value in the top dead center, and reaches a substantially positive maximum value in the bottom dead center.

The normal rotation motion of the eccentric weight (mp/2) and the reverse rotation motion of the eccentric weight (mp/2) generate vibration causing forces directing outward of respective rotation radiuses. X components of the vibration causing forces are cancelled out by each other, and Y components are combined. The combined vibration causing force Y components cancel out the inertial force accompanying the motion of the piston. Consequently, according to the balance device 30 in the present embodiment, vibration in the operation of the internal combustion engine 10 can be suppressed to be sufficiently small.

[Detailed Operation Explanation of Balance Device of First Embodiment]

Figure 3:
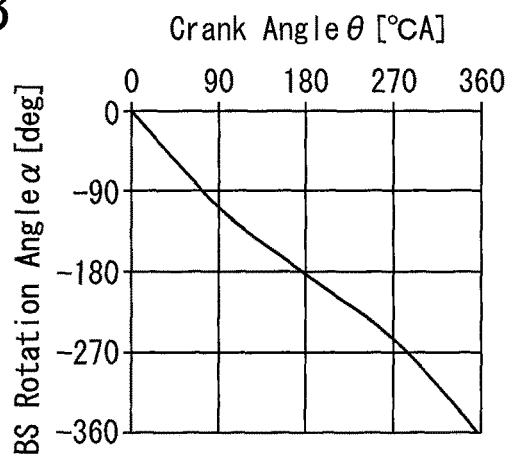
FIG. 3 is a diagram illustrating a relation between a crank angle θ and a BS rotation angle α in the balance device shown in FIG. 1.

FIG. 3 illustrates a relation that is established between the crank angle θ and the BS rotation angle α in the present embodiment. FIG. 3 shows a state where the aforementioned unequal speed rotation occurs to the balance shaft 40 with rotation of the crankshaft 16.

Figure 4:
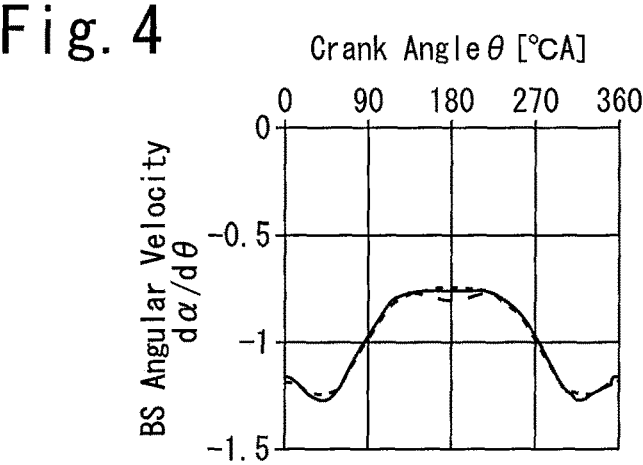
FIG. 4 is a diagram illustrating a relation between a crank angle θ and a BS angular velocity dα/dθ in the balance device shown in FIG. 1.

FIG. 4 is a diagram in which the BS rotation angle α illustrated in FIG. 3 is replaced with a BS angular velocity dα/dθ. When the balance shaft 40 rotates oppositely at an equal speed to the crankshaft 16, the BS angular velocity dα/dθ is always −1. In contrast with this, in the present embodiment, the BS angular velocity dα/dθ has a value with a large absolute value in a vicinity of the top dead center, due to the unequal speed rotation of the balance shaft 40. Further, in a vicinity of the bottom dead center, the BS angular velocity dα/dθ has a value with a small absolute value.

Figure 5:
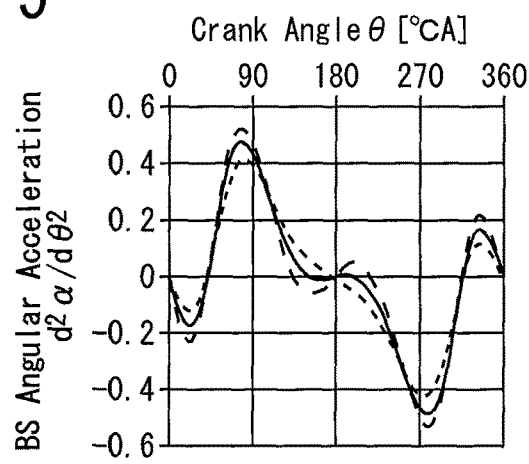
FIG. 5 is a diagram illustrating a relation between a crank angle θ and a BS angular acceleration d2α/dθ2 in the balance device shown in FIG. 1.

FIG. 5 is a diagram in which the BS angular velocity dα/dθ illustrated in FIG. 4 is further replaced with a BS angular acceleration d2α/dθ2. When the rotational speed of the balance shaft 40 is equal to the rotational speed of the crankshaft 16, the BS angular acceleration d2α/dθ2 is always zero. In contrast with this, in the present embodiment, the BS angular acceleration d2α/dθ2 has a value with a large absolute value in a vicinity of a middle of the top dead center and the bottom dead center, due to the unequal speed rotation of the balance shaft 40.

A centrifugal force that is proportional to a square of the angular velocity works on the balance shaft 40. Further, when an angular acceleration occurs to the balance shaft 40, a reaction force of the angular acceleration works on the balance shaft 40. The balance shaft 40 generates a vibration causing force corresponding to a composite value of the aforementioned centrifugal force and reaction force. Consequently, the vibration causing force which is generated by the balance shaft 40 in the present embodiment is distorted comparing to the vibration causing force which is generated by the crankshaft 16.

Figure 6:
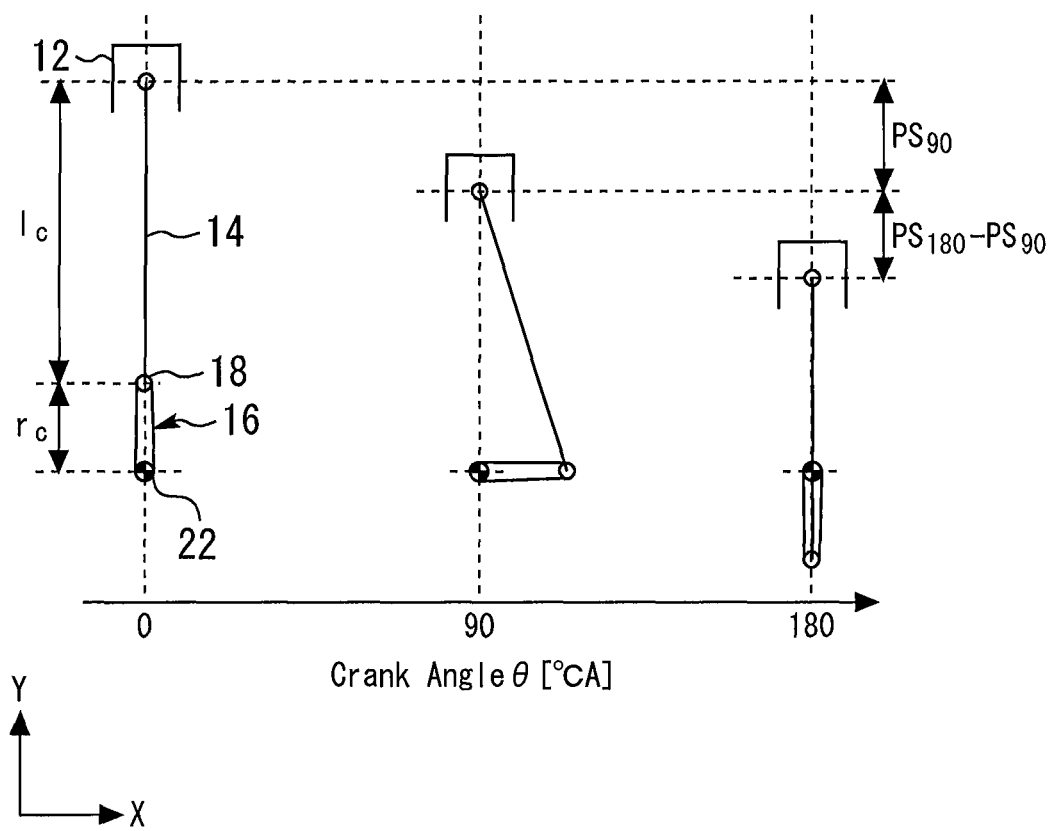
FIG. 6 is a diagram for explaining a relation between operation of a piston and a crank angle θ in the balance device shown in FIG. 1.

FIG. 6 is a diagram for explaining the motion of the piston 12 with respect to a change in the crank angle θ. In the internal combustion engine 10, the piston 12 is connected to the CS main shaft 22 via the crankshaft 16 and the conn-rod 14. Here, a conn-rod length is set as lc, and a crank radius is set as rc. Further, a ratio of the corm-rod length and the crank radius, that is, a connecting rod ratio is expressed by lc/rc.

As illustrated in FIG. 6, in a process of the crank angle θ changing from 0[° CA] to 90[° CA], coordinates of the crankpin 18 displaces in a direction of (the X positive direction, the Y negative direction). Since the X-coordinate of the piston 12 is fixed, the crankpin 18 moves away from the piston 12 in the X-direction in this process. In order to compensate a distance in the X-direction, the Y-coordinate of the piston 12 cannot help displacing more greatly as compared with the Y-coordinate of the crankpin 18. Consequently, a stroke PS90 that occurs to the piston 12 at a time of the crank angle θ changing from 0[° CA] to 90[° CA] is larger than a displacement amount in the Y-direction that occurs to the crankpin 18 during that time.

In a process of the crank angle θ changing to 180[° CA] from 90[° CA], the coordinates of the crankpin 18 displaces in a direction of (the X negative direction, the Y negative direction). In this process, the crankpin 18 approaches the piston 12 in the X-direction. Since both the crankpin 18 and the piston 12 approach each other in the X-direction, the Y-direction displacement amount of the piston 12 becomes smaller as compared with the Y-direction displacement amount of the crankpin 18. Consequently, the piston displacement amount (PS180-PS90) at the time of the crank angle θ changing from 90[° CA] to 180[° CA] becomes smaller than the aforementioned PS90. A similar change of the displacement amount occurs when the piston 12 displaces from the bottom dead center side to the top dead center side. For the above reason, in the case of the crankshaft 16 performing equal speed rotation, a displacement speed of the piston 12 becomes relatively high in the vicinity of the top dead center, and becomes relatively low in the vicinity of the bottom dead center.

Figure 7:
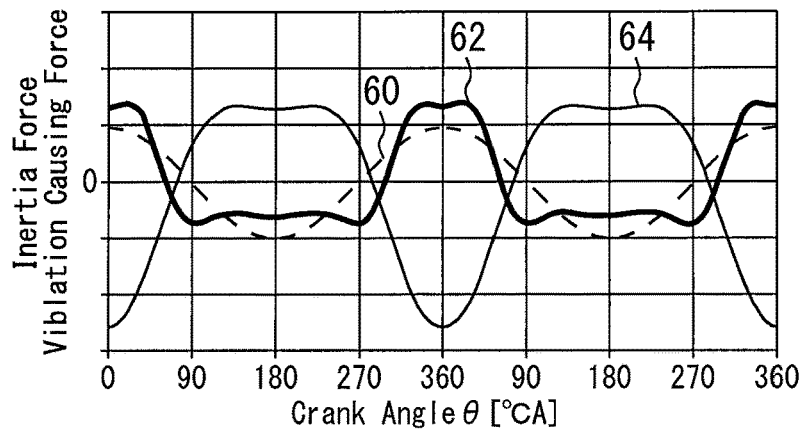
FIG. 7 illustrates profiles of an inertial force generated by a piston of an internal combustion engine and a vibration causing force generated by the balance device shown in FIG. 1.

FIG. 7 illustrates profiles of the inertial force generated by the piston 12 and the vibration causing force generated by the balance device 30. Waveforms 60, 62, and 64 are respectively profiles of forces described as follows.

Waveform 60: Y component of a vibration causing force generated by the eccentric weight (mp/2) of the crankshaft 16

Waveform 62: Y component of a vibration causing force generated by the eccentric weight (mp/2) of the balance shaft 40

Waveform 64: inertial force generated by the piston 12

The crankshaft 16 causes the eccentric weight (mp/2) to perform equal speed rotation. Consequently, the waveform 60 corresponding to the vibration causing force of the crankshaft 16 is a sine wave with substantially no distortion.

The balance shaft 40 causes the eccentric weight (mp/2) to perform unequal speed rotation fast in a process from the top dead center to a middle point, and slowly in a process from the middle point to the bottom dead center. Consequently, the waveform 62 corresponding to the balance shaft 40 is in a distorted sine wave shape having shoulders in a vicinity of 90[° CA] and in a vicinity of 270[° CA].

The piston 12 generates an inertial force corresponding to a displacement speed thereof. The displacement speed of the piston 12 becomes high in the vicinity of the top dead center, and becomes low in the vicinity of the bottom dead center as described above. Consequently, the waveform 64 corresponding to the piston 12 is in a distorted sine wave shape that has peaks at 0[° CA] or 360[° CA] at the top dead center side, but does not have a peak in the vicinity of 180[° CA] at the bottom dead center side.

Figure 8:
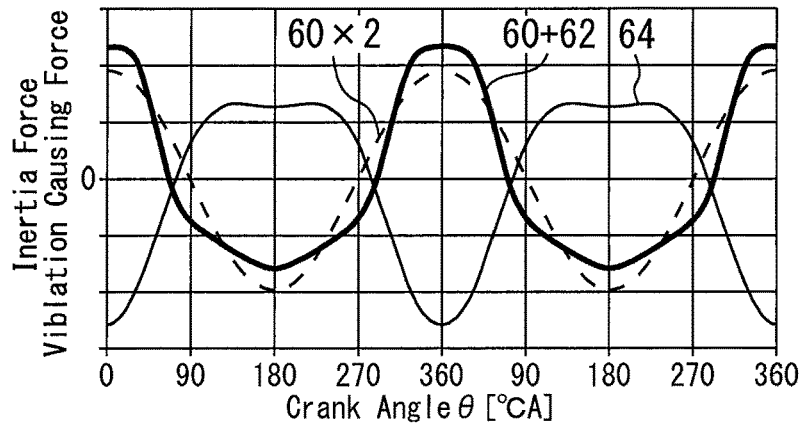
FIG. 8 is a diagram showing a resultant vibration causing force obtained by compositing the vibration causing force generated by a crankshaft and the vibration causing force generated by a balance shaft, both of which being shown in FIG. 7.

FIG. 8 is a diagram showing the inertial force of the piston 12 with a vibration causing force obtained by compositing a vibration causing force Y component generated by the crankshaft 16 and a vibration causing force Y component generated by the balance shaft 40. Three kinds of waveforms illustrated in FIG. 8 are respectively as described as follows.

Waveform 60×2: corresponding to twice as large as the vibration causing force of the waveform 60 illustrated in FIG. 7

Waveform 60+62: corresponding to the composite of the waveform 60 and the waveform 62 illustrated in FIG. 7

Waveform 64: the same as the waveform 64 illustrated in FIG. 7

In the present embodiment, rotation of the crankshaft 16 is transmitted to the balance shaft 40 via the connection rod 36. In contrast with this, rotation of the crankshaft 16 can be also transmitted to the balance shaft 40 by using an ordinary gear mechanism in a perfect circle shape, for example. In this case, the balance shaft 40 would rotate at an equal speed to a speed of the crankshaft 16, and the vibration causing force Y component of the balance shaft 40 would change along a sine wave having no distortion as same as the waveform 60. Accordingly, in this case, a resultant force of the vibration causing force Y components generated by both of the crankshaft 16 and the balance shaft 40 would correspond to what is obtained by doubling the vibration causing force of the waveform 60. That is, the resultant force would correspond to the waveform 60×2 illustrated in FIG. 8.

The waveform 60 does not include distortion. Consequently, even when the waveform 60 is composited with the waveform 60, the resultant waveform 60×2 does not become close to the waveform 64 of the inertial force of the piston 12 so much. In contrast with this, the waveform 60+62 generated by compositing the waveform 60 with the waveform 62 is relatively flat in the vicinity of the bottom dead center, and has a peak-like rise in the vicinity of the top dead center. The waveform 60+62 is much closer to a symmetrical shape of the waveform 64, as compared with the waveform 60×2.

Figure 9:
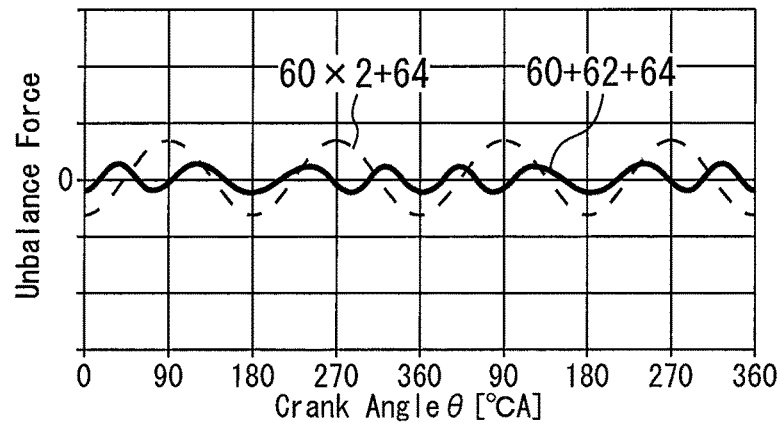
FIG. 9 is a diagram showing a resultant force obtained by compositing the inertial force generated by the piston and the resultant vibration causing force, both of which being shown in FIG. 8.

FIG. 9 illustrates waveforms generated by further compositing the waveform 60×2 and the waveform 60+62 with the waveform 64 illustrated in FIG. 8, respectively. Meanings of the respective waveforms are described as follows.

Waveform 60×2+64: unbalance force remaining in the internal combustion engine 10 when the balance shaft 40 is operated with a gear mechanism Waveform 60+62+64: unbalance force remaining in the internal combustion engine 10 in the present embodiment As shown by the waveform 60+62+64, the unbalance force remaining in the internal combustion engine 10 in the present embodiment is sufficient small in an entire region of the crank angle θ. The unbalance force is sufficiently small as compared with the unbalance force in the case of the balance shaft 40 being rotated at an equal speed with the gear mechanism (the waveform 60×2+64).

The connection rod 36 used in the present embodiment can be formed to be much lighter and compacter as compared with a gear mechanism. Consequently, the configuration of the present embodiment is more advantageous in reduction in size and weight of the internal combustion engine 10, and can give more excellent quietness to the internal combustion engine 10, as compared with the case of rotating the balance shaft 40 by using a gear mechanism.

Modification Example of First Embodiment

Figure 10:
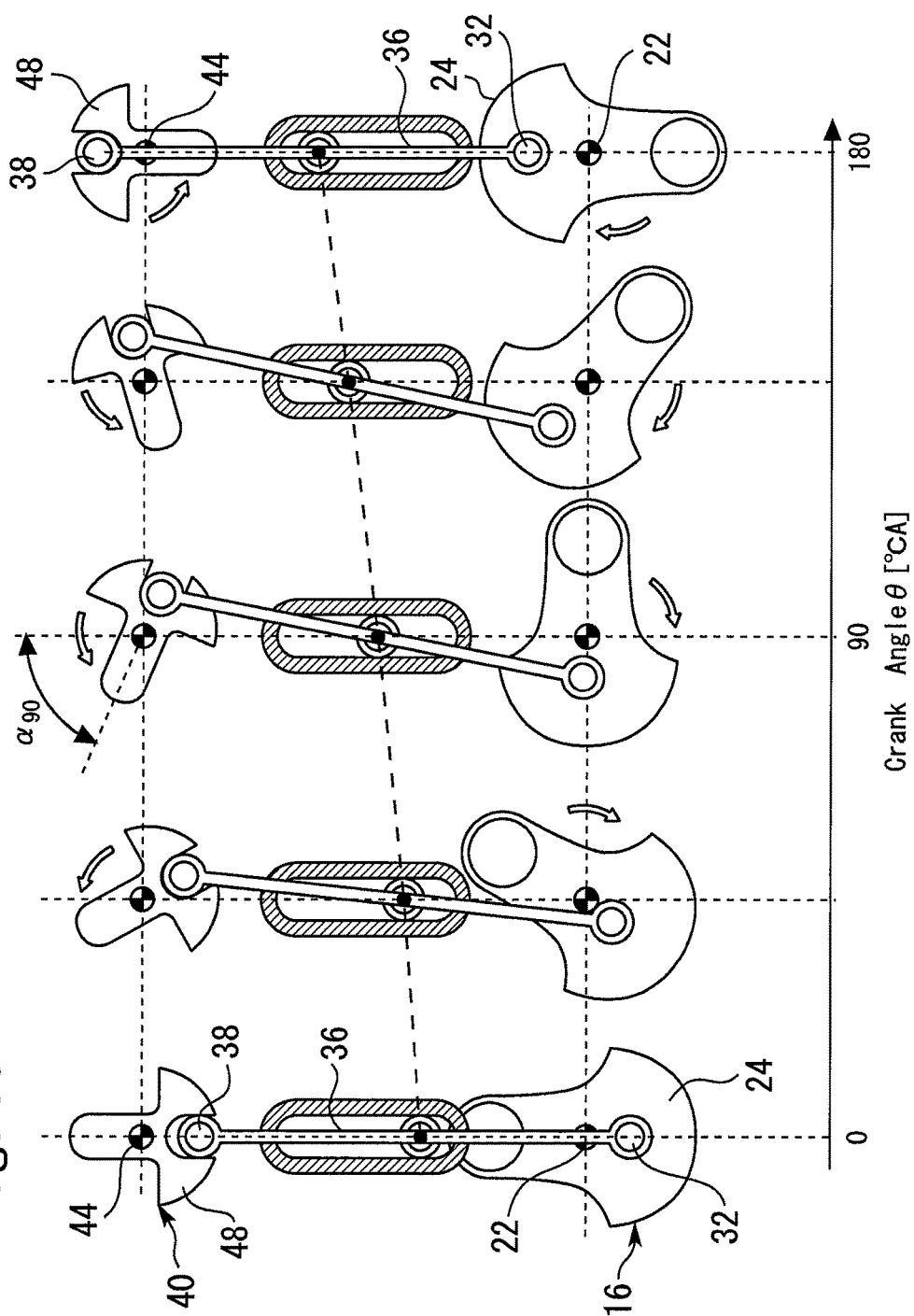
FIG. 10 is a diagram for explaining a relation between a state of a configuration of a modification example of the first embodiment of the present invention and a crank angle θ.

FIG. 10 is a diagram for explaining a configuration of a modification example of the first embodiment of the present invention. In the aforementioned first embodiment, the CS connected point 32 is provided at the opposite side of the CS eccentric weight 24 with the center of the CS main shaft 22 therebetween, and the BS connected point 38 is provided at the opposite side of the BS eccentric weight 48 with the center of the BS axial shaft 44 therebetween (refer to FIG. 1). However, the configuration of the present invention is not limited to this. That is, as illustrated in FIG. 10, the CS connected point 32 may be provided at a same side as the CS eccentric weight 24 with respect to the center of the CS main shaft 22, and the BS connected point 38 may be provided at a same side as the BS eccentric weight 48 with respect to the center of the BS axial shaft 44.

Figure 11:
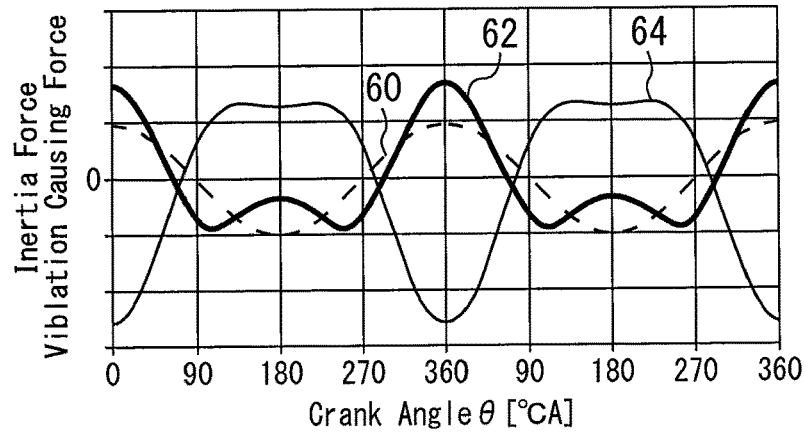
FIG. 11 illustrates profiles of an inertial force generated by a piston of an internal combustion engine and a vibration causing force generated by the balance device shown in FIG. 10.
Figure 12:
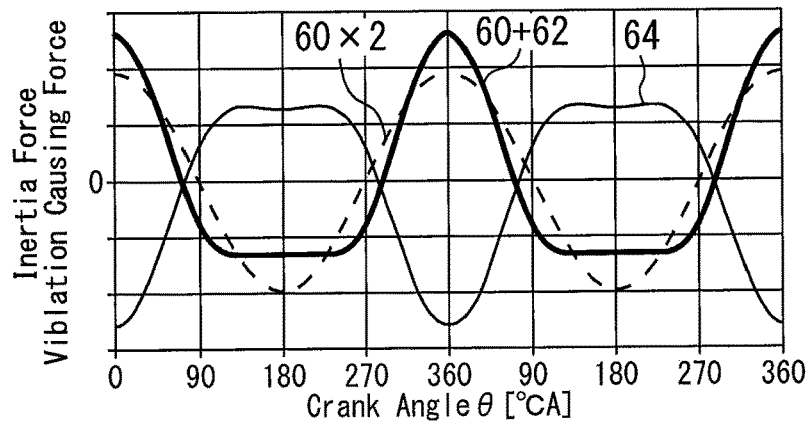
FIG. 12 is a diagram showing a resultant vibration causing force obtained by compositing the vibration causing force generated by a crankshaft and the vibration causing force generated by a balance shaft, both of which being shown in FIG. 11.
Figure 13:
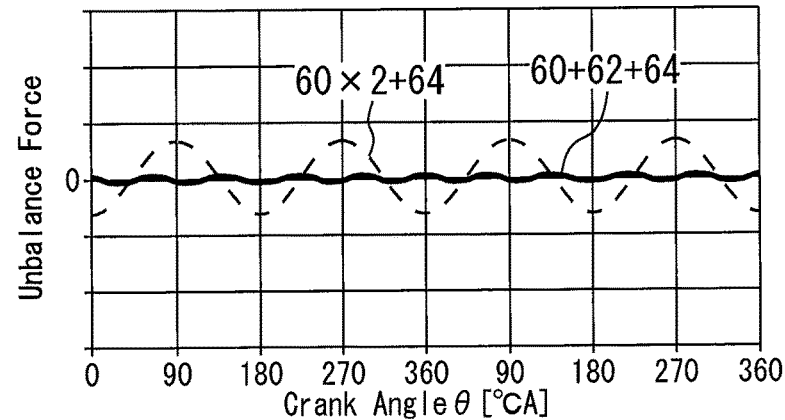
FIG. 13 is a diagram showing a resultant force obtained by compositing the inertial force generated by the piston and the resultant vibration causing force, both of which being shown in FIG. 12.

FIGS. 11, 12 and 13 illustrate waveforms of inertial forces and vibration causing forces that are generated with an operation of the aforementioned modification example. The waveforms illustrated in the respective drawings are assigned with common reference signs to the reference signs written in FIGS. 7, 8 and 9. As illustrated in FIG. 13, according to a configuration of the present modification example, the unbalance force (a waveform 60+62+64) remaining in the internal combustion engine 10 can be made smaller as compared with the case of the first embodiment. Note that positions of the CS connected point 32 and the BS connected point 38 are not limited to the positions illustrated in FIG. 10, and can be properly set in accordance with the waveform of the vibration causing force Y component that should be generated in the balance device 30.

Further, in the aforementioned first embodiment, the internal combustion engine 10 is described as a single-cylinder engine, but the configuration of the present invention is not limited to this. For example, in the four-cycle two-cylinder engine, pistons of two cylinders perform reciprocating motions in a same phase. The present invention may be used to cancel out inertial forces generated by these two pistons.

Further, in the aforementioned first embodiment, the phase of the center of gravity of the crankshaft 16 and the phase of the center of gravity of the balance shaft 40 are made to correspond to each other in the top dead center and the bottom dead center, but the phases of both of them may be made to differ from each other if necessary to obtain a desired vibration causing force. The phases of both of them may be specifically differ in accordance with necessity within a range of 45[° CA], within a range of 30[° CA], within a range of 15[° CA], or within a range of 5[° CA].

Note that the aforementioned three modifications can be not only used as a modification of the first embodiment, but also used as modifications of all of other embodiments that will be described later.

Further, in the aforementioned first embodiment, the slide portion 52 that is held by the guide section 54 is made circular, but the configuration of the present invention is not limited to this. The slide portion 52 may be anything that can cause the pivot 50 to perform a rectilinear motion along the guide section 54, and a shape thereof may be a square shape or a rectangle shape in which corners are removed.

Further, in the aforementioned first embodiment, the pivot 50 that is held by the guide section 54 is provided at the middle point of the connection rod 36, but the configuration of the present invention is not limited to this. That is, the pivot 50 of the connection rod 36 can be provided at an arbitrary point on the connection rod 36 within a range in which an operation of the balance device 30 is enabled.

Further, in the aforementioned first embodiment, the BS connected point adjustment mechanism 46 is provided at the balance shaft 40, but the configuration of the present invention is not limited to this. That is, the connected point adjustment mechanism may be provided at each of both the balance shaft 40 and the crankshaft 16, or at the crankshaft 16, in order to enable operation of the balance device 30.

Second Embodiment

Figure 14:
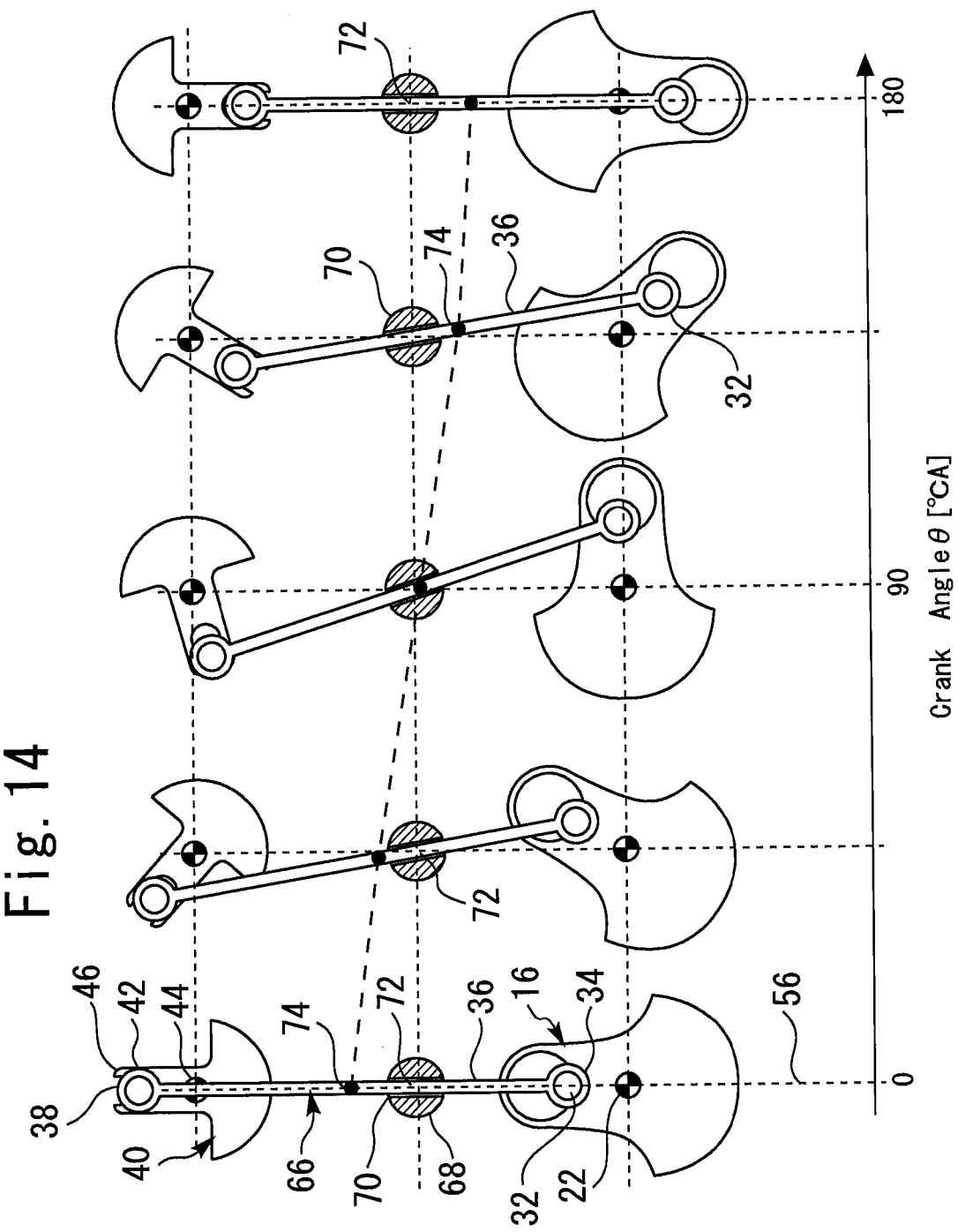
FIG. 14 is a diagram for explaining a relation between a state of a balance device according to a second embodiment of the present invention and a crank angle θ.

Next, a second embodiment of the present invention will be described with reference to FIG. 14. FIG. 14 is a diagram for explaining an operation of a balance device 66 in the present embodiment. A configuration of the present embodiment can be realized by mounting the balance device 66 illustrated in FIG. 14 on the internal combustion engine 10 illustrated in FIG. 1, instead of the balance device 30 illustrated in FIG. 2. Hereunder, in FIG. 14, common elements to the elements illustrated in FIG. 2 will be assigned with common reference signs and explanation thereof will be omitted or simplified.

The balance device 66 illustrated in FIG. 14 includes a guide section 68 to regulate a trajectory of the connection rod 36. The guide section 68 has a groove 70 substantially equal to a width of the connection rod 36. The connection rod 36 can slide in the groove 70 in a state where the connection rod 36 is housed in the groove 70.

The guide section 68 includes a rotating shaft 72 in a portion where the connection rod 36 is overlaid on in FIG. 14 (originally on a back side of the connection rod 36, and not visually recognizable). The rotating shaft 72 is parallel with the CS main shaft 22 and the BS axial shaft 44, and is provided in a position overlaid on the CS-BS center line 56 connecting the center of the CS main shaft 22 and that of the BS axial shaft 44. Consequently, the guide section 68 can rotate within a movable plane of the connection rod 36 while holding the connection rod 36.

In FIG. 14, a black circle point 74 described on the connection rod 36 expresses a middle point of the connection rod 36. In the aforementioned first embodiment, motion of the connection rod 36 is regulated so that the middle point (the pivot 50) of the connection rod 36 moves on the CS-BS center line 56 (refer to FIG. 2). In that case, the connection rod 36 always transmits displacement that occurs to the CS connected point 32 to the BS connected point 38 with a leverage of 1:1.

In the present embodiment, as illustrated in FIG. 14, in the situation of the crank angle θ=0[° CA], the middle point 74 of the connection rod 36 deviates from the guide section 68 to its above side, that is, to the side of the BS connected point 38. In this case, displacement occurring to the CS connected point 32 is transmitted to the BS connected point 38 while being amplified with a leverage larger than one. Subsequently, when the crank angle θ exceeds 90[° CA], the middle point 74 of the connection rod 36 is in a state deviated to a lower side of the guide section 68, that is, the side of the CS connected point 32. In this stage, displacement that occurs to the CS connected point 32 side is transmitted to the BS connected point 38 while being reduced with a leverage less than one.

In this way, according to the configuration of the present embodiment, displacement that occurs to the CS connected point 32 can be transmitted to the BS connected point 38 properly with different leverages. More specifically, in a region in the vicinity of the top dead center where the crank angle θ is close to 0[° CA], the balance shaft 40 can be rotated at a higher speed as compared with the case of the first embodiment, with respect to the rotation of the crank angle θ. In a region in the vicinity of the bottom dead center where the crank angle θ is close to 180[° CA], the balance shaft 40 can be rotated more slowly as compared with the case of the first embodiment, with respect to the rotation of the crank angle θ.

When a speed profile of the balance shaft 40 changes, the profile of the vibration causing force generated by the balance shaft 40 also differs. Consequently, according to the balance device 66 in the present embodiment, the vibration causing force profile different from the case of the first embodiment can be generated.

The inertial force generated by the piston 12 of the internal combustion engine 10 shows various profiles in accordance with various design values. According to the configuration of the present embodiment, excellent quietness can be given to the internal combustion engine 10, in a case where the profile of the inertial force generated by the piston 12 is closely analogous to the profile of the vibration causing force generated by the balance device 66 illustrated in FIG. 14.

Third Embodiment

Figure 15:
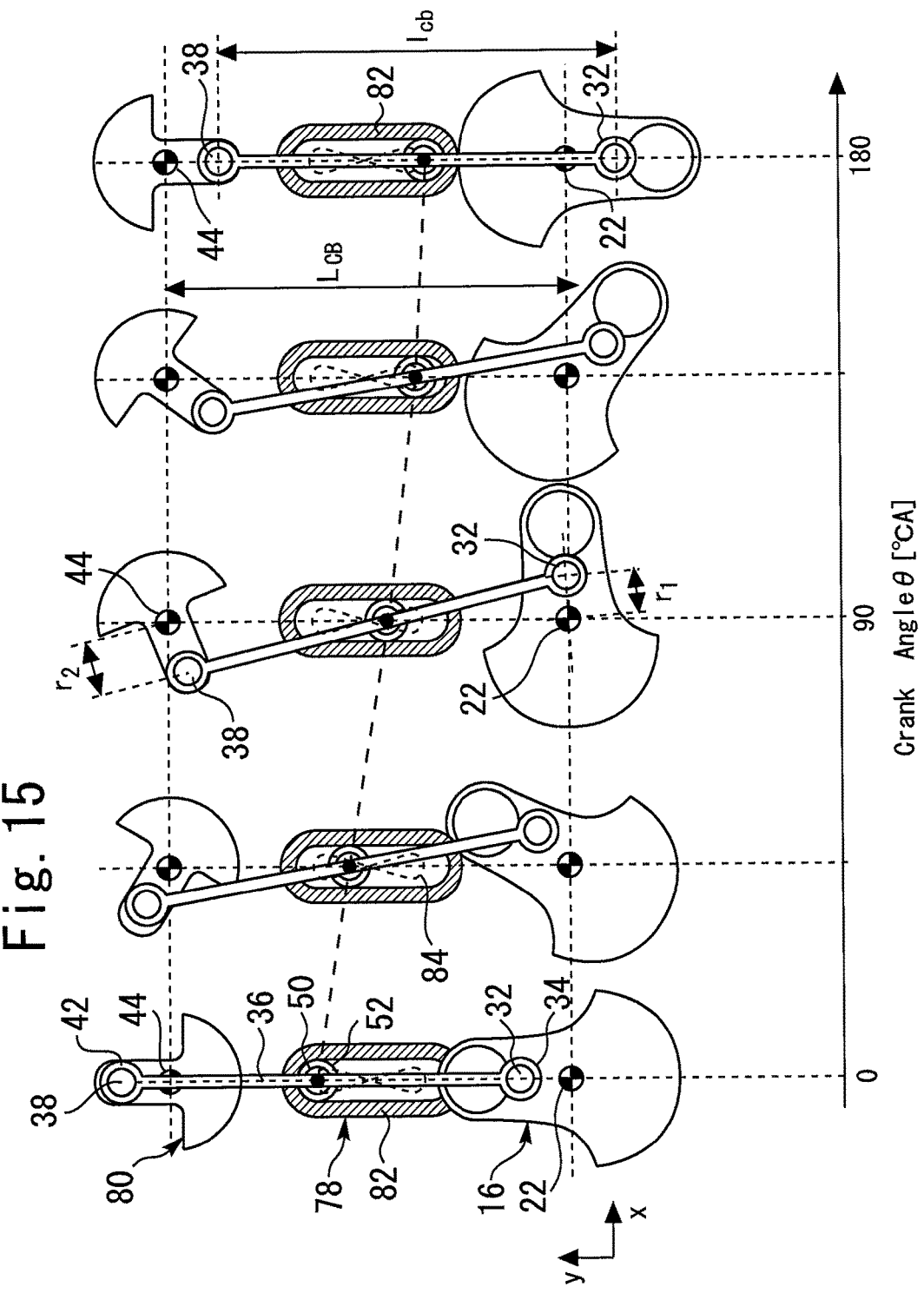
FIG. 15 is a diagram for explaining a relation between a state of a balance device according to a third embodiment of the present invention and a crank angle θ.

Next, a third embodiment of the present invention will be described with reference to FIGS. 15 to 18. FIG. 15 is a diagram for explaining an operation of a balance device 78 in the present embodiment. A configuration of the present embodiment can be realized by mounting the balance device 78 illustrated in FIG. 15 on the internal combustion engine 10 illustrated in FIG. 1, instead of the balance device 30 illustrated in FIG. 2. The balance device 78 is similar to the balance device 30 illustrated in FIG. 2 except for three points described as follows. Note that in FIG. 15, common elements to the elements illustrated in FIG. 2 will be assigned with common reference signs and explanation thereof will be omitted or simplified.

(Difference 1)

The balance device 78 of the present embodiment includes a balance shaft 80. The BS connection mechanism 42 is directly attached to the balance shaft 80 without using the BS connected point adjustment mechanism 46 (refer to FIG. 2).

(Difference 2)

The balance device 78 of the present embodiment satisfies the following conditions.

(1) A distance $L_{CB}$ between the center of the CS main shaft 22 and the center of the BS axial shaft 44 is equal to a distance $l_{cb}$ between the CS connected point 32 and the BS connected point 38.

(2) A rotation radius r1 of the CS connected point 32 is equal to a rotation radius r2 of the BS connected point 38.

(Difference 3)

The balance device 78 of the present embodiment includes a guide section 82. In FIG. 15, a broken line in a shape of a figure eight illustrated in the guide section 82 shows a trajectory 84 of the pivot 50. The guide section 82 is given a width larger than a diameter of the slide portion 52 so that the pivot 50 can move along the trajectory 84.

In FIG. 15, in the state of the crank angle θ of 0[° CA], the center line of the connection rod 36 overlies a line connecting the center of the BS axial shaft 44 and the BS connected point 38. Hereunder, this point will be referred to as a "first change point". In the first change point, an axial force that is given to the BS connected point 38 from the connection rod 36 does not give rotating moment to the balance shaft 80. Consequently, the balance shaft 80 is in a state rotatable in both a normal rotation direction and a reverse rotation direction in the first change point.

When the crankshaft 16 normally rotates from the first change point, displacement to the direction of (the x positive direction, the y negative direction) slightly occurs to the CS connected point 32. The distance between the CS connected point 32 and the BS connected point 38 is always constant, and therefore if the above described displacement occurs to the CS connected point 32, the BS connected point 38 cannot help displacing in either of the directions in order to compensate the displacement.

If the connection rod 36 can freely displace, the BS connected point 38 can displace in both the x positive direction and the x negative position, that is, in both the normal rotation direction and the reverse rotation direction. When the BS connected point 38 displaces in the normal rotation direction with the CS connected point 32, the pivot 50 at the connection rod 36, which is located in the middle point between the CS connected point 32 and the BS connected point 38, necessarily displaces in the normal rotation direction along a perfect-circular trajectory. On the other hand, when the BS connected point 38 displaces in the opposite direction to the CS connected point 32, slight x displacement and large y displacement occur to the pivot 50 which is located at the middle point between the CS connected point 32 and the BS connected point 38. At this occasion, the pivot 50 displaces along the trajectory 84 in the shape of a figure eight.

Figure 16:
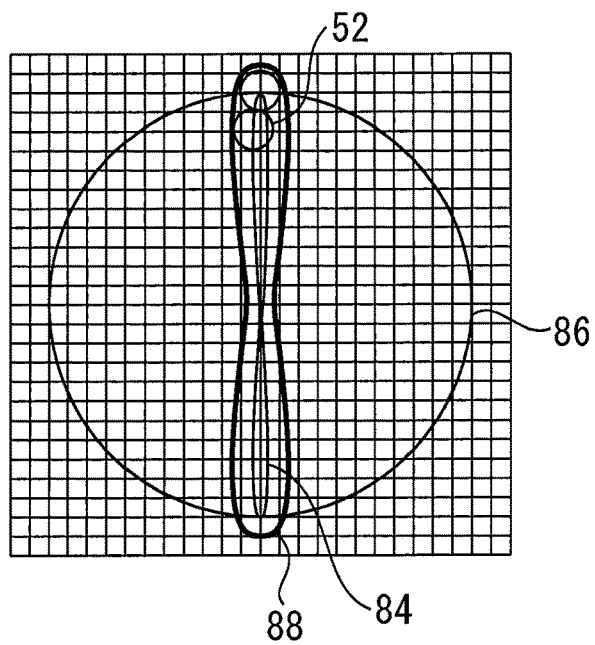
FIG. 16 is a diagram showing a trajectory of a pivot of a connection rod during an operation of the balance device shown in FIG. 15.

FIG. 16 is a diagram showing the trajectory (hereunder, referred to as a "reverse rotation trajectory") 84 in the shape of a figure eight described above in contrast with the trajectory (hereunder, referred to as a "normal rotation trajectory") 86 of the pivot 50 following the normal rotation of the BS connected point 38. Note that a slide trajectory 88 illustrated by being assigned with reference sign 88 in FIG. 16 expresses a shape which an outer wall of the slide portion 52 follows when the pivot 50 displaces along the reverse rotation trajectory 84.

Figure 17:
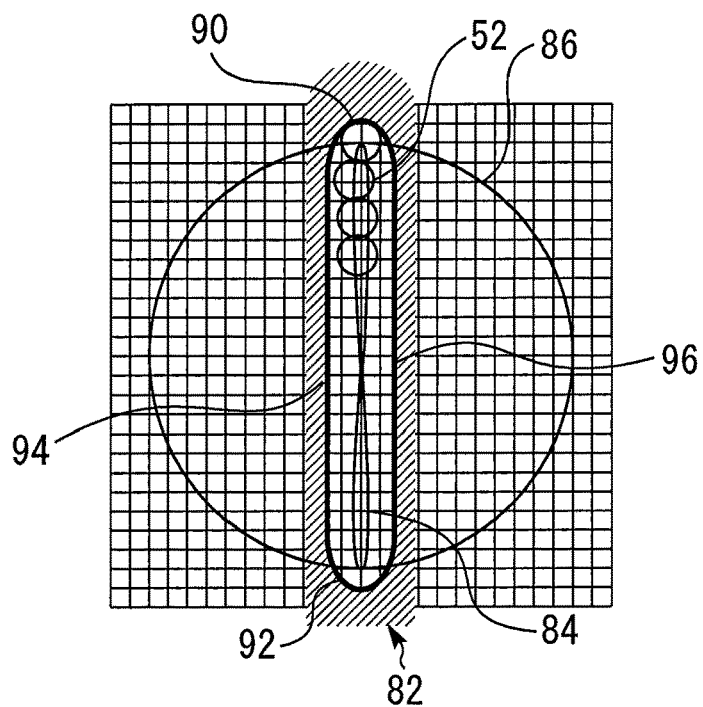
FIG. 17 is a diagram for explaining conditions which should be satisfied with by a guide section 82 illustrated in FIG. 15.

FIG. 17 is a diagram for explaining details of the guide section 82 illustrated in FIG. 15. As illustrated in FIG. 17, the guide section 82 includes a BS side guide 90 at one end thereof. The BS side guide 90 is provided at a spot where the slide portion 52 is located at the first change point, and has a same shape as the shape of the upper end portion of the slide trajectory 88 illustrated in FIG. 16. The BS side guide 90 can inhibit the slide portion 52 from displacing along the normal rotation trajectory 86, and cause the slide portion 52 to displace along the reverse rotation trajectory 84, at the first change point.

For the reason described above, in the balance device 78 of the present embodiment (refer to FIG. 15), at the time of the crankshaft 16 slightly rotating from the first change point, the slide portion 52 can be always displaced along the reverse rotation trajectory 84. As a result, a displacement direction of the BS connected point 38 inevitably becomes a direction of reverse rotation, that is, the x negative direction. When the BS connected point 38 displaces in the x negative direction even slightly from the first change point, the axial force generated by the connection rod 36 gives rotating moment to the balance shaft 40. Thereafter, until the crank angle θ reaches 180[° CA], the balance shaft 80 receives the rotating moment and keeps stable reverse rotation.

When the crank angle θ reaches 180[° CA], the state where the line connecting the center of the BS axial shaft 44 and the BS connected point 38 overlies the center line of the connection rod 36 is formed again. Hereunder, the point will be referred to as a "second change point". In the second change point, the balance shaft 80 is in a state where the balance shaft 80 is rotatable in both the normal rotation direction and the reverse rotation direction, as in the first change point.

As illustrated in FIG. 17, the guide section 82 in the present embodiment includes a CS side guide 92 at an opposite side of the BS side guide 90. The CS side guide 92 is provided at a spot where the slide portion 52 is located at the second change point, and has a same shape as a lower end portion of the slide trajectory 88 illustrated in FIG. 16. The CS side guide 92 can inhibit the slide portion 52 from displacing along the normal rotation trajectory 86, and cause the slide portion 52 to displace along the reverse rotation trajectory 84, at the second change point.

Due to regulation by the CS side guide 92, the slide portion 52 always displaces along the reverse rotation trajectory 84 when the crankshaft 16 rotates from the second change point. When slight displacement occurs, rotating moment in the reverse rotation direction works on the balance shaft 80 stably until the crankshaft 16 returns to the first change point. The above operation is repeated, whereby in the present embodiment, the balance shaft 80 is also enabled to perform unequal speed rotation in an opposite direction to the rotation direction of the crankshaft 16.

As illustrated in FIG. 16, at the time of the pivot 50 moving along the reverse rotation trajectory 84, the outer wall of the slide portion 52 follows the slide trajectory 88 having a constricted part in the central portion. Consequently, an inner wall of the guide section 82 may be formed by a set of curved lines similarly to the slide trajectory 88. However, a function which is required of the guide section 82 in the present embodiment is only regulating the motion of the slide portion 52 at the first change point and the second change point.

That is to say, if the motion of the slide portion 52 can be properly regulated at the first change point and the second change point in the present embodiment, in a process between the first change point and the second change point, the balance shaft 80 can be caused to perform reverse rotation stably by the axial force of the connection rod 36. Consequently, the guide section 82 does not have to be in contact with the slide portion 52 between the first change point and the second change point.

In FIG. 17, the guide section 82 includes rectilinear side walls 94 and 96 between the BS side guide 90 and the CS side guide 92. Since these side walls 94 and 96 are rectilinear, and therefore are easily produced as compared with side walls in a curved shapes of the slide trajectory 88 (refer to FIG. 16). Further, these side walls 94 and 96 do not interfere with the slide portion 52 that displaces along the slide trajectory 88. Consequently, according to the guide section 82 as illustrated in FIG. 17, a desired function can be realized while simplifying a production process.

As described above, by the configuration of the present embodiment, the balance shaft 80 can be also caused to perform unequal speed rotation in the opposite direction to the rotation direction of the crankshaft 16, by the structure by medium of the connection rod 36. Consequently, according to the configuration of the present embodiment, the compact internal combustion engine 10 which is excellent in quietness can be also realized as in the case of the first or the second embodiment.

Note that in the aforementioned third embodiment, the pivot 50 and the slide portion 52 of the connection rod 36 correspond to a "restriction part" in a fourth invention.

Modification Example of Third Embodiment

Figure 18:
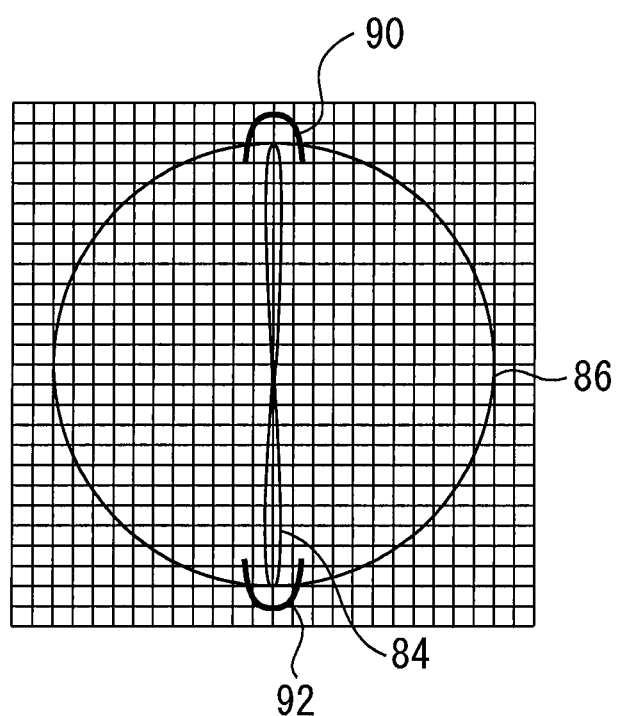
FIG. 18 illustrates an example of another configuration that can be used as the guide section in the third embodiment.

FIG. 18 illustrates an example of another configuration that can be used as the guide section 82 in the third embodiment. In the aforementioned third embodiment, the rectilinear side walls 94 and 96 are provided between the BS side guide 90 and the CS side guide 92. In the example illustrated in FIG. 18, these side walls 94 and 96 are omitted. The guide section 82 in the third embodiment may be realized by the simple configuration like this.

Fourth Embodiment

Figure 19:
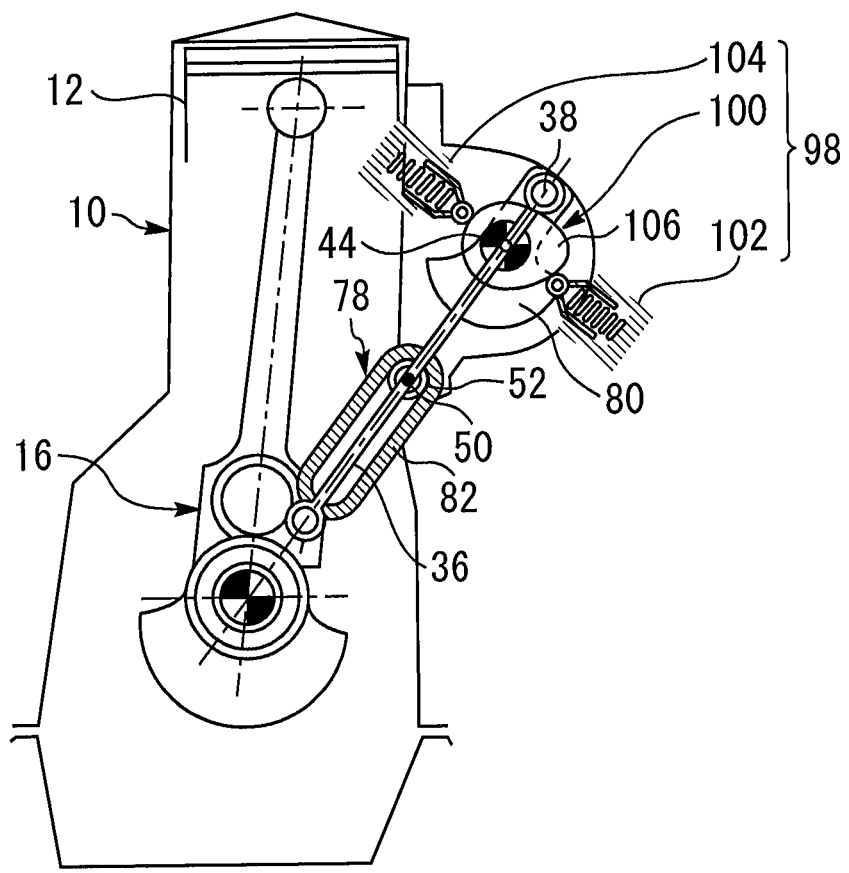
FIG. 19 is a diagram for explaining a configuration of a fourth embodiment of the present invention.

Next, a fourth embodiment of the present invention will be described with reference to FIGS. 19 to 24. FIG. 19 is a diagram for explaining a configuration of the present embodiment. The configuration of the present embodiment can be realized by adding a moment applying mechanism 98 to the configuration of the third embodiment described above. Note that in FIG. 19, common elements to the elements illustrated in FIG. 1 or FIG. 15 will be assigned with common reference signs, and explanation thereof will be omitted or simplified.

The moment applying mechanism 98 includes a cam 100. The cam 100 is attached to the BS axial shaft 44. The cam 100 has a cam nose 106 that rotates with the BS axial shaft 44.

The moment applying mechanism 98 also includes spring members 102 and 104. The spring members 102 and 104 are disposed to transmit spring forces to a side surface of the cam 100 in positions that are 180 [deg] out of phase with each other.

The configuration of the present embodiment includes the balance device 78 as in the case of the third embodiment. In the balance device 78, there arise states in which rotating moment is not transmitted to the balance shaft 80 at the first change point and the second change point. The moment applying mechanism 98 is provided for applying rotating moment in an opposite direction to the rotation direction of the crankshaft 16 to the balance shaft 80 under these states.

Figure 21:
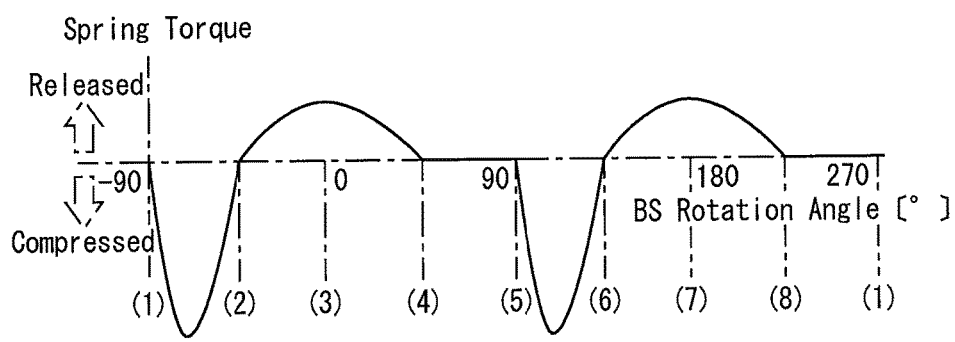
FIG. 21 illustrates change of spring torque which a balance shaft receives from a spring member under each situation illustrated in FIG. 20.

FIG. 20 is a diagram for explaining an operation of the configuration of the present embodiment. Further, FIG. 21 illustrates a magnitude of spring torque which the cam 100 receives from the spring members 102 and 104 under situations of (1) to (8) illustrated in FIG. 20. Note that in FIG. 21, a region where the spring torque is negative is a region where the spring members 102 and 104 are compressed, and a region where the spring torque is positive is a region where the spring members 102 and 104 are released.

In FIGS. 20 and 21, in a section from (1) to (2), an axial force 108 of the connection rod 36 generates moment 110 that rotates the balance shaft 80, and displacement 112 in a compression direction occurs to the spring member 102 with rotation of the cam 100. In a section from (2) to (4), the displacement 112 in a releasing direction occurs to the spring member 102, and the moment 110 is transmitted to the balance shaft 80 via the cam 100. The configuration of the present embodiment is designed so that the first change point is included in the section from (2) to (4). If the moment 110 is transmitted to the balance shaft 80 in this section, the balance shaft 80 can be caused to keep stable reverse rotation.

The cam 100 of the present embodiment is formed so that extension and contraction do not occur to the spring member 102 in a section from (4) to (5). Consequently, the balance shaft 80 keeps reverse rotation mainly by the axial force of the connection rod 36 in this section. In a section from (5) to (8), the moment 110 which is substantially similar to the moment 110 in the section from (1) to (4) occurs, due to the function of the spring 104. The configuration of the present embodiment is designed so that the second change point is included in a section from (6) to (8) in which the spring force generates the moment 110. Consequently, according to the configuration of the present embodiment, the balance shaft 80 can be rotated oppositely to the crankshaft 16 stably in an entire rotation region.

Modification of Fourth Embodiment

Figure 22:
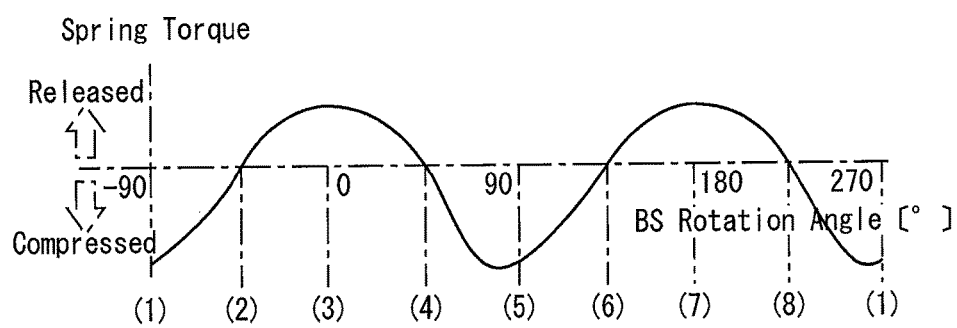
FIG. 22 illustrates change of spring torque which a balance shaft receives from a spring member in a modification of the fourth embodiment of the present embodiment.

Incidentally, in the aforementioned fourth embodiment, the section from (4) to (5) and the section from (8) to (1) illustrated in FIGS. 20 and 21 are made the sections where spring torque is not generated. However, the configuration of the present invention is not limited to this. In these sections, the axial force of the connection rod 36 generates large moment, and therefore, in order to smoothen drive torque, these sections may be used as the sections for compressing the spring members 102 and 104 as illustrated in FIG. 22.

Figure 23:
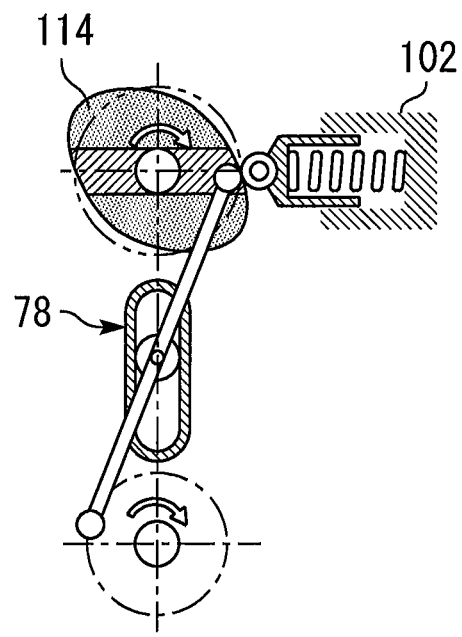
FIG. 23 is a diagram for explaining a configuration of a second modification of the fourth embodiment of the present invention.

Further, in the aforementioned fourth embodiment, desired rotating moment is generated in both the vicinity of the first change point and the vicinity of the second change point by using the two spring members 102 and 104. However, the configuration of the present invention is not limited to this. FIG. 23 illustrates a configuration using a cam 114 having two cam noses. According to the configuration like this, at both the first change point and the second change point, the single spring member 102 can be caused to generate desired rotating moment.

Figure 24:
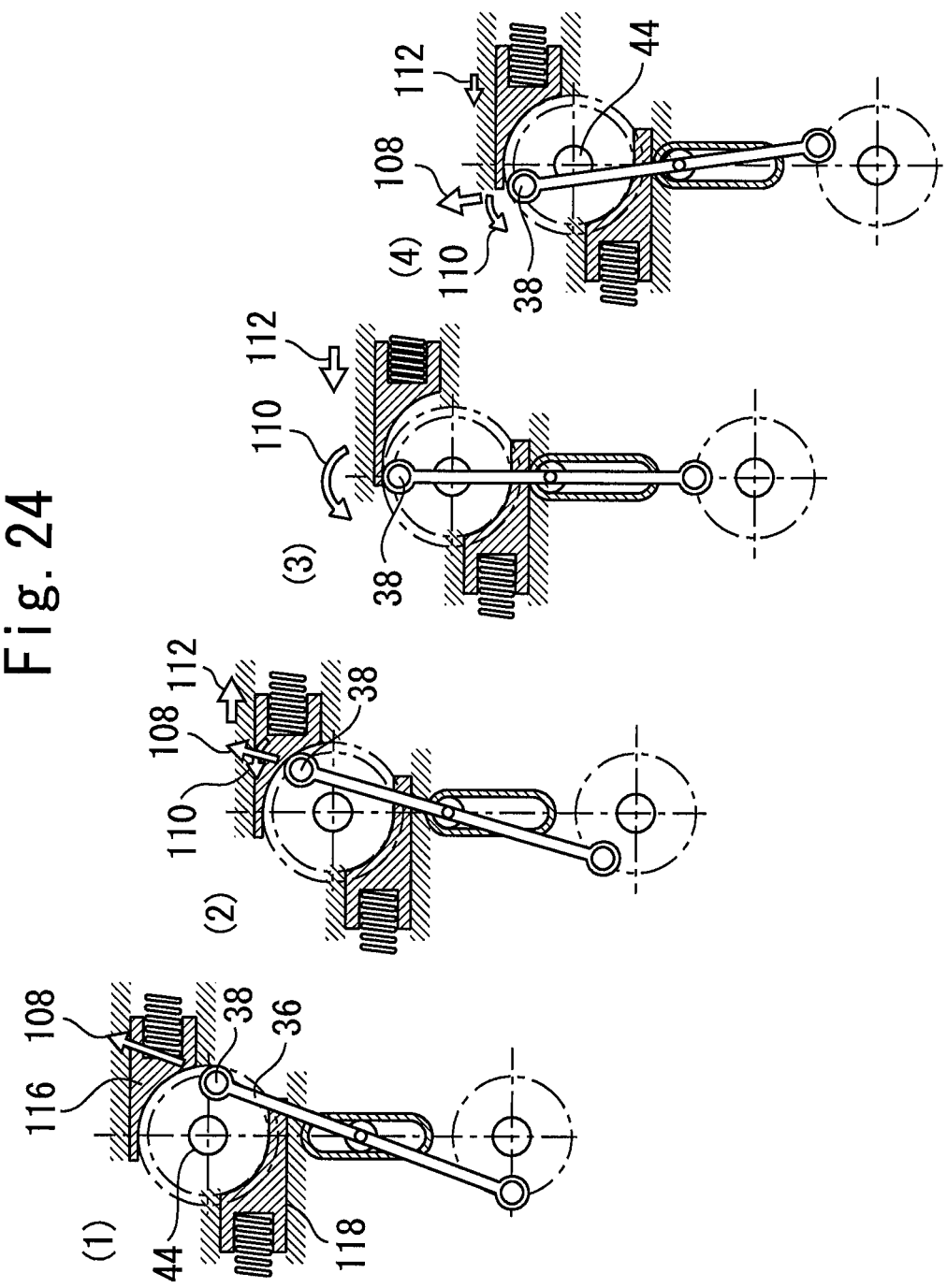
FIG. 24 is a diagram for explaining a configuration of a third modification of the fourth embodiment of the present invention.

Further, in the aforementioned fourth embodiment, the cam 100 is attached to the BS axial shaft 44 to generate rotating moment. However, the configuration of the present invention is not limited to this. FIG. 24 illustrates an example in which two cam mechanisms 116 and 118 are provided at a side of a stationary member such as the cylinder block. The cam mechanisms 116 and 118 respectively have functions of converting the rotating operation of the BS connected point 38 into spring torque. According to the configuration like this, the rotating moment for causing the balance shaft 80 to continue reverse rotation stably can be properly generated as in the case of the fourth embodiment.

Further, in the aforementioned fourth embodiment, in order to apply desired rotating moment to the balance shaft 80, the cam 100 and the spring members 102 and 104 are newly incorporated into the internal combustion engine 10. However, the configuration of the present invention is not limited to this. For example, an in-cylinder direct injection type gasoline engine and a diesel engine include high pressure fuel injection pumps. The high-pressure fuel injection pump may include a cam that operates synchronously with an operation cycle of the internal combustion engine, and a spring member that is engaged with the cam. The rotating moment generated in the fourth embodiment may be generated by using the existing cam, spring member and the like.

Further, in the aforementioned fourth embodiment, the moment applying mechanism 98 is incorporated into the configuration of the third embodiment. The balance device 78 of the third embodiment causes self-lock more easily at the first change point and the second change point, as compared with the balance device 30 in the first embodiment and the balance device 66 in the second embodiment. Consequently, the configuration of the fourth embodiment exhibits especially high usefulness in the case of being based on the configuration of the third embodiment. However, the combination condition is not limited to this. That is, the moment applying mechanism 98 in the fourth embodiment may be combined with the configuration of the first embodiment or the second embodiment.

Fifth Embodiment

Figure 25:
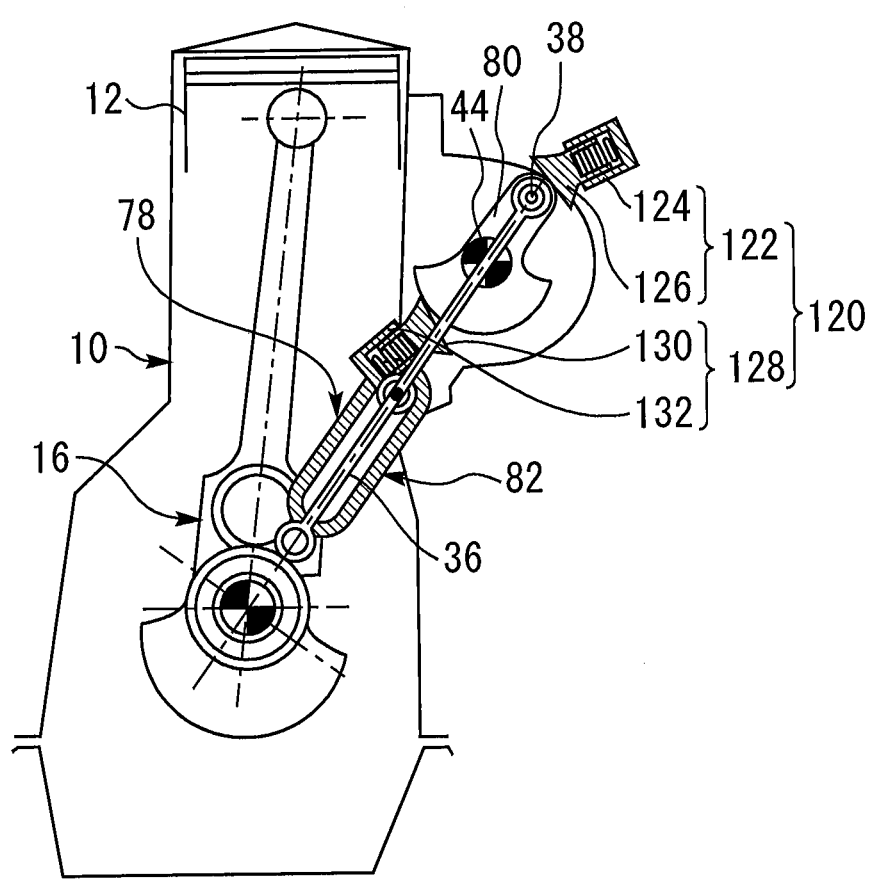
FIG. 25 is a diagram for explaining a configuration of a fifth embodiment of the present invention.

Next, a fifth embodiment of the present invention will be described with reference to FIGS. 25 to 27. FIG. 25 is a diagram for explaining a configuration of the present embodiment. The configuration of the present embodiment can be realized by adding a moment applying mechanism 120 to the configuration of the third embodiment described above. Note that, in FIG. 25, common elements to the elements illustrated in FIG. 1 or FIG. 15 are assigned with the common reference signs, and explanation thereof will be omitted or simplified.

In the present embodiment, the moment applying mechanism 120 includes a first spring member 122. The first spring member 122 includes a spring member 124 and a contact portion 126. The contact portion 126 is provided so as to contact with the BS connected point 38 at the first change point where an axis line of the connection rod 36 overlies the center of the BS axial shaft 44. Further, the spring member 124 is provided so as to generate a spring force that pushes the BS connected point 38 in a counterclockwise direction in FIG. 24 at the occasion.

The moment applying mechanism 120 also includes a second spring member 128. The second spring member 128 is provided in a position substantially 180 [deg] out of phase with the first spring member 122. The second spring member 128 includes a spring member 132 and a contact portion 130. The contact portion 130 is provided so as to contact with the BS connected point 38 at the second change point indicating a state where the balance shaft 80 is rotated 180 [deg] from the first change point. Further, the spring member 132 is provided to generate a spring force that pushes the BS connected point 38 in the counterclockwise direction in FIG. 25 at the occasion.

Figure 26:
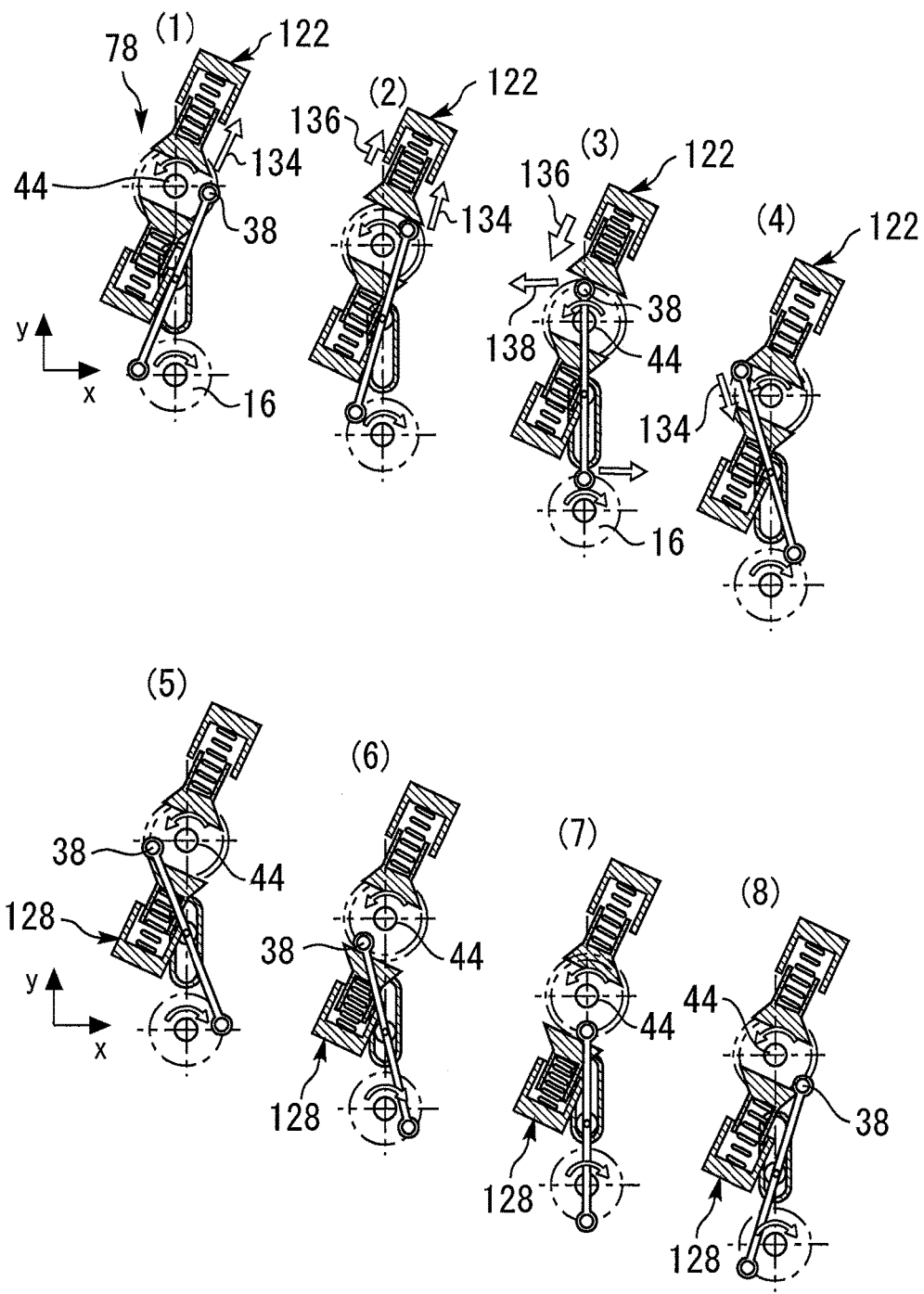
FIG. 26 is a diagram for explaining an operation of the balance device shown in FIG. 25.
Figure 27:
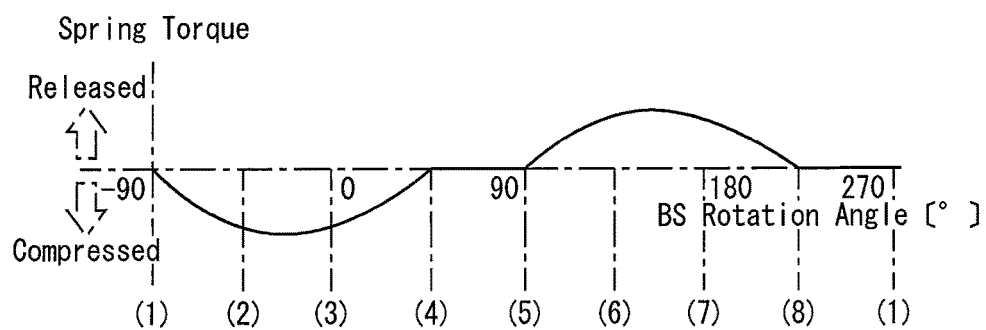
FIG. 27 illustrates change of spring torque which a balance shaft receives from a spring member under each situation illustrated in FIG. 26.

FIG. 26 is a diagram for explaining an operation of the configuration of the present embodiment. Further, FIG. 27 illustrates a magnitude of an pushing force in the x-direction received by the BS connected point 38, under situations of (1) to (8) illustrated in FIG. 26. As illustrated in FIG. 26, in a section from (1) to (2), an axial force 134 which gives the first spring member 122 displacement 136 in a contracting direction occurs, with rotation of the crankshaft 16. In a section from (3) to (4), displacement 136 in an extending direction occurs to the first spring member 122. Then, the BS connected point 38 keeps receiving a reaction force 138 in the x negative direction over substantially entire section from (1) to (4).

When the BS connected point 38 is located at an upper side from the center of the BS axial shaft 44, the reaction force 138 in the x negative direction generates moment that rotates the balance shaft 80 in an opposite direction to the crankshaft. In the present embodiment, the balance device 78 is designed so that the first change point is included in the section from (1) to (4). Consequently, according to the device 78, the balance shaft 80 can be stably rotated in the direction of reverse rotation in the vicinity of the first change point.

In FIG. 26, in a section from (5) to (8), the second spring member 128 pushes the BS connected point 38 in the x positive direction. When the BS connected point 38 is located at a lower side from the center of the BS axial shaft 44, a force in the x positive direction that works on the BS connected point 38 generates moment that rotates the balance shaft 80 in an opposite direction to the rotating direction of the crankshaft 16. In the present embodiment, the balance device 78 is designed so that the second change point is included in the section from (5) to (8). Consequently, according to the device 78, the balance shaft 80 can be stably rotated in the direction of the reverse rotation in the vicinity of the second change point.

As described above, according to the configuration of the present embodiment, the balance shaft 80 can be also stably rotated in the opposite direction with respect to the crankshaft 16 as in the case of the fourth embodiment. Consequently, according to the configuration of the present embodiment, the compact internal combustion engine 10 excellent in quietness can be also provided.

Sixth Embodiment

Configuration of Sixth Embodiment

Figure 28:
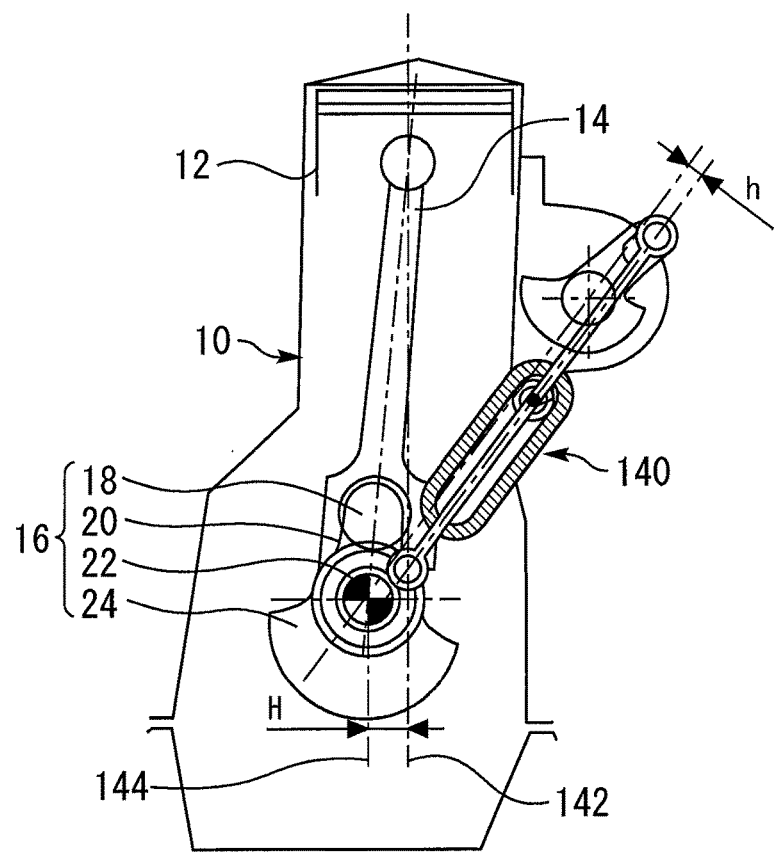
FIG. 28 is a diagram for explaining a configuration of a sixth embodiment of the present invention.

Next, a sixth embodiment of the present invention will be described with reference to FIGS. 28 to 34. FIG. 28 is a diagram for explaining a configuration of the sixth embodiment of the present invention. The configuration of the present embodiment is similar to the configuration of the first embodiment except (refer to FIG. 1) except for a point that the balance device 30 is replaced with a balance device 140 of an offset structure.

In the present embodiment, the crankshaft 16 of the internal combustion engine 10 is used by a manner of an offset crank. In FIG. 28, a broken line shown by being assigned with reference sign 142 is an axis line of the reciprocating motion of the piston 12. In the internal combustion engine 10, an axis line 144 of the crankshaft 16 is disposed in a position separated from the axis line 142 of the piston 12 by a distance H parallel with the axis line 142.

(Effect by Offset Crank)

Figure 29:
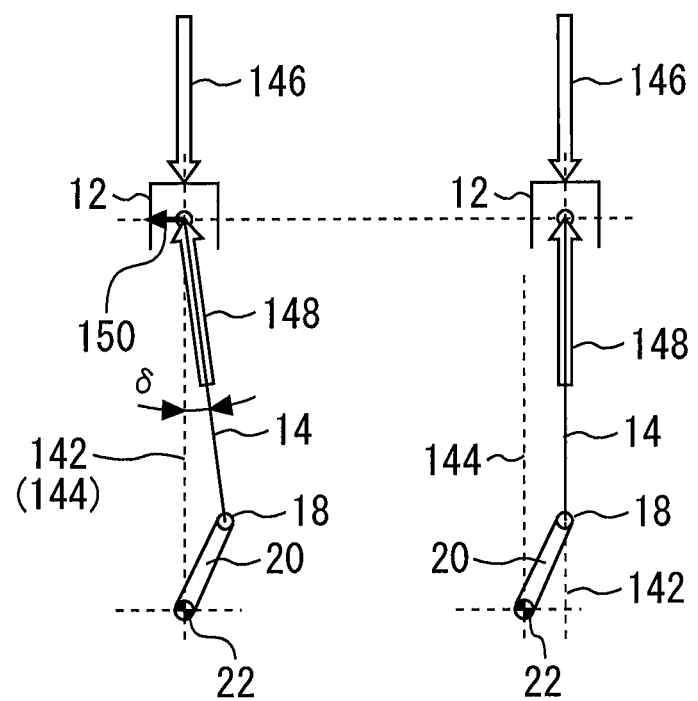
FIG. 29 is a diagram for explaining an effect obtained by the structure of the offset crank provided in the internal combustion engine shown in FIG. 28.

FIG. 29 is a diagram for explaining an effect obtained by the manner of the offset crank. A figure at a left side in FIG. 29 shows a structure of a comparative example. In the structure, the center of the CS main shaft 22 overlies the axis line 142 of the reciprocating motion of the piston 12. A figure at a right side in FIG. 29 schematically illustrates a structure using the manner of the offset crank. In the structure, the center of the CS main shaft 22 is offset by the distance H from the axis line 142 of the reciprocating motion of the piston 12.

In FIG. 29, an arrow shown by being assigned with reference sign 146 expresses a combustion pressure that works on the piston 12. The combustion pressure 146 reaches a large value when the piston 12 slightly passes the top dead center in an explosion stroke. The two figures illustrated in FIG. 29 each shows a state where the large combustion pressure 146 works on the piston 12.

The piston 12 is connected to the crankpin 18 via the conn-rod 14. Consequently, a reaction force 148 of the combustion pressure 146 is inputted to the piston 12 from the conn-rod 14. When the conn-rod 14 inclines at $\delta$ [deg] with respect to the axis line 142 of the piston 12, the reaction force 148 includes a horizontal component 150 expressed by (reaction force 148*sin $\delta$). The horizontal component 150 acts as a force that presses the piston 12 against an in-cylinder side wall.

With the structure of the comparative example in which the axis line 142 of the reciprocating motion of the piston 12 overlies the center of the CS main shaft 22, the large combustion pressure 146 is exerted on the piston 12 at a state where the conn-rod 14 inclines with respect to the axis line 142. Consequently, in this configuration, the large horizontal component 150 is generated, and friction of the piston 12 is prone to be large.

According to the manner of the offset crank, the inclination angle $\delta$ of the conn-rod 14 at the time of the large combustion pressure 146 working on the piston 12 can be set at a small value. Consequently, according to the configuration, the piston 12 can perform reciprocating motion in the cylinder without receiving the large horizontal component 150. Consequently, according to the configuration of the present embodiment, friction of the piston 12 can be reduced, and fuel efficiency is enhanced, as compared with the configuration of the comparative example.

(Asymmetry Due to Offset)

Figure 30:
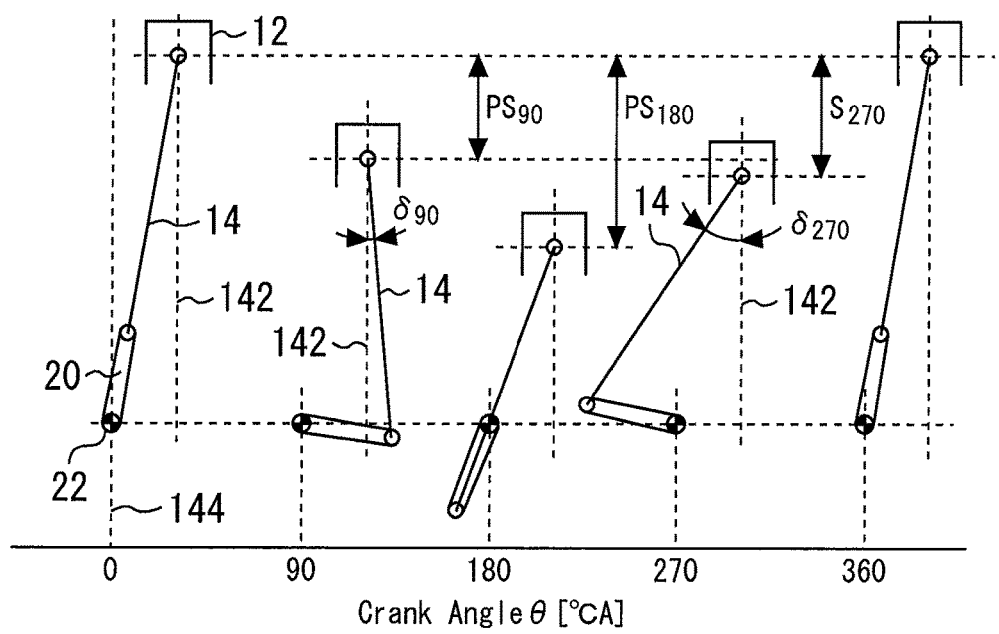
FIG. 30 is a diagram for explaining a relation between the position of a piston in the internal combustion engine shown in FIG. 28 and a crank angle.
Figure 31:
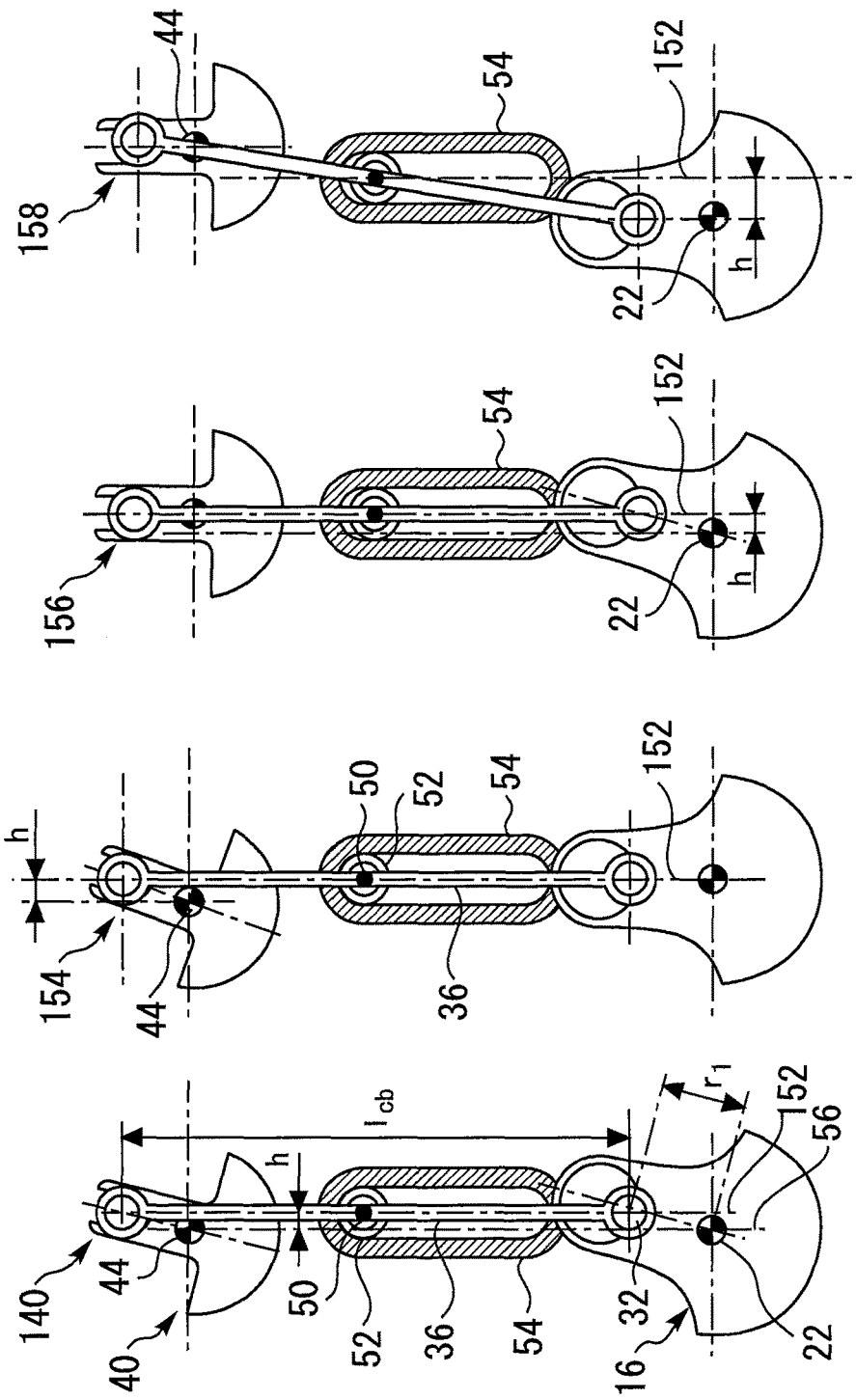
FIG. 31A is a diagram for explaining a configuration of a sixth embodiment of the present invention.
FIG. 31B is a diagram for explaining a configuration of a first modification of the sixth embodiment of the present invention.
FIG. 31C is a diagram for explaining a configuration of a second modification of the sixth embodiment of the present invention.
FIG. 31D is a diagram for explaining a configuration of a third modification of the sixth embodiment of the present invention.

FIG. 30 is a diagram for explaining asymmetry of a speed profile shown by the piston 12 in the present embodiment. In FIG. 30, the piston 12 is located at the top dead center at the crank angle $\theta=0$[° CA], and is located at the bottom dead center at $\theta=180$[° CA].

With respect to the crank angle $\theta$, $\theta=90$[° CA] and $\theta=270$[° CA] are middle points between the top dead center and the bottom dead center. However, between the inclination angle $\delta 90$ of the conn-rod 14 at $\theta=90$[° CA] and the inclination angle $\delta$ 270 at $\theta=270$[° CA], a large difference occurs due to an influence of the offset crank. As a result, a piston stroke PS90 that occurs at the crank angle $\theta=90$[° CA], and a piston stroke PS270 that occurs at $\theta=270$ [° CA] have different values. Inevitably, a stroke (PS180-PS90) that occurs when $\theta$ changes from 90 to 180[° CA], and a stroke (PS270-PS180) that occurs when $\theta$ changes from 180 to 270[° CA] also have different values.

As described, in the internal combustion engine 10 in which the manner of the offset crank is used, the piston 12 shows asymmetrical displacement profiles in a process of an outward way the crank angle $\theta$ going from the top dead center to the bottom dead center, and a process of a return way going from the bottom dead center to the top dead center. When the displacement profiles are asymmetrical, inertial forces that occur with the displacements also become asymmetrical. Consequently, in order to cancel out the inertial force generated by the piston 12 of the internal combustion engine 10 with high precision, it is effective to cause the balance device 140 to generate an asymmetrical vibration causing force.

(Configuration of Balance Device of Present Embodiment)

FIG. 31A illustrates a configuration of the balance device 140 that is used in the present embodiment. The balance device 140 is similar to the balance device 30 (refer to FIG. 2) in the first embodiment except for a point that the CS-BS center line 56 that connects the center of the CS main shaft 22 and the BS axial shaft 44 is offset to be separated from an axis line 152 of the guide section 54 by a distance h. Hereunder, in FIG. 31A, common elements to the elements illustrated in FIG. 2 will be assigned with the common reference signs and explanation thereof will be omitted or simplified.

In the balance device 140 illustrated in FIG. 31A, the slide portion 52 of the connection rod 36 performs a rectilinear motion inside the guide section 54 with rotation of the crankshaft 16. With the motion, the pivot 50 of the connection rod 36 moves along the axis line 152 of the guide section 54. If the pivot 50 moves on the CS-BS center line 56, the BS rotation angle $\alpha$ would show symmetrical change profiles in a process of an outward way in which the crank angle $\theta$ changes from zero to 180[° CA], and a process of a return way in which $\theta$ changes from 180 to 360[° CA]. However, when the pivot 50 moves on the axis line 152 which deviates from the CS-BS center line 56, the profiles of the BS rotation angle $\alpha$ become asymmetrical in the process of the outward way and the process of the return way.

Asymmetry of the BS rotation angle $\alpha$ as above occurs because that the pivot 50 moves on the axis line 152 deviated from the CS-BS center line 56. FIGS. 31B, 31C and 31D illustrate examples of other balance devices in which asymmetry like this occurs. More specifically, FIG. 31B illustrates a balance device 154 in which the center of the BS axial shaft 44 is offset by the distance h from the axis line 152 of the guide section 54. FIG. 31C illustrates a balance device 156 in which the center of the CS main shaft 22 is offset by the distance h from the axis line 152 of the guide section 54. Further, FIG. 31D illustrates a balance device 158 in which both the center of the CS main shaft 22 and the center of the BS axial shaft 44 are offset by the distance h respectively in opposite directions, from the axis line 152. These balance devices 154, 156 and 158 can be used by being properly replaced with the balance device 140 illustrated in FIG. 31A in accordance with asymmetry of the inertial force that is generated by the piston 12.

(Vibration Causing Force Generated by Balance Device of Present Embodiment)

Hereunder, with reference to FIGS. 32 to 34 as well as FIG. 31A, an vibration causing force that is generated by the balance device 140 of the present embodiment will be described. Various dimensions of the balance device 140 become various parameters that have an influence on the profile of the BS rotation angle $\alpha$. Here, a result of simulation will be described. The simulation is carried out by fixing a ratio r1/1cb of the rotation radius r1 of the CS connected point 32 and a length 1cb of the connection rod 36 to an ordinary value, and changing a ratio h/r1 of an offset value h and the rotation radius r1 to "−a", "−b" and "+a".

Note that signs of "+" and "−" assigned to "a" and "b" express differences in direction in which offset by the distance h is performed.

Figure 32:
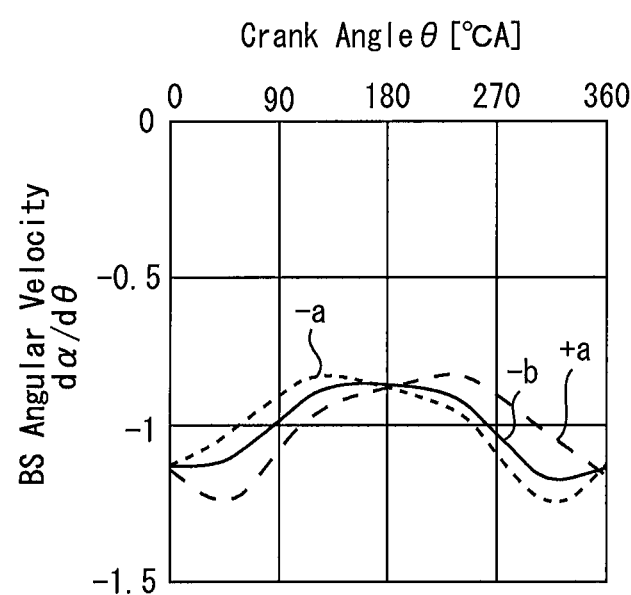
FIG. 32 is a diagram illustrating a relation between a crank angle θ and a BS angular velocity dα/dθ in the configuration shown in FIG. 31A, using an offset ratio h/r as a parameter.

FIG. 32 illustrates a relation between the crank angle θ and a BS angular velocity dα/dθ. Since the balance shaft 40 rotates in an opposite direction to the crankshaft 16, the BS angular velocity dα/dθ becomes −1 if α and θ show the same change. For example, in a waveform of "−a", such asymmetry appears that a change of a is small with respect to θ in an outward way going from the top dead center to the bottom dead center, and a tendency opposite to the above appears in a return way from the bottom dead center to the top dead center. Further, in a waveform of "−b", smaller asymmetry as compared with the waveform of "−a" appears. Further, in a waveform of "+a", asymmetry opposite to the asymmetry of "−a" appears.

As above, the balance device 140 of the present embodiment can generate the BS angular velocity dα/dθ that has asymmetry profiles in the outward way and the return way. On the balance shaft 40, centrifugal force proportional to the square of the angular velocity and the reaction force to the angular velocity work. The balance shaft 40 generates the vibration causing force corresponding to the composite value of the centrifugal force and reaction force. In the present embodiment, the BS angular velocity dα/dθ has the asymmetrical profiles, and therefore the vibration causing force generated by the balance shaft 40 also has asymmetrical profiles in the outward way and the return way similarly to the inertial force of the piston 12.

Figure 33:
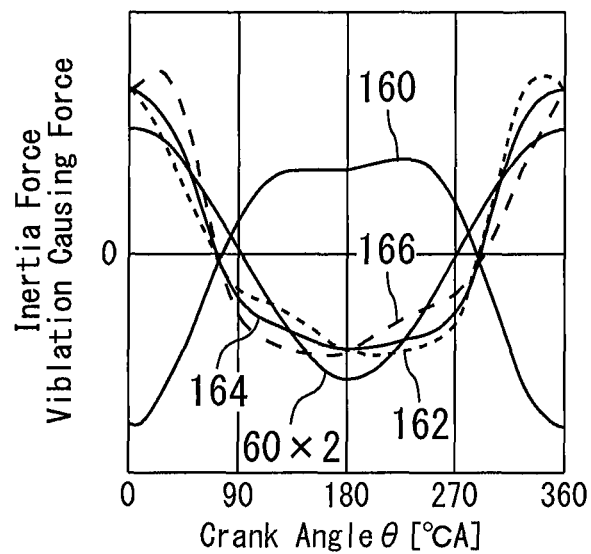
FIG. 33 illustrates profiles of an inertial force generated by a piston of an internal combustion engine and a resultant vibration causing force generated by the balance device shown in FIG. 31A.

FIG. 33 is a diagram showing a vibration causing force obtained by compositing an vibration causing force Y component generated by the crankshaft 16 and an vibration causing force Y component generated by the balance shaft 40, in comparison with the inertial force of the piston 12. Five kinds of waveforms illustrated in FIG. 33 are respectively described as follows.

Waveform 60×2: corresponding to twice as large as the vibration causing force Y component generated by the crankshaft 16 (refer to FIG. 8)

Waveform 160: asymmetrical inertial force generated by the piston 12

Waveform 162: corresponding to a composite of an vibration causing force Y component generated by the balance shaft 40 under a condition of "−a", and the vibration causing force Y component generated by the crankshaft 16

Waveform 164: corresponding to a composite of an vibration causing force Y component generated by the balance shaft 40 under a condition of "−b", and the vibration causing force Y component generated by the crankshaft 16

Waveform 166: corresponding to a composite of an vibration causing force Y component generated by the balance shaft 40 under a condition of "+a", and the vibration causing force Y component generated by the crankshaft 16

The vibration causing force generated by the crankshaft 16 is in a sine wave shape with substantially no distortion with respect to a change of the crank angle θ. If the balance shaft 40 rotates at an equal speed to the speed of the crankshaft 16, the vibration causing forces generated by both of them would be substantially the same. In this case, an inertial force generated by the balance device 140 would show substantially symmetrical profiles in the outward way and the return way as shown by the waveform 60×2. The waveforms 162, 164 and 166 all have asymmetrical profiles. Since the inertial force generated by the piston 12 has asymmetry, these waveforms 162, 164 and 166 are considered to have higher ability as compared with the waveform 60×2, in regard with cancelling out the inertial force of the piston 12.

Figure 34:
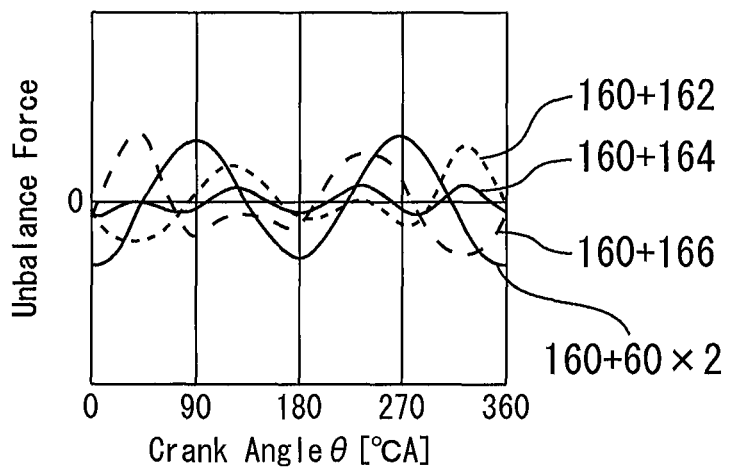
FIG. 34 is a diagram showing a result obtained by composing the resultant vibration causing force and the inertial force generated by the piston, both of which being shown in FIG. 33.

FIG. 34 illustrates waveforms of unbalance forces remaining in the internal combustion engine 10 as a result of compositing various kinds of vibration causing forces illustrated in FIG. 33 with the inertial force of the piston 12. Meanings of the waveforms illustrated in FIG. 34 are respectively described as follows.

Waveform 160+162: unbalance force remaining in the internal combustion engine 10 under the condition of "−a"

Waveform 160+164: unbalance force remaining in the internal combustion engine 10 under the condition of "−b"

Waveform 160+166: unbalance force remaining in the internal combustion engine 10 under the condition of "+a"

Waveform 160+60×2: unbalance force remaining in the internal combustion engine 10 when the balance shaft 40 is operated by a gear mechanism As illustrated in FIG. 34, under any of the conditions, according to the balance device 140 of the present embodiment, the remaining unbalance force can be reduced, as compared with the case of operating the balance shaft 40 by the gear mechanism. In particular, in the simulation of this time, in the case of using the condition of "−b", the remaining unbalance force can be set at a sufficiently small value (refer to the waveform 160+164). In this way, according to the configuration of the present embodiment, even in the case where the manner of offset crank is used, excellent quietness can be also given to the internal combustion engine 10 with the compact mechanism using the connection rod 36.

Seventh Embodiment

Configuration of Seventh Embodiment

Next, a seventh embodiment of the present invention will be described with reference to FIGS. 35 to 38.

Figure 35:
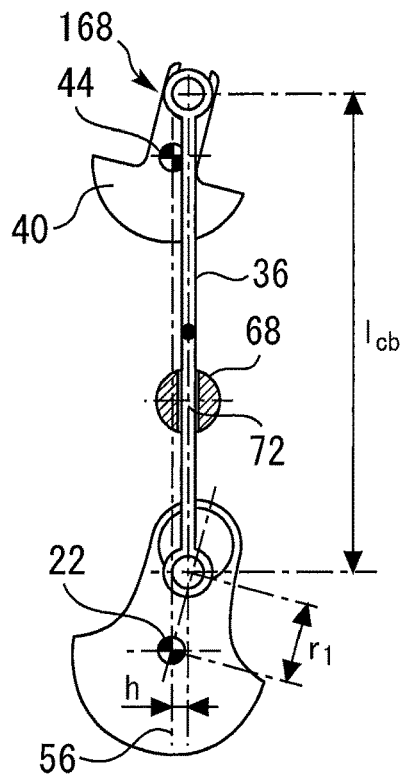
FIG. 35 is a diagram for explaining a configuration of a seventh embodiment of the present invention.

FIG. 35 is a diagram for explaining a configuration of a balance device 168 that is used in the seventh embodiment of the present invention. A configuration of the present embodiment is similar to the configuration of the first embodiment (refer to FIG. 1), or the configuration of the sixth embodiment (refer to FIG. 28), except for a point that the balance device 30 is replaced with the balance device 168.

Further, the balance device 168 of the present embodiment is similar to the balance device 66 in the second embodiment (refer to FIG. 14) except for a point that the center of the rotating shaft 72 of the guide section 68 is offset to be separated from the CS-BS center line 56 by the distance h. Hereunder, in FIG. 35, the same or common elements as or to the elements illustrated in FIG. 14 will be assigned with the common reference sings and explanation thereof will be omitted or simplified.

The balance device 168 of the present embodiment is adapted to the manner of offset crank similarly to the balance device 140 of the sixth embodiment. In other words, the balance device 168 illustrated in FIG. 35 rotates the balance shaft 40 asymmetrically at an unequal speed in the process in which the crank angle θ changes from zero to 180[° CA], and the process in which θ changes from 180 to 360[° CA], similarly to the balance device 140 in the sixth embodiment.

If the center of the rotating shaft 72 of the guide section 68 overlies the CS-BS center line 56 in the balance device 168 illustrated in FIG. 35, the BS rotation angle α would show symmetrical change profiles at a positive side (90[°

CA] side) and a negative side (270[° CA] side) with the crank angle θ=0[° CA] as a boundary. However, when the center of the rotating shaft 72 is deviated from the CS-BS center line 56, the above described symmetry is broken, and the change profiles of the BS rotation angle α becomes asymmetrical.

Figure 36:
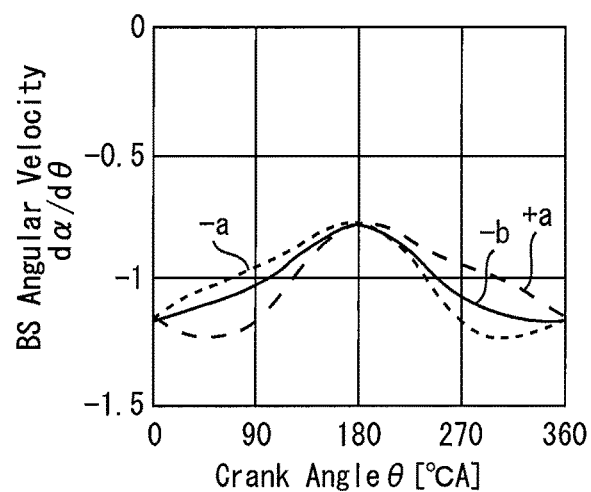
FIG. 36 is a diagram illustrating a relation between a crank angle θ and a BS angular velocity dα/dθ in the configuration shown in FIG. 35, using an offset ratio h/r as a parameter.
Figure 37:
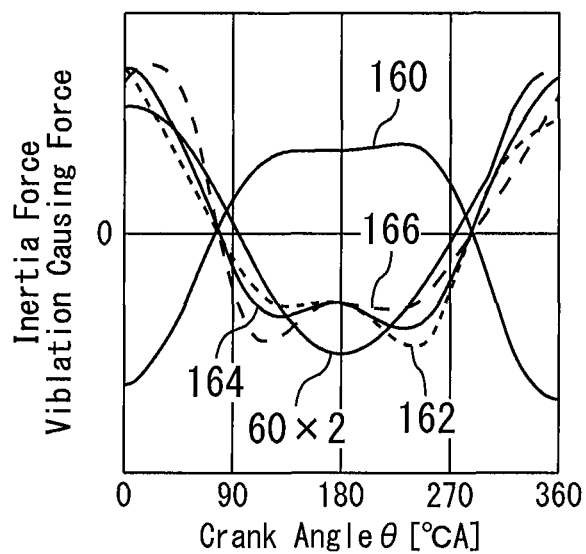
FIG. 37 illustrates profiles of an inertial force generated by a piston of an internal combustion engine and a resultant vibration causing force generated by the balance device shown in FIG. 35.
Figure 38:
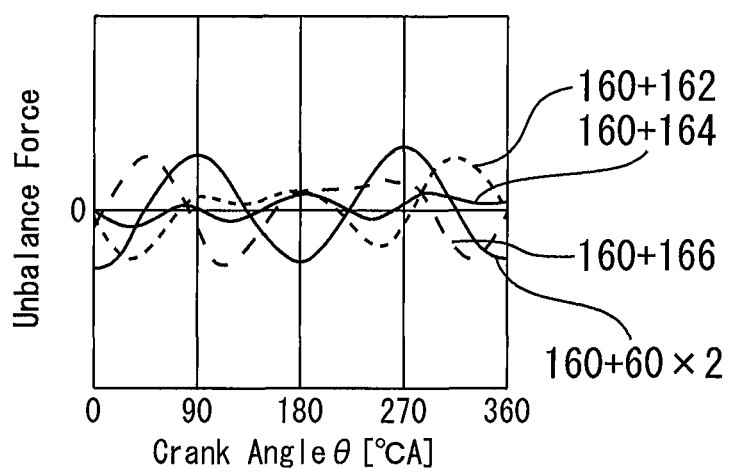
FIG. 38 is a diagram showing a result obtained by composing the resultant vibration causing force and the inertial force generated by the piston, both of which being shown in FIG. 37.

FIGS. 36, 37 and 38 respectively correspond to FIGS. 32, 33 and 34 in the aforementioned sixth embodiment. Explanations of these drawings are common to the explanations of the corresponding drawings, and therefore redundant explanation will be omitted here.

As illustrated in FIGS. 36 to 38, by the balance device 168 in the present embodiment, asymmetrical vibration causing force that is suitable for canceling out an asymmetrical inertial force can be generated as in the case of the sixth embodiment. Consequently, according to the configuration of the present embodiment, excellent quietness can be also given to the internal combustion engine 10 in which the manner of offset crank is used, without hindering reduction in size and weight, as in the case of the sixth embodiment.

Eighth Embodiment

Configuration of Eighth Embodiment

Next, an eighth embodiment of the present invention will be described with reference to FIGS. 39 to 45.

Figure 39:
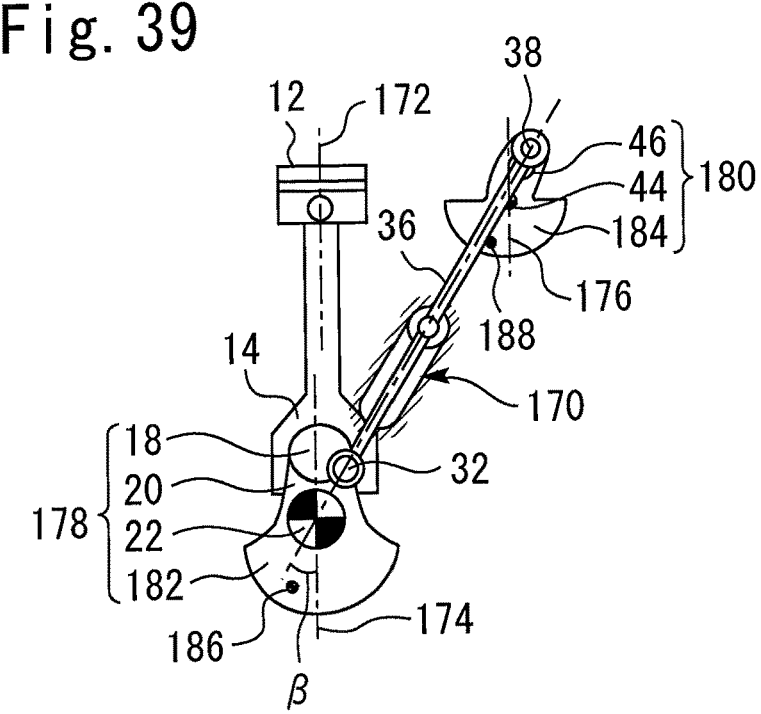
FIG. 39 is a diagram for explaining a configuration of a eighth embodiment of the present invention.

FIG. 39 illustrates a configuration of an internal combustion engine on which a balance device 170 of the eighth embodiment of the present invention is mounted. The balance device 170 has the connection rod 36 that is disposed by being inclined with respect to an axis line 172 of the reciprocating motion of the piston 12 as in the cases of the first to seventh embodiments described above. Here, an inclination angle of the axis line 172 of the piston 12 and the connection rod 36 is assumed to be "p" degree. Further, a straight line that is parallel with the axis line 172 of the piston 12 and passes through the CS main shaft 22, and a straight line that passes through the BS axial shaft 44 are respectively referred to as a "CS axis line 174" and a "BS axis line 176".

The balance device 170 of the present embodiment includes a crankshaft 178 and a balance shaft 180. The crankshaft 178 and the balance shaft 180 respectively have a CS eccentric weight 182 and a BS eccentric weight 184. The balance device 170 of the present embodiment is similar to the balance device 30 (refer to FIG. 1) of the first embodiment, except for a point that the CS eccentric weight 182 and the BS eccentric weight 184 include centers of gravity 186 and 188 in positions respectively shown by black circle points in FIG. 39.

Figure 40:
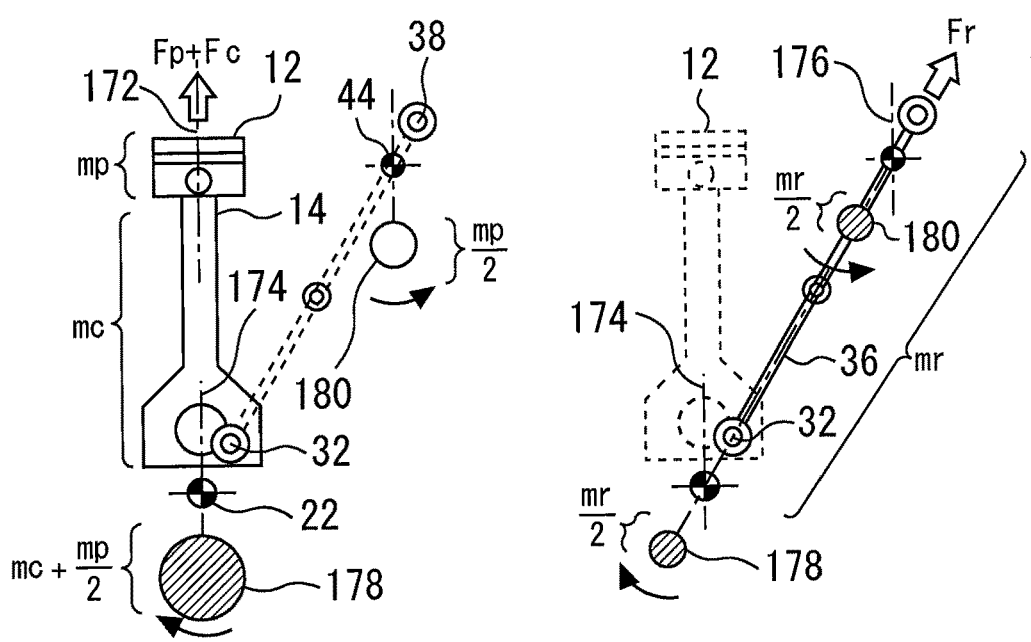
FIG. 40 is a diagram for explaining a principle of how the balance device shown in FIG. 39 cancels out vibration causing forces.

FIG. 40 is a diagram for explaining a principle of how the balance device 170 of the present embodiment cancels out the vibration causing forces that occur in the internal combustion engine. Specifically, a left side in FIG. 40 is a figure illustrating conditions which the CS eccentric weight 182 and the BS eccentric weight 184 should satisfy in order to cancel out an vibration causing force Fp caused by the piston 12, and an vibration causing force Fc caused by the conn-rod 14. Further, a right side in FIG. 40 is a figure illustrating conditions which the CS eccentric weight 182 and the BS eccentric weight 184 should satisfy in order to cancel out the vibration causing force Fc caused by the connection rod 36. Hereunder, similarly to the explanation in the first embodiment, the weight of the piston 12 is expressed by "mp", and the weight of the conn-rod is expressed by "mc". Further, in the present embodiment, a weight of the connection rod 36 is expressed by "mr".

Two figures illustrated in FIG. 40 both express a state of a time at which the piston 12 reaches the top dead center. At this occasion, the piston 12 and the conn-rod 14 generate an vibration causing force (Fp+Fc) corresponding to "mp+mc" upward in FIG. 40 along the axis line 172 of the reciprocating motion of the piston 12. In order to cancel out the vibration causing force (Fp+Fc), the CS eccentric weight 182 and the BS eccentric weight 184 need to generate an vibration causing force of the same magnitude downward in FIG. 40.

In the present embodiment, in order to respond to the above described requirement, the CS eccentric weight 182 is caused to be in charge of a downward vibration causing force in FIG. 40 that corresponds to "mc+mp/2", as illustrated at the left side in FIG. 40. Further, the BS eccentric weight is caused to be in charge of a downward vibration causing force in FIG. 40 that corresponds to "mp/2". According to the setting like this, the vibration causing force (Fp+Fc) that are generated by the piston 12 and the conn-rod 14 at the top dead center can be properly cancelled out.

Under the situation where the piston 12 reaches the bottom dead center, the piston 12 and the conn-rod 14 generate a vibration causing force (Fp+Fc) with a direction inverted from the case of the top dead center. At this time, the CS eccentric weight 182 and the BS eccentric weight 184 also generate the vibration causing forces with directions inverted. Consequently, according to the above described setting, the vibration causing forces can be also cancelled out by each other at the bottom dead center.

Between the top dead center and the bottom dead center, the piston 12 only moves vertically along the axis line 172 of the reciprocating motion of the piston 12, and generates no vibration causing force other than that in the direction of the axis line 172. The conn-rod 14 rotates around the CS main shaft 22, and generates the vibration causing force Fc corresponding to a centrifugal force of the weight mc. At this stage, the CS eccentric weight 182 that similarly rotates generates an vibration causing force corresponding to the centrifugal force of the weight "mc+mp/2". The vibration causing force Fc caused by the conn-rod 14 is cancelled out by a part corresponding to "mc" of the vibration causing force of the CS eccentric weight 182. Further, a remaining part of the vibration causing force generated by the CS eccentric weight 182, that is, a part corresponding to "mp/2" is canceled out by the vibration causing force of the BS eccentric weight 184 that rotates in an opposite direction to the CS eccentric weight 182. In this way, according to the condition illustrated at the left side in FIG. 40, the vibration causing force (Fp+Fc) accompanying the motions of the piston 12 and the conn-rod 14 can be always cancelled out by the CS eccentric weight 182 and the BS eccentric weight 184.

The figure at the right side of FIG. 40 illustrates a state where the connection rod 36 reaches an operation end at an upper right side in FIG. 40 synchronously with the piston 12 reaching the top dead center. In this state, the connection rod 36 generates the vibration causing force Fr toward an upper right in FIG. 40 at an inclination angle of β degree with respect to the CS axis line 174. In the present embodiment, in order to cancel out the vibration causing force Fr, the CS eccentric weight 182 and the BS eccentric weight 184 are caused to generate vibration causing forces directing to an lower left side in FIG. 40 each corresponding to the weight of "mr/2", Under the situation illustrated in FIG. 40, the CS eccentric weight 182 and the BS eccentric weight 184 respectively generate vibration causing forces each corresponding to the weight "mr/2". The vibration causing forces go toward lower left side in FIG. 40 at the angle of β degree with respect to the CS axis line 174 and the BS axis line 176. According to the vibration causing forces, the vibration causing force Fr caused by the connection rod 36 can be properly cancelled out.

When the piston 12 reaches the bottom dead center, the connection rod 36 generates the vibration causing force Fr corresponding to the weight mr toward lower left side in FIG. 40. At this time, the CS eccentric weight 182 and the BS eccentric weight 184 generate vibration causing forces upward to a right in FIG. 40. Consequently, according to the above described setting, the vibration causing force caused by the connection rod 36 can be also canceled out at the bottom dead center.

Between the top dead center and the bottom dead center, the connection rod 36 does not generate a large vibration causing force. On the other hand, the weight "mr/2" that is given to the CS eccentric weigh 182, and the weight "mr/2" that is given to the BS eccentric weight 184 generate vibration causing forces while rotating in the opposite directions respectively. These vibration causing forces are in the opposite directions to each other, and therefore are cancelled out.

When the CS eccentric weight 182 and the BS eccentric weight 184 satisfy the conditions shown at the right side in FIG. 40, the vibration causing force accompanying the motion of the connection rod 36 can be always cancelled out by the CS eccentric weight 182 and the BS eccentric weight 184.

In the present embodiment, the conditions illustrated at the left side in FIG. 40 and the conditions illustrated at the right side are composited and are imposed on the CS eccentric weigh 182 and the BS eccentric weight 184 respectively. Specifically, the CS eccentric weight 182 and the BS eccentric weight 184 are respectively given such weights and centers of gravity as to satisfy conditions described as follows.

<CS Eccentric Weight>

The CS eccentric weight generates the vibration causing force that is obtained by compositing two vibration causing forces having magnitudes and directions described as follows when the piston 12 reaches the top dead center.
(1) Magnitude: corresponding to weight (mc+mp/2)
   Direction: opposite direction to the vibration causing force Fp (hereunder, referred to as a "counter-Fp direction")
(2) Magnitude: corresponding to weight (mr/2)
   Direction: opposite direction to the vibration causing force Fr (hereunder, referred to as a "counter-Fr direction")

<BS Eccentric Weight>

Figure 41:
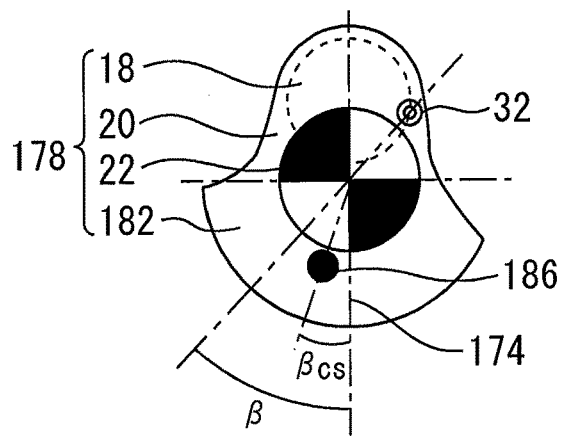
FIG. 41 is a diagram for explaining a position of the center of gravity of a CS eccentric weight provided in the balance device shown in FIG. 39.

The BS eccentric weight generates the vibration causing force that is obtained by compositing two vibration causing forces having magnitudes and directions described as follows when the piston 12 reaches the top dead center.
(1) Magnitude: corresponding to the weight (mp/2)
   Direction: counter-Fp direction
(2) Magnitude: corresponding to the weight (mr/2)
   Direction: counter-Fr direction FIG. 41 is an enlarged view of the crankshaft 178 illustrated in FIG. 39, that is, the crankshaft 178 that is used in the present embodiment. The crankshaft 178 has the weight and the center of gravity that satisfy the above described conditions. Specifically, the crankshaft 178 has a weight of substantially (mc+mp/2+mr/2), and has the center of gravity 186 in a position illustrated by a black circle point in FIG. 41.

If the crankshaft 178 is made so as to cancel out only the vibration causing force (Fp+Fc) caused by the piston 12 and the conn-rod 14, the position of the center of gravity 186 at the top dead center would desirably overlie the CS axis line 174. In contrast with this, in the present embodiment, in order to cancel out the vibration causing force Fr caused by the connection rod 36, the position of the center of gravity 186 is shifted to the side of the counter-Fr direction by (acs degree from the CS axis line 174. That is, the crankshaft 178 of the present embodiment has the center of gravity 186 at an opposite side of the CS connected point 32 with respect to the CS axis line 174. Note that a shift angle βcs degree of the center of gravity 186 inevitably becomes an angle smaller than the inclination angle β degree of the connection rod 36.

Figure 42:
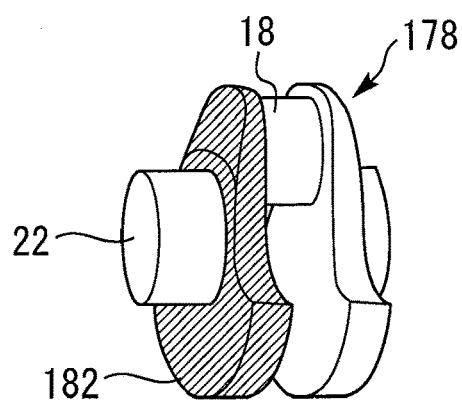
FIG. 42 is a perspective view for explaining features of a crankshaft provided in the balance device shown in FIG. 39.

FIG. 42 is a perspective view of the crankshaft 178. Here, the connection rod 36 is assumed to be connected at the left side of the crankshaft 178. The crankshaft 178 has two CS eccentric weights 182 with the crankpin 18 therebetween. The vibration causing force (Fp+Fc) of the piston 12 and the conn-rod 14 works on the crankpin 18. Consequently, a weight "mc+mp/2" that cancels out the vibration causing force is desirably distributed uniformly to the two CS eccentric weights 182. On the other hand, the vibration causing force Fr caused by the connection rod 36 works on a vicinity of the left end in FIG. 42 of the crankshaft 178. If the weight for canceling out the vibration causing force Fr is applied to the CS eccentric weight 182 at the right side in FIG. 42, the vibration causing force Fr which is generated by the connection rod 36 and the vibration causing force which is generated by the CS eccentric weight 182 at the right side in FIG. 42 would give large moment to the crankshaft 178. Consequently, the weight "mr/2" for canceling out the vibration causing force Fr caused by the connection rod 36 is desirably given to the CS eccentric weight 182 at a side near the connection rod 36.

In the present embodiment, in response to the above described requirement, only a half the weight of "mc+mp/2" is given to the CS eccentric weight 182 at the right side in FIG. 42. Note that the center of gravity of this CS eccentric weight 182 itself is present in a position that overlies the CS axis line 174 at the top dead center. The CS eccentric weight 182 at the left side in FIG. 42 is given all the weight of "mr/2" in addition to a half the weight of "mc+mp/2". Note that the weight "mr/2" is given to the CS eccentric weight 182 at the left side in FIG. 42 so that the centers of gravity of the two CS eccentric weights 182 become the center of gravity 186 illustrated in FIG. 41. According to the setting like this, the vibration causing force Fr caused by the connection rod 36 can be cancelled out without causing large moment to work on the crankshaft 178.

Figure 43:
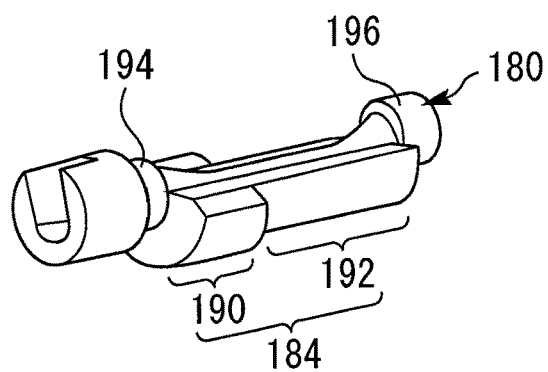
FIG. 43 is a perspective view for explaining features of a balance shaft provided in the balance device shown in FIG. 39.

FIG. 43 is an enlarged view of the balance shaft 180 illustrated in FIG. 39, that is, the balance shaft 180 used in the present embodiment. Here, the connection rod 36 is assumed to be disposed at the left side of the balance shaft 180. The BS eccentric weight 184 of the balance shaft 180 has a large diameter portion 190 and a small diameter portion 192. The large diameter portion 190 is provided in a vicinity of one end 194 at a side to be connected to the connection rod 36. The small diameter portion 192 is provided at the other end 196 side of the balance shaft 180.

The BS eccentric weight 184 is given a weight of substantially "mp/2+mr/2". Of the weight, a weight "mp/2" for canceling out the vibration causing force Fp caused by the piston 12 is distributed equally to the large diameter portion 190 and the small diameter portion 192. On the other hand, a weight "mr/2" for canceling out the vibration causing force Fr caused by the connection rod 36 is given to only the large diameter portion 190. As a result, the large diameter portion 190 has a larger outside diameter than the small diameter portion 192.

The center of gravity 188 of the BS eccentric weight 184 is provided at an opposite side of the BS connected point 38 with the BS axis line 176 between the BS connected point 38 and the center of gravity 188, as in the case of the crankshaft 178 (refer to FIG. 39). Specifically, the center of gravity 188 of the BS eccentric weight 184 is deviated from the BS axis line 176 by a fixed angle in the inclining direction of the connection rod 36. The deviation angle inevitably becomes a smaller angle than the inclination angle β degree of the connection rod 36. According to the setting like this, the vibration causing force Fr caused by the connection rod 36 can be cancelled out without causing large moment to work on the balance shaft 180.

Figure 44:
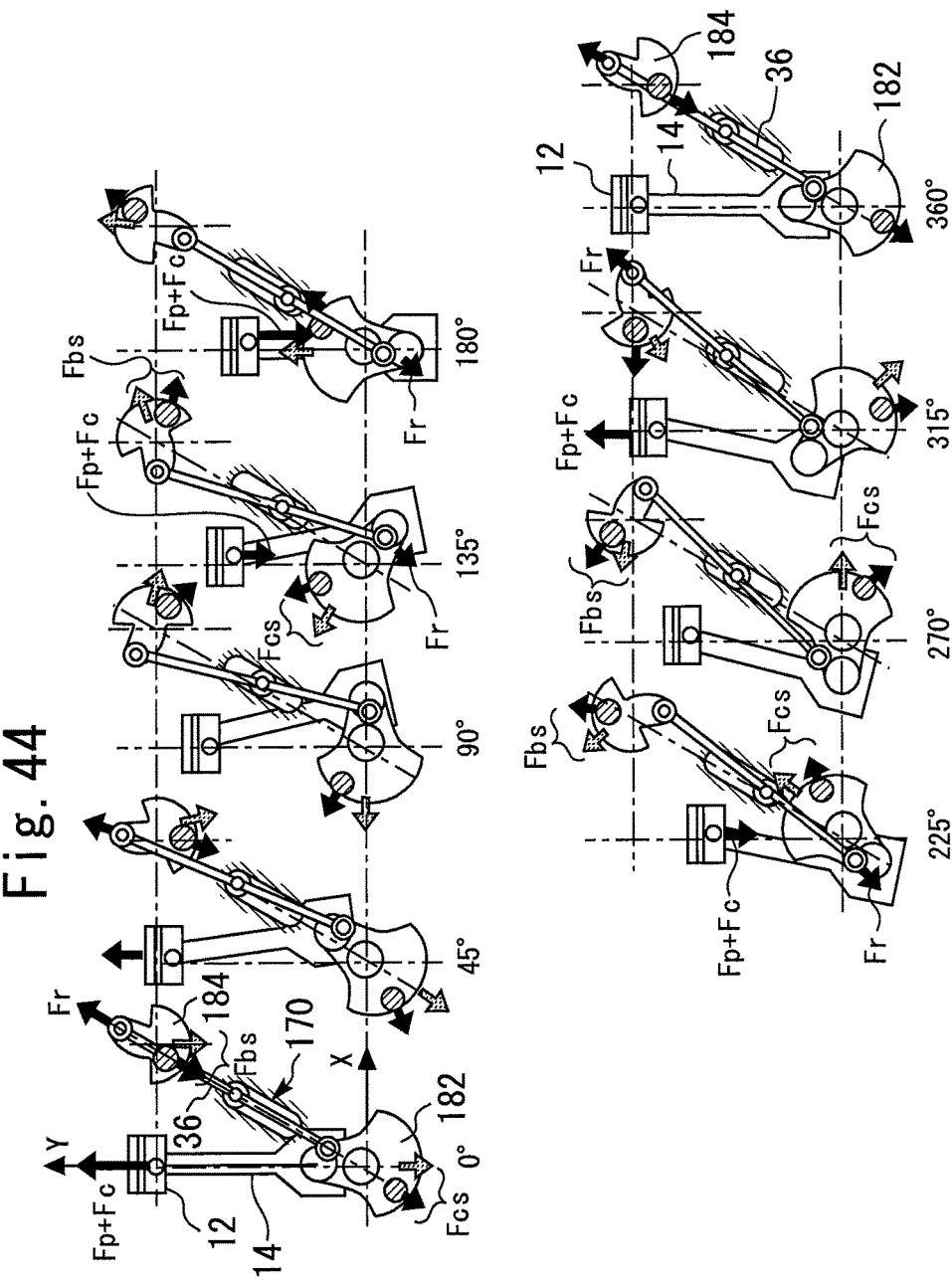
FIG. 44 is a diagram for explaining an operation of the balance device shown in FIG. 39.

FIG. 44 is a diagram for explaining an operation of the internal combustion engine loaded with the balance device 170 of the present embodiment. Specifically, FIG. 44 expresses a state of the internal combustion engine at intervals of 45[° CA] from 0[° CA] to 360[° CA]. In FIG. 44, the vibration causing force generated by the CS eccentric weight 182 is denoted as Fcs, and the vibration causing force generated by the BS eccentric weight 184 is denoted as Fbs. Note that the vibration causing forces Fcs and Fbs are expressed by being decomposed into two vibration causing forces that are an vibration causing force for canceling out (Fp+Fc), and an vibration causing force for canceling out Fr, in order to facilitate understanding. As illustrated in FIG. 44, according to the configuration of the present embodiment, not only the vibration causing force (Fp+Fc) caused by the piston 12 and the conn-rod 14, but also the vibration causing force Fr caused by the connection rod 36 can be always canceled out properly.

Modification Example of Eighth Embodiment

Figure 45:
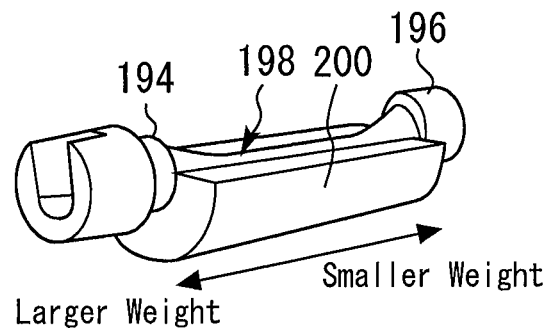
FIG. 45 is a perspective view for explaining features of another balance shaft applicable to use in the balance device according to the eighth embodiment of the present invention.

FIG. 45 is a perspective view of another example of the balance shaft that is applicable to the balance device 170 of the present embodiment. A balance shaft 198 illustrated in FIG. 45 has a BS eccentric weight 200. The BS eccentric weigh 200 is formed in such a manner that an outside diameter becomes gradually smaller from one end 194 at a side to be connected to the connection rod 36 to the other end 196. According to the configuration like this, the weight mr for canceling out the vibration causing force Fr caused by the connection rod 36 can be reflected on the side of the one end 194 more significantly as compared with the side of the other end 196, as in the case of the balance shaft 180 illustrated in FIG. 43. Consequently, according to the balance shaft 198 illustrated in FIG. 45, the vibration causing force Fr can be also canceled out without generating large moment.

Incidentally, in the aforementioned eighth embodiment, the weight for canceling out the vibration causing force Fr caused by the connection rod 36 is reflected significantly on the side near to the connection rod 36. However, the feature is not essential to the present invention. That is, the weight [mr/2] that is given to the crankshaft 178 to cancel out the vibration causing force Fr may be uniformly distributed to the two CS eccentric weights 182. Likewise, for the balance shaft 180, the weight [mr/2] may be uniformly distributed to an entire region of the balance shaft 180.

Further, in the aforementioned eighth embodiment, the configuration for canceling out the vibration causing force Fr caused by the connection rod 36 is incorporated into the balance device in the first embodiment, but the present invention is not limited to this. That is, it is possible to incorporate the configuration for canceling out the vibration causing force Fr into any of the second to seventh embodiments.

Further, in the aforementioned eighth embodiment, the weight for canceling out the vibration causing force Fr caused by the connection rod 36 is uniformly reflected in the CS eccentric weight 182 and the BS eccentric weight 184, but the present invention is not limited to this. That is, the weight for canceling out the vibration causing force Fr may be non-uniformly reflected in the CS eccentric weight 182 and the BS eccentric weight 184. This point similarly applies to a ninth embodiment that will be described later.

Ninth Embodiment

Next, the ninth embodiment of the present invention will be described with reference to FIGS. 46 to 51.

Figure 46:
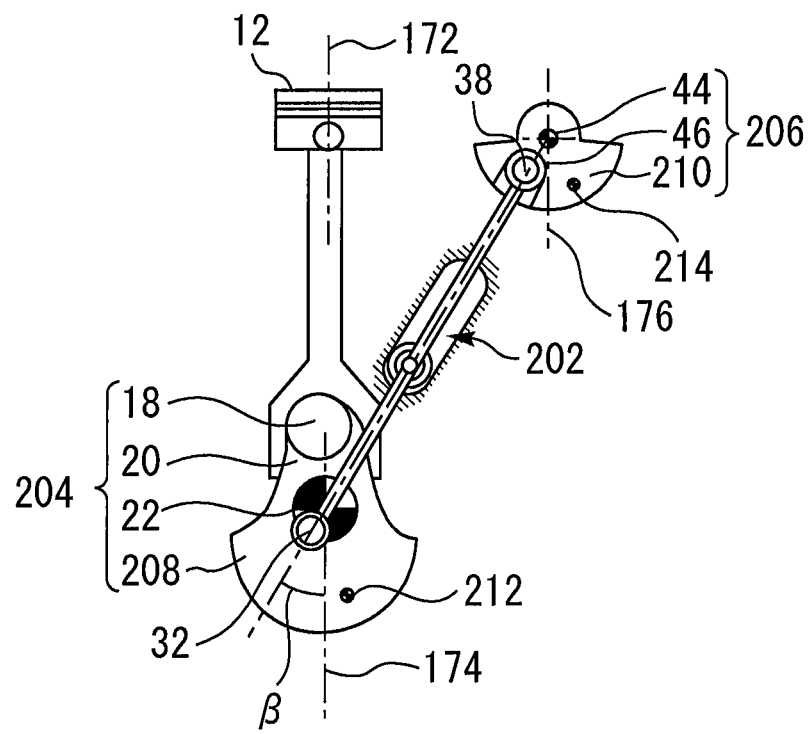
FIG. 46 is a diagram for explaining a configuration of a ninth embodiment of the present invention.

FIG. 46 illustrates a configuration of an internal combustion engine on which a balance device 202 of the ninth embodiment of the present invention is mounted. The balance device 202 includes a crankshaft 204 and a balance shaft 206. The crankshaft 204 and the balance shaft 206 have a CS eccentric weight 208 and a BS eccentric weight 210 respectively. The balance device 202 of the present embodiment is similar to the balance device 170 (refer to FIG. 39) of the eighth embodiment except for two points as follows.

(1) The CS connected point 32 is provided at a weight side of the CS eccentric weight 208 with respect to the CS main shaft 22, and the BS connected point 38 is provided at a weight side of the BS eccentric weight 210 with respect to the BS axial shaft 44.

(2) The CS eccentric weight 208 and the BS eccentric weight 210 include centers of gravity 212 and 214 in positions that are shown by black circle points in FIG. 46, respectively.

Figure 47:
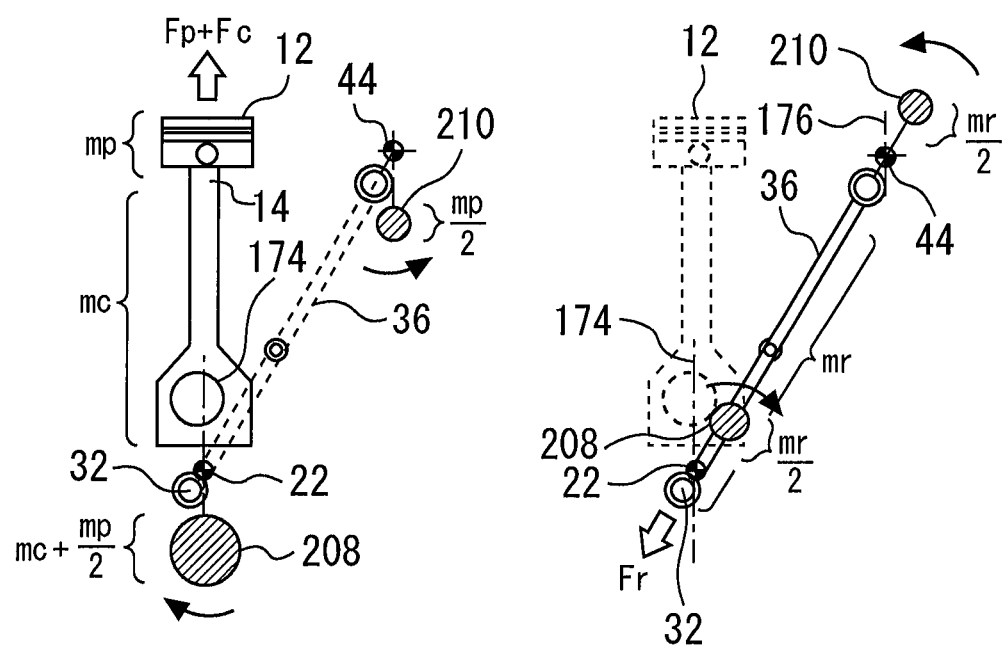
FIG. 47 is a diagram for explaining a principle of how the balance device shown in FIG. 46 cancels out vibration causing forces.

FIG. 47 is a diagram for explaining a principle of the balance device 202 of the present embodiment canceling out vibration causing forces that are generated in the internal combustion engine. A left side in FIG. 47 is a figure illustrating conditions which the CS eccentric weight 208 and the BS eccentric weight 210 should satisfy to cancel out the vibration causing force (Fp+Fc) caused by the piston 12 and the conn-rod 14. The conditions are substantially similar to the conditions explained in the eighth embodiment with reference to the left side column in FIG. 40.

Two figures illustrated in FIG. 47 each express a state at a time of the piston 12 reaching the top dead center. In the configuration of the present embodiment, the connection rod 36 displaces to a lower left from an upper right in FIG. 47 in a process of the piston 12 moving from the bottom dead center to the top dead center. Under a situation at the top dead center, the connection rod 36 reaches a movable end at a lower left side in FIG. 47.

A figure at the right side in FIG. 47 illustrates a state where the connection rod 36 reaches a movable end at the lower left side in FIG. 47 synchronously with the piston 12 reaching the top dead center. In this state, the connection rod 36 generates the vibration causing force Fr toward the lower left side in FIG. 47 at the inclination angle of β degree with respect to the CS axis line 174. In the present embodiment, in order to cancel out the vibration causing force Fr, the CS eccentric weight 208 and the BS eccentric weight 210 are caused to generate vibration causing forces toward the upper right side in FIG. 47 that correspond to the weight of "mr/2" respectively, under the situation of the top dead center.

Under the situation illustrated in FIG. 47, the CS eccentric weight 208 and the BS eccentric weight 210 respectively generate the vibration causing forces corresponding to the weight "mr/2". These vibration causing forces are directed to the upper right in FIG. 47 at the angle of β degree with respect to the CS axis line 174 and the BS axis line 176. According to these vibration causing forces, the vibration causing force Fr caused by the connection rod 36 can be properly canceled out.

When the piston 12 reaches the bottom dead center, the connection rod 36 reaches a movable end at an upper right side in FIG. 47, and generates the vibration causing force Fr corresponding to the weight mr toward the upper right side. At this occation, the CS eccentric weight 208 and the BS eccentric weight 210 generate vibration causing forces toward the lower left side in FIG. 47. Consequently, according to the above described setting, the vibration causing force caused by the connection rod 36 can be also canceled out at the bottom dead center.

Between the top dead center and the bottom dead center, the connection rod 36 does not generate a large vibration causing force. On the other hand, the weight "mr/2" that is given to the CS eccentric weight 208 and the weight "mr/2" that is given to the BS eccentric weight 210 cancel out vibration causing forces mutually while respectively rotating in the opposite directions.

As described above, in the case of the CS eccentric weight 208 and the BS eccentric weight 210 satisfying the conditions illustrated at the right side in FIG. 47, the vibration causing force accompanying the motion of the connection rod 36 can be always canceled out by the CS eccentric weight 208 and the BS eccentric weight 210.

In the present embodiment, the conditions illustrated at the left side in FIG. 47 and the conditions illustrated at the right side are compositely imposed on the CS eccentric weight 208 and the BS eccentric weight 210, respectively. Specifically, the weights and the centers of gravity that satisfy conditions described as follows are respectively given to the CS eccentric weight 208 and the BS eccentric weight 210.

<CS Eccentric Weight>

The CS eccentric weight generates an vibration causing force obtained by compositing two vibration causing forces having magnitudes and directions described as follows when the piston 12 reaches the top dead center.
(1) Magnitude: corresponding to weight (mc+mp/2)
   Direction: counter-Fp direction
(2) Magnitude: corresponding to weight (mr/2)
   Direction: counter-Fr direction <BS Eccentric Weight>

Figure 48:
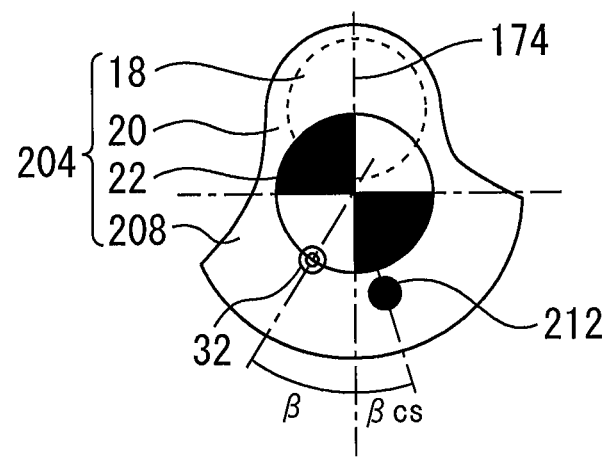
FIG. 48 is a diagram for explaining a position of the center of gravity of a CS eccentric weight provided in the balance device shown in FIG. 46.

The BS eccentric weight generates an vibration causing force obtained by compositing two vibration causing forces having magnitudes and directions described as follows when the piston 12 reaches the top dead center.
(1) Magnitude: corresponding to weight (mp/2)
   Direction: counter-Fp direction
(2) Magnitude: corresponding to weight (mr/2)
   Direction: counter-Fr direction FIG. 48 is an enlarged diagram of the crankshaft 204 illustrated in FIG. 46, that is, the crankshaft 204 for use in the present embodiment. The crankshaft 204 has a weight and the center of gravity that satisfy the above described conditions. Specifically, the crankshaft 204 has a weight of substantially (mc+mp/2−mr/2), and has the center of gravity 212 in a position shown by a black circle point in FIG. 48.

If the crankshaft 204 cancels out only the vibration causing force (Fp+Fc) caused by the piston 12 and the conn-rod 14, the position of the center of gravity 212 at the top dead center would desirably overlie the CS axis line 174. In regard with this, in the present embodiment, in order to cancel out the vibration causing force Fr caused by the connection rod 36, the position of the center of gravity 212 is shifted by (acs degree to the side of the counter-Fr direction from the CS axis line 174. That is, the crankshaft 204 of the present embodiment has the center of gravity 212 at an opposite side of the CS connected point 32, with respect to the CS axis line 174.

The crankshaft 204 includes the two CS eccentric weights 208 similarly to the crankshaft 178 illustrated in FIG. 42. In the present embodiment, the weight "Fr/2" for canceling out the vibration causing force Fr caused by the connection rod 36 is reflected only in the CS eccentric weight 208 which is disposed near to the connection rod 36, as in the case of the eighth embodiment. Specifically, the CS eccentric weight 208 which is disposed in the position far from the connection rod 36 is given a half the weight "mc+mp/2" for canceling out the vibration causing force (Fp+Fc). On the other hand, the CS eccentric weight 208 which is disposed near to the connection rod 36 is given a weight "(mc+mp/2)/2−mr/2" that is a result of subtracting the weight "mr/2" for canceling out the vibration causing force Fr from a half the weight "mc+mp/2". The latter CS eccentric weight 208 is formed so that the centers of gravity of the two CS eccentric weights 208 become the center of gravity 212 illustrated in FIG. 48. According to the configuration like this, the vibration causing force Fr caused by the connection rod 36 can be cancelled out without causing large moment to work on the crankshaft 204 as in the case of the eighth embodiment.

Figure 49:
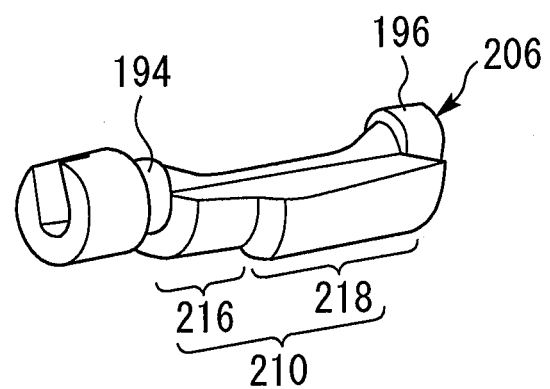
FIG. 49 is a perspective view for explaining features of a balance shaft provided in the balance device shown in FIG. 46.

FIG. 49 is an enlarged view of the balance shaft 206 illustrated in FIG. 46, that is, the balance shaft 206 which is used in the present embodiment. The BS eccentric weight 210 of the balance shaft 206 is provided with a small diameter portion 216 and a large diameter portion 218. The small diameter portion 216 is formed in a vicinity of the one end 194 at a side that is connected to the connection rod 36. The large diameter portion 218 is formed in a vicinity of the other end 196 of the balance shaft 206.

The BS eccentric weight 210 is given a weight of substantially "mp/2−mr/2". Of the weight, a weight "mp/2" is distributed equally to the small diameter portion 216 and the large diameter portion 218. A reduction amount "mr/2" of the weight is reflected in only the small diameter portion 216. The center of gravity 214 of the BS eccentric weight 210 is provided at an opposite side of the BS connected point 38 with the BS axis line 176 between the BS connected point 38 and the center of gravity 214 as in the case of the crankshaft 204 (refer to FIG. 46). According to the setting like this, the vibration causing force Fr caused by the connection rod 36 can be canceled out without causing large moment to work on the balance shaft 206.

Figure 50:
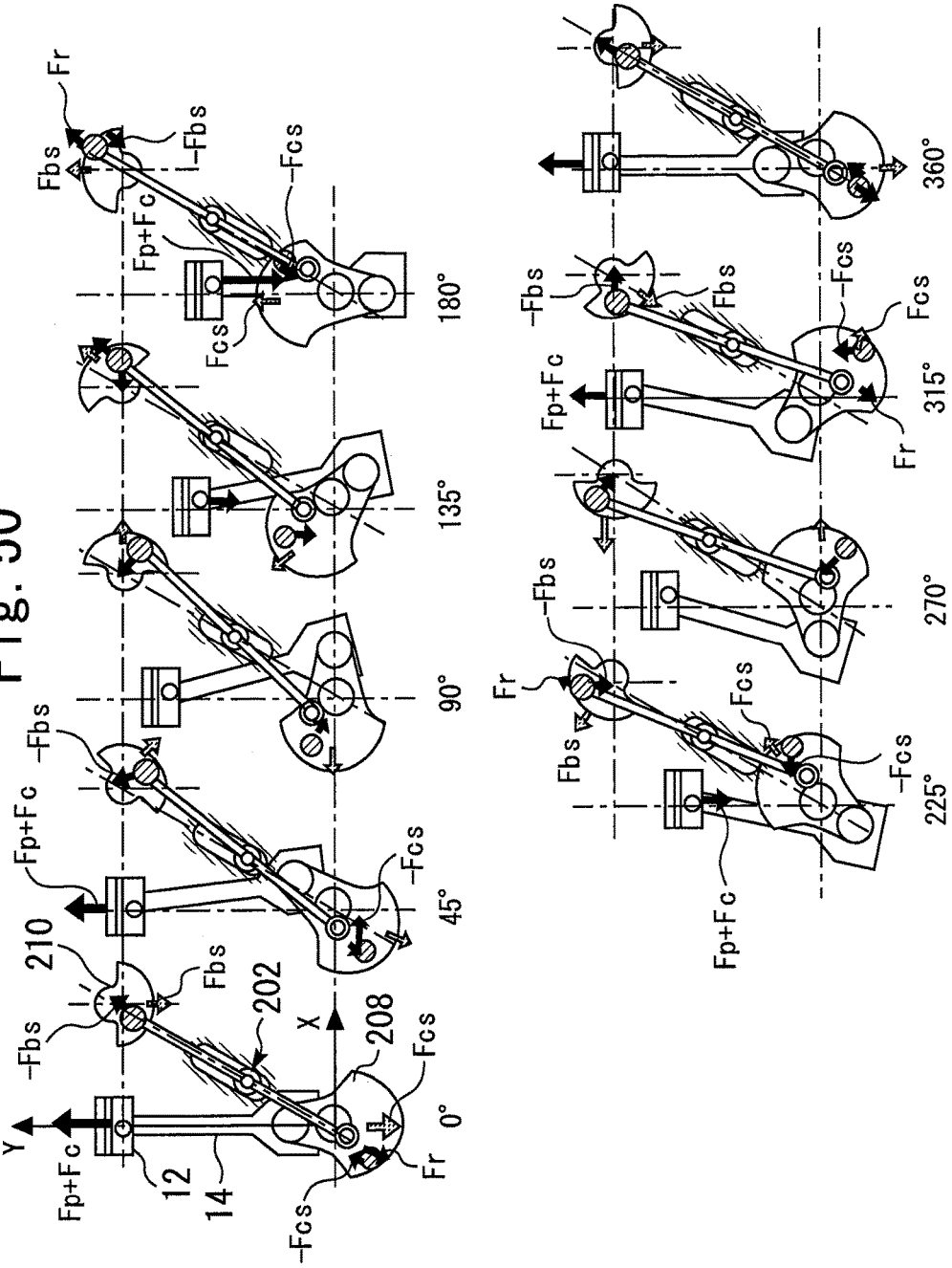
FIG. 50 is a diagram for explaining an operation of the balance device shown in FIG. 46.

FIG. 50 is a diagram for explaining an operation of the internal combustion engine on which the balance device 202 of the present embodiment is mounted. Specifically, FIG. 50 expresses a state of the internal combustion engine at intervals of 45 [° CA] from 0[° CA] to 360[° CA]. In FIG. 50, the vibration causing force generated by the CS eccentric weight 208 is expressed by Fcs and (−Fcs). "Fcs" denotes a virtual vibration causing force corresponding to the weight "mc+mp/2", and "−Fcs" denotes a virtual minus vibration causing force that is generated by a reduction amount "-mr/2" of the weight. In reality, the CS eccentric weight 208 generates a vibration causing force corresponding to a resultant vector of a vector of "Fcs" and a vector of "-Fcs".

FIG. 50 similarly expresses the vibration causing force generated by the BS eccentric weight 210 by Fbs and (-Fbs). "Fbs" denotes a virtual vibration causing force corresponding to a weight "mp/2", "-Fbs" denotes a virtual minus vibration causing force that is generated by a reduction amount "-mr/2" of the weight. In reality, the BS eccentric weight 210 generates an vibration causing force corresponding to a resultant vector of a vector of "Fbs" and a vector of "-Fbs".

As illustrated in FIG. 50, according to the configuration of the present embodiment, the vibration causing force (Fp+Fc) caused by the piston 12 and the conn-rod 14 is cancelled out by the vibration causing force (Fcs+Fbs) caused by the CS eccentric weight 208 and the BS eccentric weight 210. Further, the vibration causing force Fr caused by the connection rod 36 is canceled out by the weight reduction effect (-Fcs-Fbs) of the CS eccentric weight 208 and the BS eccentric weight 210. Consequently, according to the configuration of the present embodiment, the vibration causing forces accompanying the operation of the internal combustion engine can be always canceled out properly.

Modification Example of Ninth Embodiment

Figure 51:
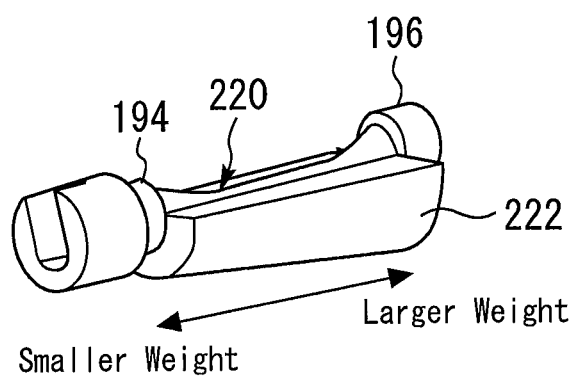
FIG. 51 is a perspective view for explaining features of another balance shaft applicable to use in the balance device according to the ninth embodiment of the present invention.

FIG. 51 is a perspective view of another example of the balance shaft which is applicable to the balance device 202 of the present embodiment. A balance shaft 220 illustrated in FIG. 51 has a BS eccentric weight 222. The BS eccentric weight 222 is formed in such a manner that an outside diameter becomes gradually larger from one end 194 at a side that is connected to the connection rod 36 to the other end 196. According to the configuration like this, the weight mr for canceling out the vibration causing force Fr caused by the connection rod 36 can be reflected on the side of the one end 194 more significantly as compared with the side of the other end 196, as in the case of the balance shaft 206 illustrated in FIG. 49. Consequently, according to the balance shaft 220 illustrated in FIG. 51, the vibration causing force Fr can be also canceled out without generating large moment.

Incidentally, in the aforementioned ninth embodiment, the weight for canceling out the vibration causing force Fr caused by the connection rod 36 is reflected significantly on the side near to the connection rod 36. However, the feature is not essential to the present invention. That is, the weight [mr/2] that is subtracted from the crankshaft 204 to cancel out the vibration causing force Fr may be uniformly subtracted from the two CS eccentric weights 208. Likewise, as for the balance shaft 206, the weight [mr/2] may be uniformly subtracted from an entire region of the balance shaft 206.

Further, in the aforementioned ninth embodiment, the configuration for canceling out the vibration causing force Fr caused by the connection rod 36 is incorporated into the balance device based on the first embodiment, but the present invention is not limited to this. That is, it is also possible to incorporate the configuration for canceling out the vibration causing force Fr into a balance device based on any of the second to seventh embodiments.

Tenth Embodiment

Configuration of Tenth Embodiment

Next, a tenth embodiment of the present invention will be described with reference to FIGS. 52 to 60.

The balance device 30 (refer to FIG. 1) of the aforementioned first embodiment is configured so that the BS connected point 38 can slide in a radial direction of the balance shaft 40. Hereunder, this type will be referred to as "a slide type". Among the balance devices disclosed here, the balance devices in the second embodiment (refer to FIG. 14), the sixth embodiment (refer to FIG. 28), the seventh embodiment (refer to FIG. 35), the eighth embodiment (refer to FIG. 39) and the ninth embodiment (refer to FIG. 46) are of a slide type, in addition to the balance device of the first embodiment.

Meanwhile, in the balance device 78 of the third embodiment, the BS connected point 38 is connected to the balance shaft 80 so that only relative rotation is enabled. Hereunder, this type will be referred to as "a link type". Among the balance devices disclosed here, the balance devices in the fourth embodiment (refer to FIG. 19) and the fifth embodiment (refer to FIG. 25) are of a link type, in addition to the balance device of the third embodiment.

Figure 52:
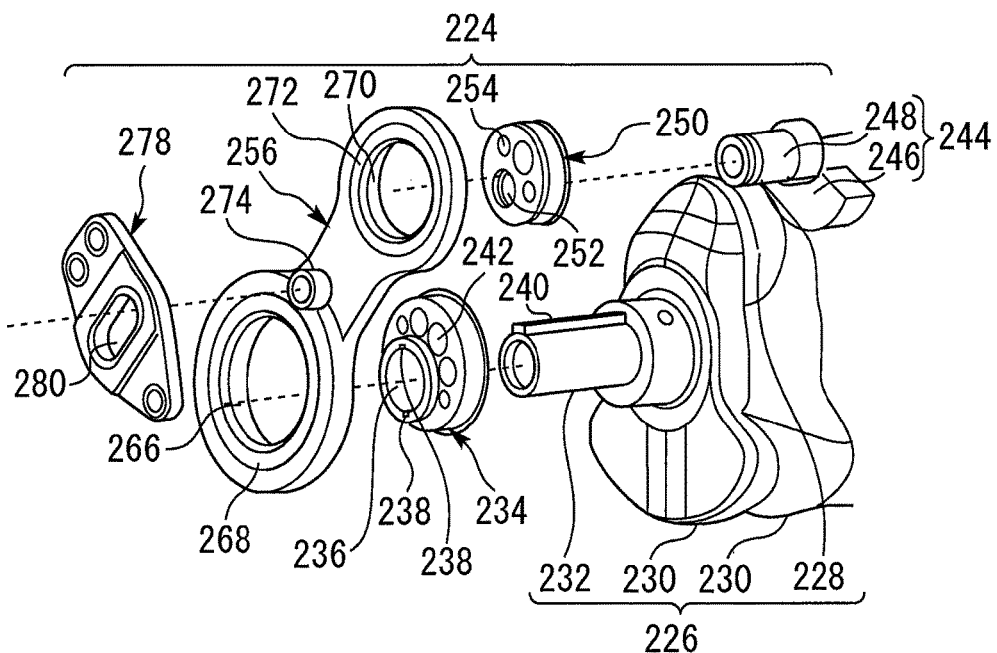
FIG. 52 is an exploded perspective view of a balance device according to a tenth embodiment of the present invention.

FIG. 52 is an exploded perspective view of a balance device 224 of the tenth embodiment of the present invention. The balance device 224 of the present embodiment has a feature in the point of providing one example of a specific configuration realizing the balance device of the link type described above.

The balance device 224 includes a crankshaft 226. The crankshaft 226 includes a crankpin 228. The crankpin 288 is connected to a piston (not illustrated) of an internal combustion engine via a conn-rod (not illustrated). CS eccentric weights 230 are provided at both sides of the crankpin 228. Further, the crankshaft 226 includes a CS main shaft 232 as a rotating shaft thereof.

The balance device 224 includes a CS side eccentric shaft 234 that is fixed to the CS main shaft 232. The CS side eccentric shaft 234 is provided with a through-hole 236 that is in a fitting relation with the CS main shaft 232. The through-hole 236 is provided in a position that is eccentric by a fixed value from a center of the CS side eccentric shaft 234. The through-hole 236 is provided with a positioning groove 238. The CS side eccentric shaft 234 is attached to the CS main shaft 232 so that a positioning guide 240 on the CS main shaft 232 is engaged with the positioning groove 238. As a result, the CS side eccentric shaft 234 is fixed to the CS main shaft 232 in a state in which relative rotation is not allowed. The CS side eccentric shaft 234 is provided with a plurality of lightening holes 242 in positions that do not interfere with the through-hole 236.

The balance device 224 includes a balance shaft 244. The balance shaft 244 includes a BS eccentric weight 246. Further, the balance shaft 244 includes a BS axial shaft 248 that is parallel with the CS main shaft 232. The balance shaft 244 can rotate with the BS axial shaft 248 as a rotating shaft.

A BS side eccentric shaft 250 is attached to the BS axial shaft 248. The BS side eccentric shaft 250 is provided with a through-hole 252 that is in a fitting relation with the BS axial shaft 248. The through-hole 252 is provided in a position that is eccentric by a fixed value from a center of the BS side eccentric shaft 250. The BS side eccentric shaft 250 is fixed to the BS axial shaft 248 in a state in which relative rotation is not allowed, as in the case of the CS side eccentric shaft 234. The BS side eccentric shaft 250 is further provided with a plurality of lightening holes 254 in positions that do not interfere with the through-hole 252.

The balance device 224 includes a connection rod 256.

Figure 53:
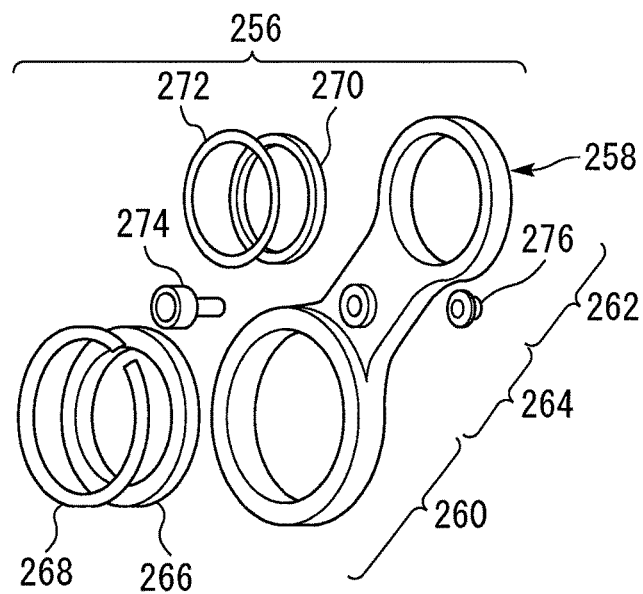
FIG. 53 is an exploded perspective view of the connection rod shown in FIG. 52.

FIG. 53 is an exploded perspective view of the connection rod 256. As illustrated in FIG. 53, the connection rod 256 includes a connection rod main body 258. The connection rod main body 258 includes a CS side ring-shaped portion 260 and a BS side ring-shaped portion 262. The CS side ring-shaped portion 260 and the BS side ring-shaped portion 262 are integrated by a connection portion 264.

After a CS side bearing 266 is housed in the CS side ring-shaped portion 260, a retaining ring 268 is attached to the CS side ring-shaped portion 260. The retaining ring 268 prevents falling-off of the CS side bearing 266. Likewise, after a BS side bearing 270 is housed in the BS side ring-shaped portion 262, a retaining ring 272 is attached to the BS side ring-shaped portion 262. The retaining ring 272 prevents falling-off of the BS side bearing 270. The CS side bearing 266 and the BS side bearing 270 are roller bearings each containing a plurality of bearing balls.

A pivot 274 is fitted in the connection portion 264 of the connection rod 256. The pivot 274 can function as a roller bearing. The pivot 274 is fixed by a nut 276 that is disposed at an opposite side with the connection portion 264 between the pivot 274 and the nut 276.

Explanation will be continued with reference to FIG. 52 again. The aforementioned CS side eccentric shaft 234 is inserted into the CS side bearing 266. As a result, the CS side eccentric shaft 234 is rotatably held by the connection rod 256. Likewise, the aforementioned BS side eccentric shaft 250 is inserted into the BS side bearing 270. As a result, the BS side eccentric shaft 250 is rotatably held by the connection rod 256.

The balance device 224 includes a guide section 278. The guide section 278 has a long hole 280 inside it. The guide section 278 is fixed to a predetermined position so that the pivot 274 is housed in the long hole 280. The long hole 280 has a width slightly larger than a diameter of the pivot 274, and guides a motion of it so that the pivot 274 draws a trajectory of a figure eight, similarly to the guide section 82 in the third embodiment.

Figure 54:
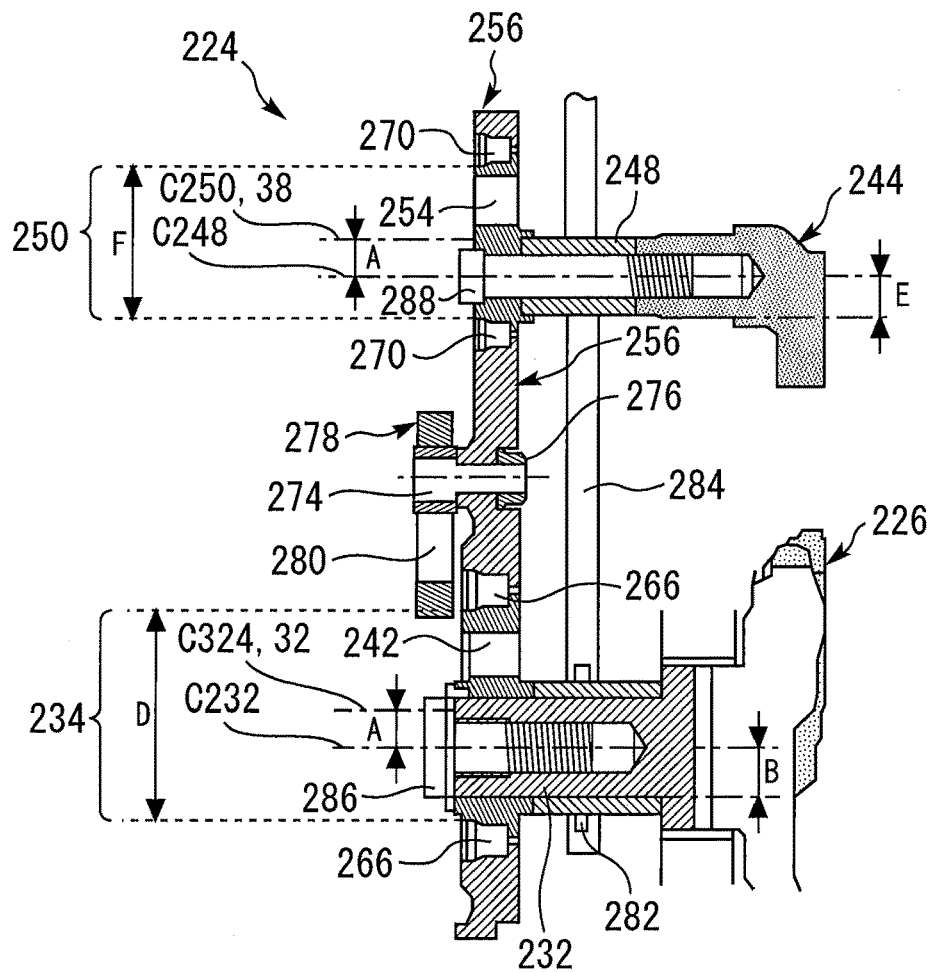
FIG. 54 is a side sectional view of the main section of the balance device according to the tenth embodiment of the present invention.

FIG. 54 is a side sectional view of the balance device 224 of the present embodiment. In FIG. 54, a section of the balance shaft 244 is drawn at an upper side, and a section of the crankshaft 26 is drawn at a lower side, respectively. In the internal combustion engine, the crankshaft 226 functions as a drive source of an oil pump as well as a drive source of a timing chain that drives an intake and exhaust valves. Here, as one example, a state is illustrated, in which a sprocket 282 is provided at the CS main shaft 232, and a timing chain 284 is laid on the sprocket 282.

As illustrated in FIG. 54, the CS side eccentric shaft 234 is attached to a tip end of the CS main shaft 232 by a set bolt 286. Hereunder, a center point of the CS main shaft 232 will be referred to as "C232", and a center point of the CS side eccentric shaft 234 will be referred to as "C234". In the present embodiment, an eccentric amount A is ensured between the point of C232 and the point of C234.

As described above, the CS main shaft 232 is fixed to the CS side eccentric shaft 234 so that relative rotation does not occur. Consequently, when the CS main shaft 232 rotates, the CS side eccentric shaft 234 rotates with the CS main shaft 232 while keeping the eccentric amount A. At this time, the point of C234 draws a circular trajectory having a radius A with the point of C232 as a center.

The CS side eccentric shaft 234 is rotatably held inside the connection rod 256. Consequently, the connection rod 256 can rotate around the CS side eccentric shaft 234 with the point of C234 as a center of rotation. The CS side eccentric shaft 234 is integrated with the crankshaft 226. Accordingly, the connection rod 256 and the crankshaft 226 are relatively rotatable with the point of C234 as a center. From this point, the center point C234 of the CS side eccentric shaft 234 corresponds to the CS connected point 32 in the aforementioned third embodiment.

When the CS main shaft 232 rotates 90[° CA] from the state illustrated in FIG. 54, the point of C234 lowers to the same height as the point of C232. During this rotation, the connection rod 256 moves by the distance A in a downward direction in FIG. 54. When the CS main shaft 232 further rotates 90[° CA], the point of C234 moves to a point which is downwardly away from the point of C232 by the distance A. During this rotation, the connection rod 256 further strokes by the distance A so as to reach a movable end at the lower side in FIG. 54. In this manner, according to the configuration of the present embodiment, with rotation of the crankshaft 226, the connection rod 256 can be caused to generate a reciprocating motion of a stroke distance 2A.

Incidentally, in the present embodiment, the CS main shaft 232 has a radius B. Consequently, a distance from the center point C234 of the CS side eccentric shaft 234 to an outer circumference of the CS main shaft 232 is "A+B" at the maximum. In the present embodiment, a diameter of the CS side eccentric shaft 234 is set at a sufficiently large value so that a distance of A+B is sufficiently within a radius (D/2) of the CS side eccentric shaft 234. Consequently, according to the present embodiment, the through-hole 236 (refer to FIG. 52) which can house an entire diameter of the CS main shaft 232 can be ensured within an outside diameter of the CS side eccentric shaft 234 without losing desired strength.

As illustrated at the upper side in FIG. 54, the BS side eccentric shaft 250 is attached to a tip end of the BS axial shaft 248 by a set bolt 288. Hereunder, a center point of the BS axial shaft 248 will be referred to "C248", and a center point of the BS side eccentric shaft 250 will be referred to as "C250". In the present embodiment, the eccentric amount A is ensured between the point of C248 and the point of C250 similarly to the side of the CS main shaft 232.

When the crankshaft 226 rotates in such a manner that the center point C234 of the CS side eccentric shaft 234 rotates from the state illustrated in FIG. 54 to a front side of the figure with the point of C232 as a center, the guide section 278 functions similarly to the guide section 82 in the third embodiment. Specifically, the guide section 278 does not allow the pivot 274 to displace to the front side of the figure at this time, and restricts the motion of the pivot 274 to a motion toward a back side of the figure. As a result, a motion that displaces the BS side eccentric shaft 250 to the back side of the figure occurs to the connection rod 256.

The motion of the BS side eccentric shaft 250 is restricted by the connection rod 256 and the BS axial shaft 248. On the other hand, the BS side eccentric shaft 250 can rotate inside the connection rod 256. According to restriction of the connection rod 256, the BS side eccentric shaft 250 needs to displace to a lower side of the figure in order to displace from the state illustrated in FIG. 54 to the back side of the figure, at the same time. Further, the point of C248 is fixed by the BS axial shaft 248, and therefore, the above described displacement has to occur while the distance between the point of C250 and the point of C248 is kept at the eccentric amount A.

When rotation of the crankshaft 226 is continued from the state illustrated in FIG. 54 under the restriction condition like the above, the BS side eccentric shaft 250 shows such a motion as to revolve around the BS axial shaft 248 in such a manner that the center point C250 thereof draws a circular orbit having the radius A with the point of C248 as a center. As described above, the BS side eccentric shaft 250 is fixed to the BS axial shaft 248 so as not to rotate relatively.

Consequently, rotation of the BS side eccentric shaft 250 is directly transmitted to the BS axial shaft 248.

In the configuration of the present embodiment, the connection rod 256 can rotate relatively to the BS side eccentric shaft 250 with the axis line passing through the point of C250 as an axis of rotation. The BS side eccentric shaft 250 is integrated with the balance shaft 244. Accordingly, the connection rod 256 and the balance shaft 244 are relatively rotatable with the point of C250 as a center. In this respect, the center point C250 of the BS side eccentric shaft 250 corresponds to the BS connected point 38 in the link type balance device (refer to FIG. 15).

While the BS side eccentric shaft 250 revolves around the BS axial shaft 248 once, the point of C250 shows a reciprocating motion of the stroke distance 2A. During this movement, the connection rod 256 similarly shows a reciprocating motion of the stroke distance 2A. The reciprocating motion is performed synchronously with a reciprocating motion that occurs at the side of the CS main shaft 232. As a result, according to the configuration of the present embodiment, the operation and the function explained in the third embodiment can be realized.

Incidentally, in the present embodiment, the BS axial shaft 248 has a radius E. Consequently, a distance from the center point C250 of the BS side eccentric shaft 250 to an outer circumference of the BS axial shaft 248 is "A+E" at the maximum. In the present embodiment, a diameter F of the BS side eccentric shaft 250 is set at a sufficiently large value so that the distance of A+E is sufficiently housed in a radius (F/2) of the BS side eccentric shaft 250. Consequently, according to the present embodiment, the through-hole 252 (refer to FIG. 52) which can house the entire diameter of the BS axial shaft 248 can be secured within the outside diameter of the BS side eccentric shaft 250 without losing desired strength.

[Machining Method of CS Side Eccentric Shaft and BS Side Eccentric Shaft]

Figure 55:
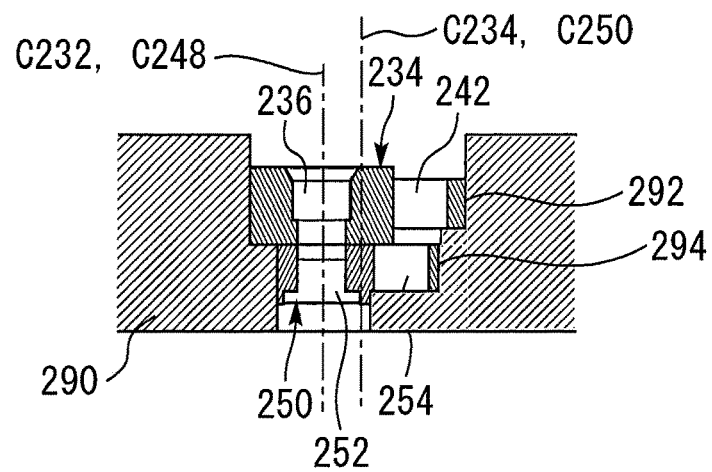
FIG. 55 is a diagram for explaining a method for forming a CS side eccentric shaft and a BS side eccentric shaft shown in FIG. 52 by common hole machining.

FIG. 55 is a diagram for explaining a method for forming the CS side eccentric shaft 234 and the BS side eccentric shaft 250 in the present embodiment by common hole machining. As described above, in the balance device 224 of the present embodiment, the eccentric amount of the CS main shaft 232 and the CS side eccentric shaft 234, and the eccentric amount of the BS axial shaft 248 and the BS side eccentric shaft 250 are set at the same amount "A".

As described for the third embodiment, in the link type balance device, the rotation radius r1 of the CS connected point and the rotation radius r2 of the BS connected point have to have the same values. In the present embodiment, the CS connected point is C234, and the rotation radius r1 thereof corresponds to the eccentric amount A. Similarly, the BS connected point is C250, and the rotation radius r2 thereof corresponds to the eccentric amount A. Accordingly, in the present embodiment, the eccentric amount A at the CS main shaft 232 side and the eccentric amount A at the BS axial shaft 248 side need to be accurately matched with each other.

FIG. 55 specifically illustrates a state in which the BS side eccentric shaft 250 and the CS side eccentric shaft 234 are set in a same jig 290. The jig 290 has recesses 292 and 294 of two stages with an axis line illustrated by being assigned with C234, C250 in FIG. 55 as a center thereof. The recess 292 is formed into a circular shape having a diameter equal to the diameter of the CS side eccentric shaft 234. Further, the recess 294 is formed into a circular shape having a diameter equal to the diameter of the BS side eccentric shaft 250. These recesses 292 and 294 are machined to be coaxial with each other.

In the present embodiment, the BS side eccentric shaft 250 at a stage in which machining of an outer shape and the lightening holes 242 is finished is set in the recess 294 of the jig 290 first. Next, the CS side eccentric shaft 234 at a stage in which machining of an outer shape and the lightening holes 254 is finished is set in the recess 292 of the jig 290. Thereafter, the through-hole 252 of the BS side eccentric shaft 250 and the through-hole 236 of the CS side eccentric shaft 234 are sequentially provided by the method of common hole machining. According to the method like this, the eccentric amount A of the CS side eccentric shaft 234 and the eccentric amount A of the BS side eccentric shaft 250 can be accurately matched with each other.

[Effect by Lightening Holes]

Figure 56:
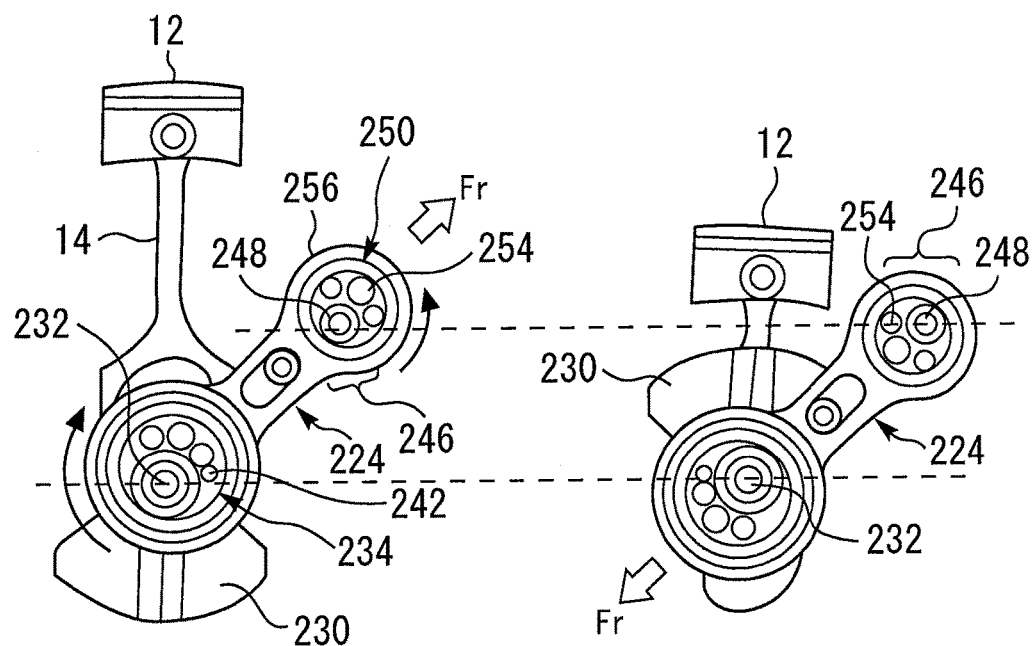
FIG. 56 is a diagram for explaining an operation of the balance device according to the tenth embodiment of the present invention.

FIG. 56 is a front view of the internal combustion engine including the balance device 224 of the present embodiment. More specifically, a left side in FIG. 56 expresses a state in which the piston 12 is located at the top dead center. Further, a right side in FIG. 56 expresses a state in which the piston 12 is located at the bottom dead center.

The balance device 224 of the present embodiment is configured so that the connection rod 256 reaches the movable end at the upper right side in FIG. 56 when the piston 12 reaches the top dead center, and the connection rod 256 reaches the movable end at the lower left side in FIG. 56 when the piston 12 reaches the bottom dead center. That is, the balance device 224 of the present embodiment has a configuration that causes the CS eccentric weight 230 and the BS eccentric weight 246 to operate in a substantially opposite direction to the connection rod 256.

In the balance device of the configuration like this, the weight mr of the connection rod 256 needs to be added to the CS eccentric weight 230 and the BS eccentric weight 246 in order to cancel out the vibration causing force Fr caused by the connection rod 256. Consequently, from the viewpoint of reducing the weight of the internal combustion engine, the lighter the connection rod 256, the more desirable. In this meaning, the lighter the CS side eccentric shaft 234 and the BS side eccentric shaft 250 that displace integrally with the connection rod 256, the more desirable.

Further, in the balance device 224 of the present embodiment, a wide portion (a portion where the lightening holes 242 are formed) of the CS side eccentric shaft 234, and a wide portion (a portion where the lightening holes 254 are formed) of the BS side eccentric shaft 250 come to the movable end at the upper right side in FIG. 56 synchronously with a timing at which the connection rod 256 reaches the movable end at the same direction in FIG. 56. Consequently, if the wide portions have large weights, a large vibration causing force occurs due to a centrifugal force of the CS side eccentric shaft 234 itself, and a centrifugal force of the BS side eccentric shaft 250 itself. Thus, weight reduction is especially desired with respect to the wide portion of the CS side eccentric shaft 234, and the wide portion of the BS side eccentric shaft 250.

As illustrated in FIG. 56, in the present embodiment, the lightening holes 242 and 254 are provided in the wide portions. According to the lightening holes 242 and 254, weights of the above described wide portions can be reduced significantly. As a result, the vibration causing force caused by the centrifugal force of the CS side eccentric shaft 234 and the centrifugal force of the BS side eccentric shaft 250 are significantly reduced. Further, the vibration causing force caused by the weight of the connection rod 256 is also reduced significantly. Consequently, according to the configuration of the present embodiment, weight reduction of the CS eccentric weight 230 and the BS eccentric weight 246 is achieved. This results in weight reduction of the internal combustion engine.

Modification Example of Tenth Embodiment

Figure 57:
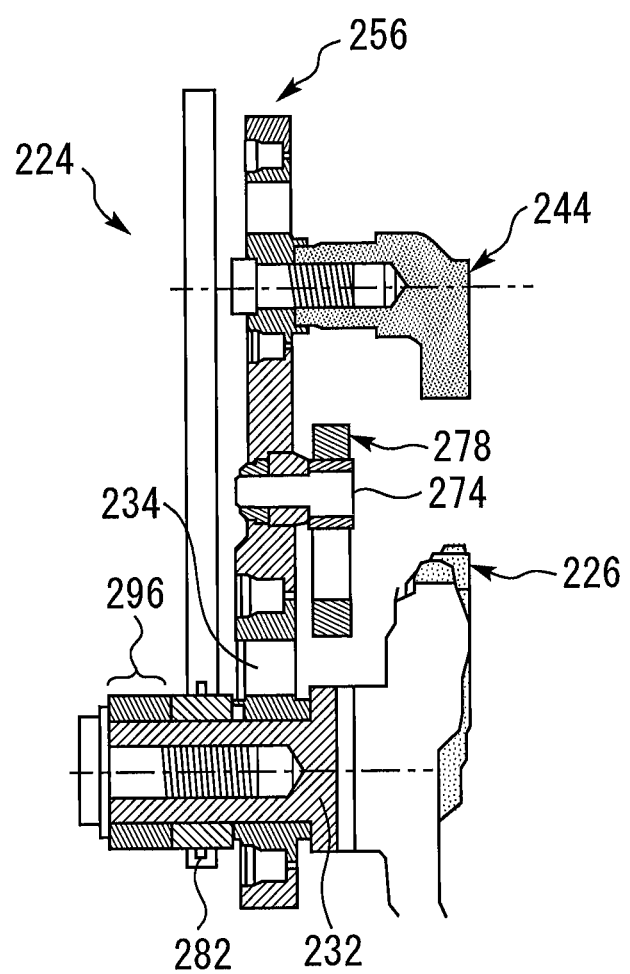
FIG. 57 is a diagram for explaining a first modification of the balance device according to the tenth embodiment of the present invention.

FIG. 57 is a side sectional view of a modification example of the balance device 224 of the present embodiment. The balance device 224 of the present embodiment is designed so that the diameter of the CS main shaft 232 is sufficiently contained within the outer shape of the CS side eccentric shaft 234, as described above. Consequently, the CS main shaft 232 can penetrate through the CS side eccentric shaft 234 while keeping the circular shape.

Further, in the balance device 224 of the present embodiment, the pivot 274 and the guide section 278 are disposed at the side of the crankshaft 226 and the balance shaft 244, whereby a surface side (a left side in FIG. 57) of the connection rod 256 can be brought into a substantially flat state. Consequently, according to the balance device 224, the CS main shaft 232 is protruded from the connection rod 256 by a long length, and can be used for drive of various devices. FIG. 57 illustrates an example in which a drive shaft 296 of an oil pump is fitted to the CS main shaft 232, in addition to 282 for driving an intake and exhaust valves. In this way, according to the balance device 224 of the present embodiment, reduction in size of the internal combustion engine can be promoted.

Figure 58:
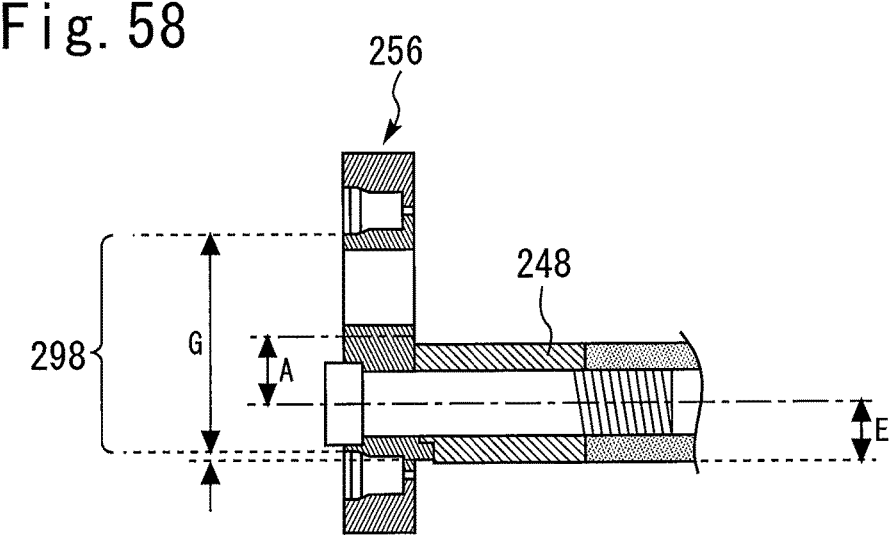
FIG. 58 is a diagram for explaining a configuration of a BS side eccentric shaft provided in a second modification of the tenth embodiment of the present invention.

FIG. 58 is a diagram for explaining a configuration of a modification example of the BS side eccentric shaft that can be used in the present embodiment. The BS side eccentric shaft 298 illustrated in FIG. 58 has a diameter G, that is, a radius (G/2). The radius (G/2) sometimes cannot help being made smaller than a sum of the eccentric amount A and the radius E of the BS axial shaft 248, due to various restrictions. The configuration illustrated in FIG. 58 illustrates an example of a solution in the case like this. In the configuration, the BS side eccentric shaft 298 has a smaller through-hole than a section of the BS axial shaft 248. On the other hand, a tip end of the BS axial shaft 248 is machined into a shape that enables the tip end to be inserted into the through-hole. The machined tip end of the BS axial shaft 248 is fixed in a state where the tip end is inserted into the through-hole of the BS side eccentric shaft 298. According to the configuration like this, even in a case where a sufficiently large space cannot be ensured for the BS side eccentric shaft 298, the balance device using the connection rod 256 can be realized.

Figure 59:
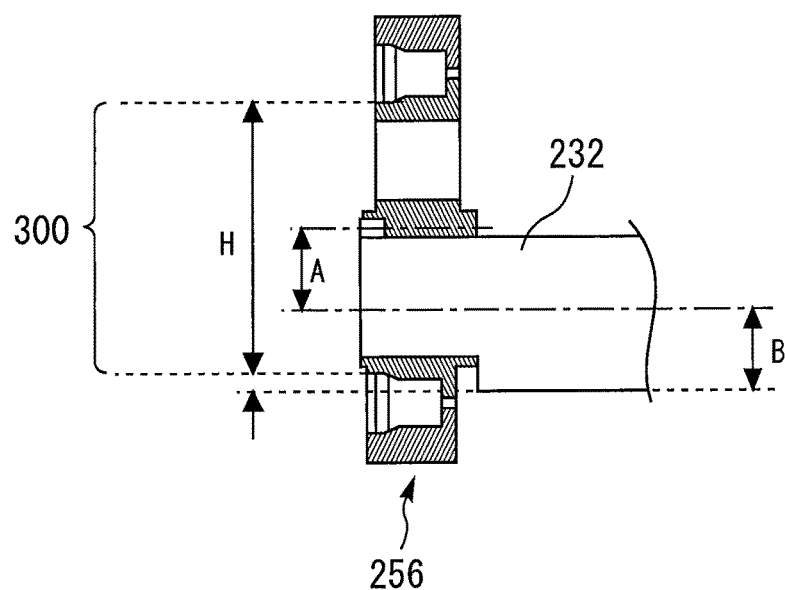
FIG. 59 is a diagram for explaining a configuration of a CS side eccentric shaft provided in a third modification of the tenth embodiment of the present invention.

FIG. 59 is a diagram for explaining a configuration of a modification example of the CS side eccentric shaft that is usable in the present embodiment. A CS side eccentric shaft 300 illustrated in FIG. 59 has a diameter H, that is, a radius (H/2). The radius (H/2) sometimes cannot help being made smaller than a sum of the eccentric amount A and the radius B of the CS main shaft 232, due to various restrictions. The configuration illustrated in FIG. 59 shows one example of a solution in the case like this. In the configuration, the CS side eccentric shaft 300 has a smaller through-hole than a section of the CS main shaft 232. On the other hand, a tip end of the CS main shaft 232 is machined into a shape that enables the tip end to be inserted into the through-hole. The machined tip end of the CS main shaft 232 has a set bolt 288 fastened thereto in a state where the tip end is inserted into the through-hole of the CS side eccentric shaft 300. According to the configuration like this, even in a case where a sufficiently large space cannot be ensured for the CS side eccentric shaft 300, the balance device using the connection rod 256 can be realized.

Figure 60:
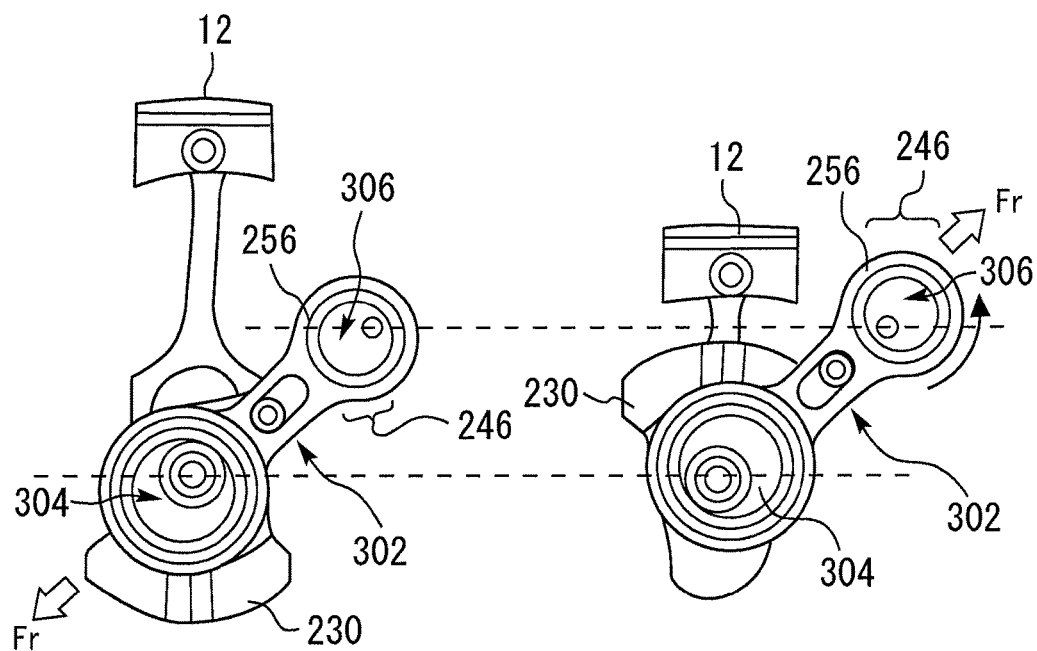
FIG. 60 is a diagram for explaining a configuration and an operation of a fourth modification of the tenth embodiment of the present invention.

FIG. 60 is a diagram illustrating a modification example of the balance device of the present embodiment in front view. Specifically, a left side in FIG. 60 shows a state in which the piston 12 is located at the top dead center in the modification example. Further, a right side in FIG. 60 shows a state in which the piston 12 is located at the bottom dead center in the modification example.

A balance device 302 illustrated in FIG. 60 is configured so that the connection rod 256 reaches a movable end at a lower left side in FIG. 60 when the piston 12 reaches the top dead center, and the connection rod 256 reaches a movable end at an upper right side in FIG. 60 when the piston 12 reaches the bottom dead center. That is, in the balance device 302, the CS eccentric weight 230 and the BS eccentric weight 246 operate in a substantially same direction as the connection rod 256.

In the balance device of the configuration like this, the vibration causing force Fr caused by the connection rod 256 can be used as a force that cancels out the vibration causing force Fp+Fc caused by the piston 12 and the conn-rod 14. As the vibration causing force Fr is larger, the weights that have to be given to the CS eccentric weight 230 and the BS eccentric weight 246 can be made lighter.

A CS side eccentric shaft 304 illustrated in FIG. 60 does not have a lightening hole unlike the CS side eccentric shaft 234 in the tenth embodiment. Likewise, a BS side eccentric shaft 306 illustrated in FIG. 60 does not have a lightening hole unlike the BS side eccentric shaft 250 in the tenth embodiment. According to the CS side eccentric shaft 304 and the BS side eccentric shaft 306 as above, a large vibration causing force can be generated by centrifugal forces of themselves, and the connection rod 256 can be caused to generate the large vibration causing force Fr. Consequently, the configuration illustrated in FIG. 60 can promote weight reduction of the CS eccentric weight 230 and the BS eccentric weight 246.

Further, in the aforementioned tenth embodiment, the CS side bearing 266 and the BS side bearing which are contained in the connection rod 256 are configured by roller bearings. However, these bearings are not limited to roller bearings. For example, these bearings may be slide bearings using a lubricating oil. The point similarly applies to an eleventh embodiment that will be described later.

Eleventh Embodiment

Next, the eleventh embodiment of the present invention will be described with reference to FIGS. 61 to 66.

Figure 61:
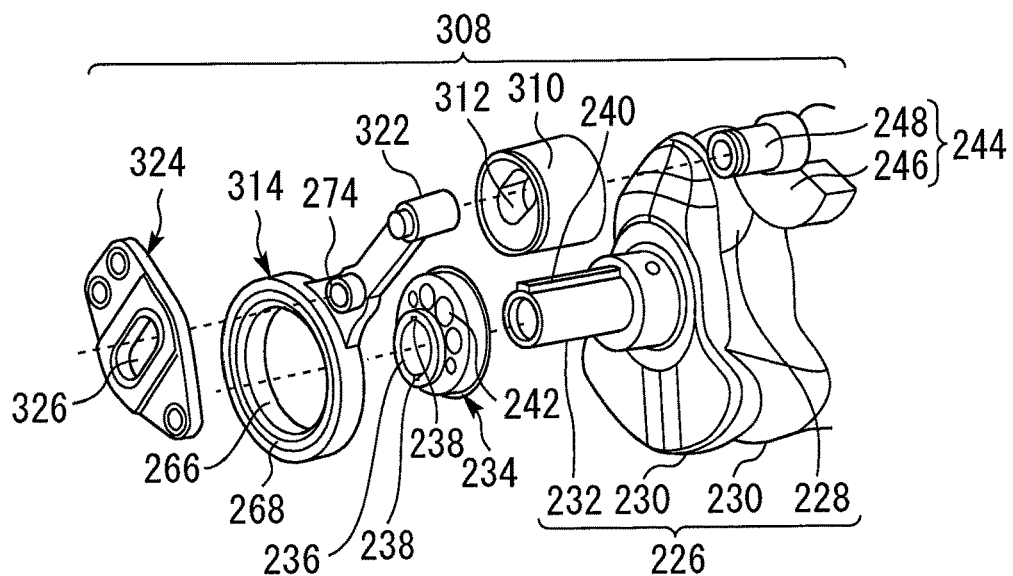
FIG. 61 is an exploded perspective view of a balance device according to a eleventh embodiment of the present invention.

FIG. 61 is an exploded perspective view of a balance device 308 of the eleventh embodiment of the present invention. The balance device 308 of the present embodiment has a feature in a point of providing one example of a specific configuration that realizes a slide type balance device illustrated in the first embodiment (refer to FIG. 1) or the like. Hereinafter, in FIGS. 61 to 66, the same or common elements as or to the elements in the aforementioned tenth embodiment will be assigned with the same reference numerals, and explanation thereof will be omitted or simplified.

In the balance device 308, the CS side eccentric shaft 234 is fixed to the CS main shaft 232 as in the case of the tenth embodiment. A BS side eccentric shaft 310 is fixed to the BS axial shaft 248. The BS side eccentric shaft 310 has a long hole 312 on a surface opposite to a surface that is fixed to the BS axial shaft 248. An outer shape of the BS side eccentric shaft 310 is cylindrical, and the long hole 312 is provided along a radial direction of a circle thereof.

The balance device 308 includes a connection rod 314 that connects the CS side eccentric shaft 234 and the BS side eccentric shaft 310.

Figure 62:
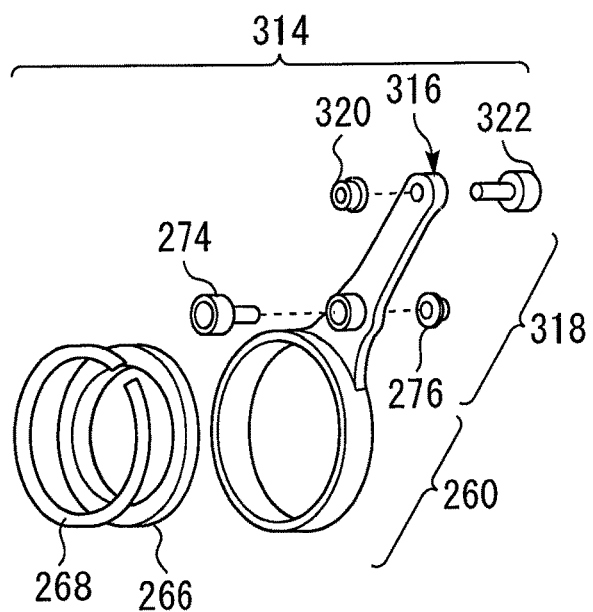
FIG. 62 is an exploded perspective view of the connection rod shown in FIG. 61.

FIG. 62 is an exploded perspective view of the connection rod 314. As illustrated in FIG. 62, the connection rod 314 has a connection rod main body 316. The connection rod main body 316 has a columnar portion 318 that extends from the CS side ring-shaped portion 260. A BS pivot 322 is fixed to an end portion of the columnar portion 318, by a nut 320. Further, in the columnar portion 318, the pivot 274 is fixed to a vicinity of a boundary from the CS side ring-shaped portion 260, by the nut 276. The BS pivot 322 functions as a roller bearing similarly to the pivot 274.

Explanation will be continued with reference to FIG. 61 again. The aforementioned CS side eccentric shaft 234 is inserted into the CS side bearing 266 of the connection rod 314, as in the case of the tenth embodiment. On the other hand, the BS side eccentric shaft 310 is connected to the connection rod 314 by housing a BS pivot 322 in the long hole 312.

The balance device 308 includes a guide section 324. The guide section 324 has a long hole 326 inside thereof. The long hole 326 has a width corresponding to the diameter of the pivot 274, and regulates a motion of the pivot 274 to a rectilinear motion similarly to the guide section 54 in the first embodiment.

FIG. 63 is a side sectional view of the balance device 308 of the present embodiment. In FIG. 63, a section of the balance shaft 244 is drawn at an upper side, and a section of the crankshaft 226 is drawn at a lower side respectively. The crankshaft 226 is provided with the sprocket 282 that drives the timing chain 284 as in the case of the tenth embodiment.

In the configuration illustrated in FIG. 63, the CS side eccentric shaft 234 operates as in the case of the tenth embodiment. Specifically, in the present embodiment, the center point "C234" of the CS side eccentric shaft 234 also corresponds to the CS connected point 32 of the balance device. When the crankshaft 226 rotates, the CS connected point 32 (C234) thereof draws a circular trajectory around the center point C232 of the CS main shaft while keeping the eccentric amount A. With this, the connection rod 314 performs a reciprocating motion at a stroke of the distance 2A.

Note that in the present embodiment, the radius (D/2) of the CS side eccentric shaft 234 is set at a sufficiently large value with respect to a sum of the eccentric amount A and the radius B of the CS main shaft 232. Consequently, in a structure of the present embodiment, it is also possible to apply packaging suitable for reduction in size as illustrated in FIG. 57.

As illustrated at the upper side in FIG. 63, the BS side eccentric shaft 310 is fixed to the tip end of the BS axial shaft 248 by a set bolt 328. The BS pivot 322 of the connection rod 314 is housed in the long hole 312 of the BS side eccentric shaft 310. Hereunder, the center point of the BS axial shaft 248 will be referred to as "C248", and a center point of the BS pivot 322 will be referred to as "C322".

In the configuration of the present embodiment, the connection rod 314 can rotate relatively to the BS side eccentric shaft 310 with an axis line passing through the point of C322 as a rotation axis. The BS side eccentric shaft 310 is integrated with the balance shaft 244. Accordingly, the connection rod 314 and the balance shaft 244 are relatively rotatable with the point of C322 as a center. From this point, the center point C322 of the BS pivot 322 corresponds to the BS connected point 38 in the slide type balance device (refer to FIG. 2).

As explained with reference to FIG. 2, in the slide type balance device 30, the distance between the BS connected point 38 and the center point of the balance shaft 40 changes with an operation of the connection rod 36. The balance device 308 of the present embodiment is also of a slide type, and therefore, the distance between the BS connected point 38 and the center point of the balance shaft 244, that is, a distance between the center point C322 of the BS pivot 322 and the center point C248 of the BS axial shaft 248 has to be changeable.

FIG. 64 is a diagram showing a positional relation between the center point C248 of the BS axial shaft 248 and the center point C322 of the BS pivot 322 viewed along an LXIV arrows in FIG. 63. As illustrated in FIG. 64, according to the configuration of the present embodiment, an eccentric amount I of C322 to C248 changes by the BS pivot 322 sliding along the long hole 312. Consequently, according to the configuration of the BS side eccentric shaft 310 and the connection rod 314 in the present embodiment, a requirement necessary for operation of the slide type balance device can be satisfied.

An operation of the balance device 308 will be described with reference to FIG. 63 again. When the crankshaft 226 rotates from the state illustrated in FIG. 63 so that the center point C234 of the CS side eccentric shaft 234 rotates to a front side of the figure with the point of C232 as a center, the guide section 324 functions similarly to the guide section 54 in the first embodiment. Specifically, at this time, the guide section 324 does not allow the pivot 274 to displace to the front side of the figure, and restricts the motion of the pivot 274 to only a motion toward a lower side of the figure. As a result, in the connection rod 314, a motion that displaces the BS pivot 322 to the back side and the lower side of the figure occurs.

The motion of the BS pivot 322 gives rotation in an opposite direction to the rotation of the crankshaft 226, to the BS side eccentric shaft 310. Since the BS side eccentric shaft 310 is fixed to the BS axial shaft 248, a rotating motion occurs to the BS axial shaft 248 in synchronism with displacement of the BS pivot 322. Then, as the crankshaft 226 continues to rotate, the center point C322 of the BS pivot 322 keeps to revolve around C248, and continuous rotation of the balance shaft 244 occurs. As a result, a vertical motion with the distance 2A as the stroke length occurs to the connection rod 314.

[Effect by Lightening Holes]

Figure 65:
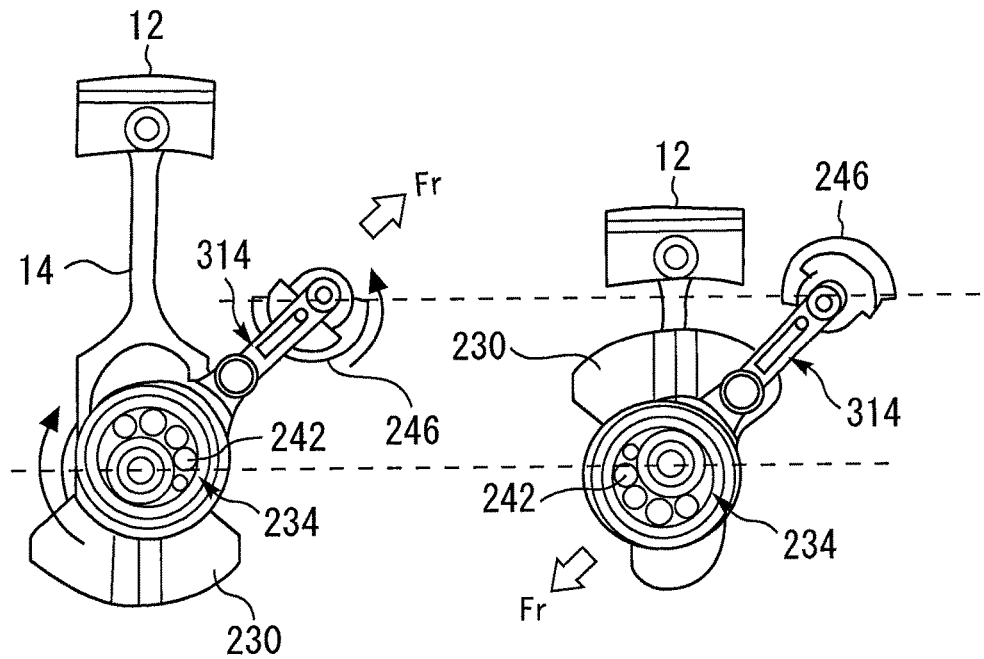
FIG. 65 is a diagram for explaining an operation of the balance device according to the eleventh embodiment of the present invention.

FIG. 65 is a diagram showing the internal combustion engine including the balance device 308 of the present embodiment in front view. More specifically, a left side in FIG. 65 shows a state in which the piston 12 is located at the top dead center. Further, a right side in FIG. 65 shows a state in which the piston 12 is located at the bottom dead center.

The balance device 308 of the present embodiment has a configuration of operating the CS eccentric weight 230 and the BS eccentric weight 246 in a substantially opposite direction to the connection rod 314, as in the case of the tenth embodiment. In the balance device of the configuration like this, lighter the connection rod 314, the more desirable, from the viewpoint of reducing the weight of the internal combustion engine. In the present embodiment, the lightening holes 242 are provided in the wide portion of the CS side eccentric shaft 234 as in the case of the tenth embodiment. Consequently, according to the configuration of the present embodiment, the internal combustion engine can be also reduced in weight as in the case of the tenth embodiment.

Modification of Eleventh Embodiment

As described above, in the eleventh embodiment, the CS side eccentric shaft 234 is given a sufficiently larger radius (D/2) than the sum of the eccentric amount A and the radius B of the CS main shaft 232. However, there may be a case in which the radius (D/2) of the CS main shaft 232 cannot help being made smaller than A+B due to various restrictions. In the balance device 308 of the present embodiment, the configuration as illustrated in FIG. 59 may be adopted in the case like this, as in the case of the tenth embodiment.

Figure 66:
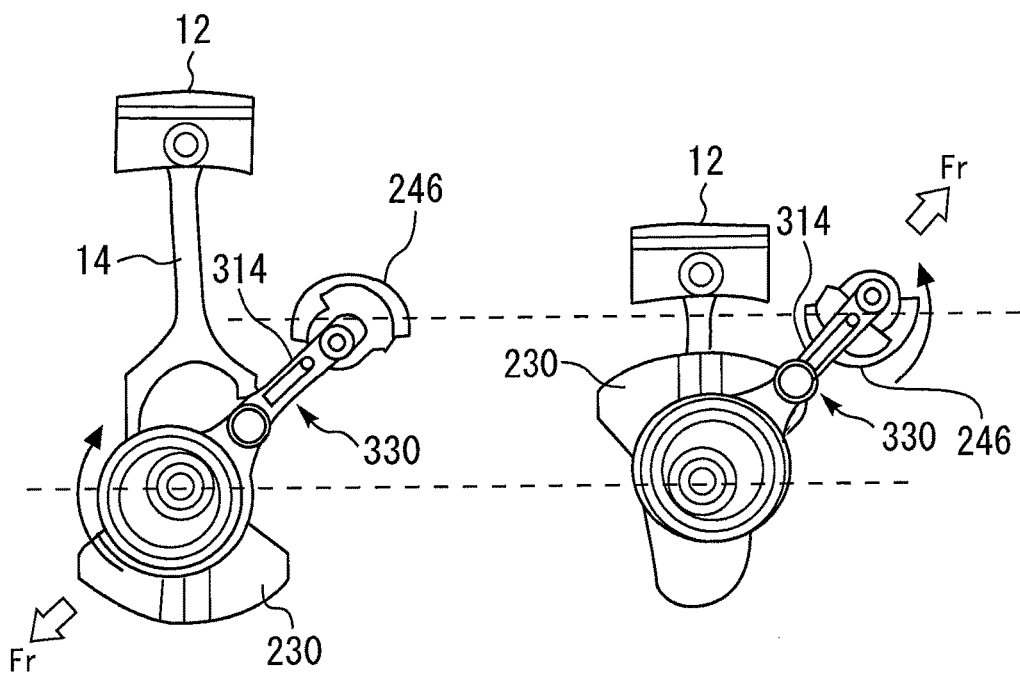
FIG. 66 is a diagram for explaining a configuration and an operation of a modification of the eleventh embodiment of the present invention.

FIG. 66 is a front view of a modification example of the balance device of the present embodiment. Specifically, a left side in FIG. 66 shows a state in which the piston 12 is located at the top dead center in the modification example. Further, a right side in FIG. 66 shows a state in which the piston 12 is located at the bottom dead center in the modification example. In a balance device 330 illustrated in FIG. 66, the CS eccentric weight 230 and the BS eccentric weight 246 operate in a substantially same direction as the connection rod 314, unlike the case of the eleventh embodiment.

In the balance device 330 of the configuration like this, the weight of the connection rod 314 can be used to cancel out the vibration causing force Fr caused by the piston 12 and the conn-rod 14. Consequently, in the balance device 330, the weights that should be given to the CS eccentric weight 230 and the BS eccentric weight 246 can be decreased by leaving a large weight in the connection rod 314. Thus, in the configuration illustrated in FIG. 66, a lightening hole is not provided in the CS side eccentric shaft, unlike the case of the eleventh embodiment. According to the configuration like this, weight reduction of the CS eccentric weight 230 and the BS eccentric weight 246 can be achieved.

What is claimed is:

1. A balance device for an internal combustion engine, comprising:
    a crankshaft that rotates with a CS main shaft as a rotating shaft; and
    a balance shaft that rotates with a BS axial shaft parallel with the CS main shaft as a rotating shaft,
    wherein the crankshaft includes a CS eccentric weight that makes a center of gravity of the crankshaft eccentric from a center of the CS main shaft, and
    the balance shaft includes a BS eccentric weight that makes a center of gravity of the balance shaft eccentric from a center of the BS axial shaft,
    the balance device further comprising:
    a connection rod that connects a CS connected point provided on the crankshaft at a position deviated from the center of the CS main shaft, and a BS connected point provided on the balance shaft at a position deviated from the center of the BS axial shaft;
    a CS side bearing that enables relative rotation of the crankshaft and the connection rod with the CS connected point as a center of rotation;
    a BS side bearing that enables relative rotation of the balance shaft and the connection rod with the BS connected point as a center of rotation; and
    a guide section that guides a motion of the connection rod so that the balance shaft rotates in an opposite direction to a rotation direction of the crankshaft, wherein
    said guide section achieves the guide by sliding with the connection rod or a slide portion which the connection rod comprises.

2. The balance device for an internal combustion engine according to claim 1, further comprising:
    a connected point adjustment mechanism that enables at least one of the CS connected point and the BS connected point to displace in a direction of a radius of rotation of at least the one of the CS connected point and the BS connected point; and
    a slide portion provided at one point of the connection rod,
    wherein the guide section regulates a motion of the slide portion to a rectilinear motion in a direction from a side of the CS main shaft toward a side of the BS axial shaft, and a rectilinear motion in an opposite direction to the direction.

3. The balance device for an internal combustion engine according to claim 1, further comprising:
    a connected point adjustment mechanism that enables at least one of the CS connected point and the BS connected point to displace in a direction of a radius of rotation of at least the one of the CS connected point and the BS connected point;
    wherein the guide section can rotate within a same plane as a movable plane of the connection rod with a position overlying the connection rod as a center, and holds the connection rod slidably in a direction of a center line of the connection rod.

4. The balance device for an internal combustion engine according to claim 1, further comprising:
    a restriction part provided in a middle point between the CS connected point and the BS connected point, of the connection rod,
    wherein a distance between the CS connected point and the BS connected point is equal to a distance between the CS main shaft and the BS axial shaft,
    a distance between the center of the CS main shaft and the CS connected point is equal to a distance between the center of the BS axial shaft and the BS connected point, and
    the guide section includes a BS side guide that inhibits the restriction part from displacing in a same rotation direction as the CS connected point, in a position where the restriction part makes closest approach to the BS axial shaft, and a CS side guide that inhibits the restriction part from displacing in a same rotation direction as the CS connected point in a position where the restriction part makes closest approach to the CS main shaft.

5. The balance device for an internal combustion engine according to claim 2, wherein
    the crankshaft is used by a manner of an offset crank in which the center of the CS main shaft is set at a position that is offset by a fixed value from an axis line of a reciprocating motion of a piston, and
    the balance shaft and the guide section are disposed so that at least one of the center of the CS main shaft and the center of the BS axial shaft is placed at a position that is offset by a fixed value from an axis line of the rectilinear motion.

6. The balance device for an internal combustion engine according to claim 5, wherein a CS-BS center line connecting the center of the CS main shaft and the center of the BS axial shaft is offset by a fixed value from the axis line of the rectilinear motion.

7. The balance device for an internal combustion engine according to claim 5, wherein
the center of the CS main shaft is located on the axis line of the rectilinear motion, and
the center of the BS axial shaft is offset by a fixed value from the axis line of the rectilinear motion.

8. The balance device for an internal combustion engine according to claim 5, wherein
the center of the BS axial shaft is located on the axis line of the rectilinear motion, and
the center of the CS main shaft is offset by a fixed value from the axis line of the rectilinear motion.

9. The balance device for an internal combustion engine according to claim 5, wherein
the center of the BS axial shaft is offset by a fixed value to one side from the axis line of the rectilinear motion, and
the center of the CS main shaft is offset by a fixed value to the other side from the axis line of the rectilinear motion.

10. The balance device for an internal combustion engine according to claim 3, wherein
the crankshaft is used by a manner of an offset crank in which the center of the CS main shaft is set at a position that is offset by a fixed value from a reciprocating motion of a piston, and
a center of rotation of the guide section is offset by a fixed value from a CS-BS center line connecting the center of the CS main shaft and the center of the BS axial shaft.

11. The balance device for an internal combustion engine according to claim 1, wherein
the CS connected point is provided at a same side as a center of gravity of the CS eccentric weight with respect to the center of the CS main shaft, and
the BS connected point is provided at a same side as a center of gravity of the BS eccentric weight with respect to the center of the BS axial shaft.

12. The balance device for an internal combustion engine according to claim 1, wherein
the CS connected point is provided at an opposite side from a center of gravity of the CS eccentric weight with respect to the center of the CS main shaft, and
the BS connected point is provided at an opposite side of a center of gravity of the BS eccentric weight with respect to the center of the BS axial shaft.

13. The balance device for an internal combustion engine according to claim 1, further comprising:
a spring member that applies to the balance shaft rotating moment in an opposite direction to a rotating direction of the crankshaft.

14. The balance device for an internal combustion engine according to claim 13, further comprising
a cam that is provided to the balance shaft, wherein
said spring member is contracted by being pressed by the cam, and
the cam is formed to press the spring member in a process of the connection rod moving to a side of the BS axial shaft with rotation of the balance shaft, and receive the rotating moment in the opposite direction from the spring member, in a position where an axis line of the connection rod overlies the BS axial shaft.

15. The balance device for an internal combustion engine according to claim 1, wherein the balance device is mounted on a single-cylinder or four-cycle two-cylinder internal combustion engine.

16. The balance device for an internal combustion engine according to claim 1, wherein the connection rod is disposed to be inclined from an axis line of a reciprocating motion of a piston at a top dead center and a bottom dead center of the internal combustion engine,
the CS eccentric weight has the center of gravity in a region that is at an opposite side to the CS connected point, with a CS axis line that passes through the center of the CS main shaft and is parallel with the axis line of the piston therebetween, under a situation at the top dead center, and
the BS eccentric weight has the center of gravity in a region that is at an opposite side to the BS connected point, with a BS axis line that passes through the center of the BS axial shaft and is parallel with the axis line of the piston therebetween, under a situation at the top dead center.

17. The balance device for an internal combustion engine according to claim 16, wherein
the CS eccentric weight has the center of gravity and a weight of a magnitude that cancels out a resultant force of an vibration causing force caused by a conn-rod of the internal combustion engine, a part of an vibration causing force caused by the piston of the internal combustion engine, and a part of an vibration causing force caused by the connection rod,
the BS eccentric weight has the center of gravity and a weight of a magnitude that cancels out a remaining part of the vibration causing force caused by the piston of the internal combustion engine and a remaining part of the vibration causing force caused by the connection rod, and
said parts of an vibration causing force and said remaining parts of an vibration causing force are equal.

18. The balance device for an internal combustion engine according to claim 17, wherein
the balance shaft is connected to the connection rod at one end of the balance shaft, and
of the weight of the BS eccentric weight, a weight for canceling out the remaining part of the vibration causing force caused by the connection rod is reflected in a vicinity of the one end more greatly as compared with a vicinity of the other end of the balance shaft.

19. The balance device for an internal combustion engine according to claim 1, wherein
the connection rod has the CS side bearing at a side of the crankshaft,
the CS has side bearing rotatably holds a CS side eccentric shaft,
the CS side eccentric shaft is fixed to the CS main shaft so that a CS eccentric point that is deviated by a fixed value from a center thereof coincides with the center of the CS main shaft, and
the center of the CS side eccentric shaft configures the CS connected point.

20. The balance device for an internal combustion engine according to claim 1, wherein
the connection rod has the BS side bearing at a side of the balance shaft,
the BS side bearing rotatably holds a BS side eccentric shaft,
the BS side eccentric shaft is fixed to the BS axial shaft so that a BS eccentric point that is deviated by a fixed value from a center thereof coincides with the center of the BS axial shaft, and the center of the BS side eccentric shaft configures the BS connected point.

\* \* \* \* \*